(12) United States Patent
Hartnett et al.

(10) Patent No.: US 11,082,467 B1
(45) Date of Patent: Aug. 3, 2021

(54) LIVE GROUP VIDEO STREAMING

(71) Applicant: Facebook, Inc., Menlo Park, CA (US)

(72) Inventors: Allison Hartnett, San Francisco, CA (US); Kristin Lindsey George, Palo Alto, CA (US); Abhishek Parthasarathy, San Francisco, CA (US); Hemal Khatri, Redmond, WA (US); Tomer Bar, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 17/011,602

(22) Filed: Sep. 3, 2020

(51) Int. Cl.
| | |
|---|---|
| *H04L 29/06* | (2006.01) |
| *H04N 21/2187* | (2011.01) |
| *H04N 7/14* | (2006.01) |
| *H04N 21/6405* | (2011.01) |

(52) U.S. Cl.
CPC ...... *H04L 65/4076* (2013.01); *H04L 65/1069* (2013.01); *H04N 7/147* (2013.01); *H04N 21/2187* (2013.01); *H04N 21/6405* (2013.01); *H04L 65/4038* (2013.01)

(58) Field of Classification Search
CPC combination set(s) only.
See application file for complete search history.

(56) References Cited

U.S. PATENT DOCUMENTS

| | | |
|---|---|---|
| 10,535,177 B2 | 1/2020 | Cornell |
| 10,616,288 B2 | 4/2020 | Ormseth et al. |
| 2012/0274736 A1* | 11/2012 | Robinson .............. H04L 65/403 348/14.16 |
| 2012/0287229 A1* | 11/2012 | Yang ...................... H04N 19/61 348/14.09 |
| 2015/0381936 A1* | 12/2015 | Goyal .................... G10L 15/26 348/14.06 |
| 2017/0006322 A1* | 1/2017 | Dury ....................... A63F 13/49 |
| 2019/0089642 A1* | 3/2019 | Srinivasan .............. H04L 47/30 |
| 2019/0251884 A1* | 8/2019 | Burns ................... G09G 1/007 |
| 2020/0344357 A1* | 10/2020 | Scriven ................. H04M 3/563 |
| 2020/0349192 A1* | 11/2020 | Sarkar .................. H04L 45/308 |
| 2020/0382681 A1* | 12/2020 | Smithwick ........... G03B 21/604 |

* cited by examiner

*Primary Examiner* — Phung-Hoang J Nguyen
(74) *Attorney, Agent, or Firm* — Keller Jolley Preece

(57) ABSTRACT

The present disclosure relates to systems, non-transitory computer-readable media, and methods for accurately, flexibly, and efficiently broadcasting public combined live video streams from multiple participant devices, which change over the course of the live broadcast, as well as generating dynamic user interfaces that streamline adding, removing, and swapping participant devices from the public combined live video stream. In particular, a live video streaming system facilitates compositing live video streams from multiple participant devices into a public combined live video stream within a digital room before broadcasting the public combined live video stream to viewer devices. In addition, the live video stream smoothly and efficiently transitions new participant devices from a digital waiting room to the public combined live video stream as well as switches current participant devices from the public combined live video stream to a digital waiting room, all while maintaining live video stream of the participant devices.

20 Claims, 25 Drawing Sheets

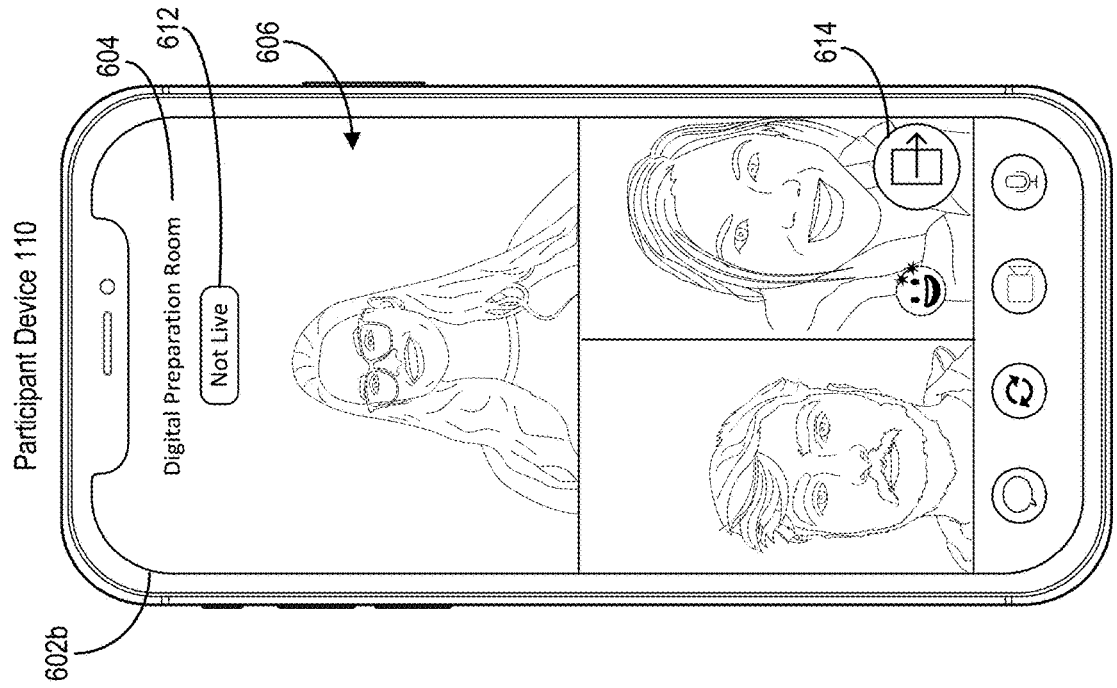
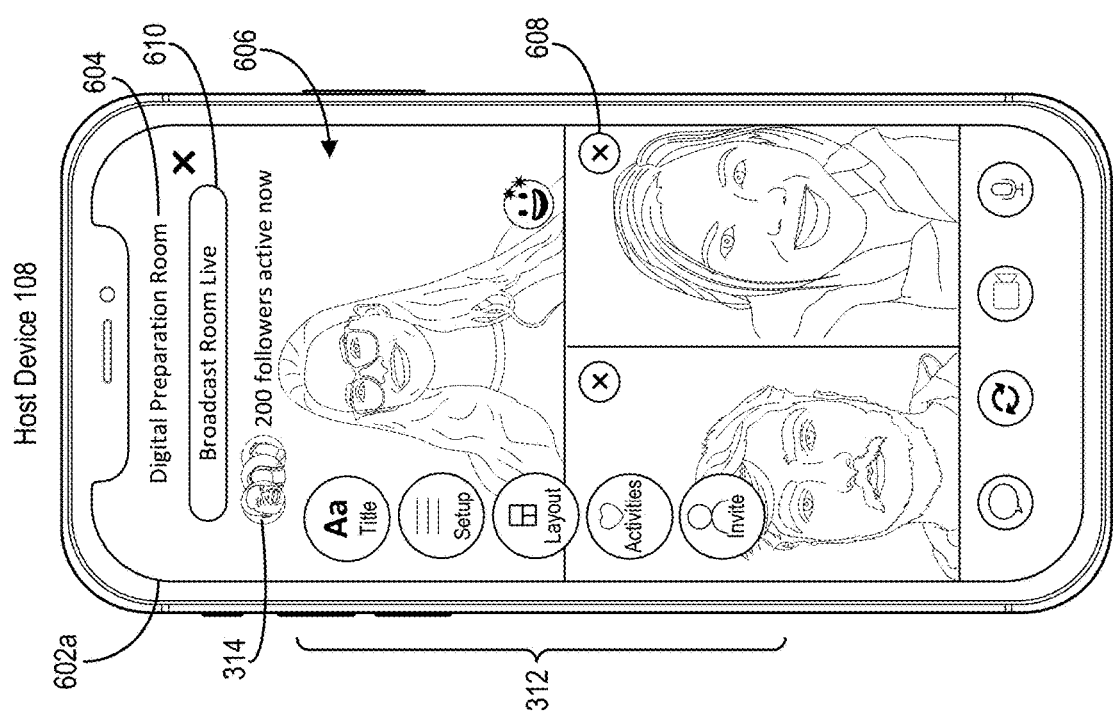
Fig. 6B
Fig. 6A

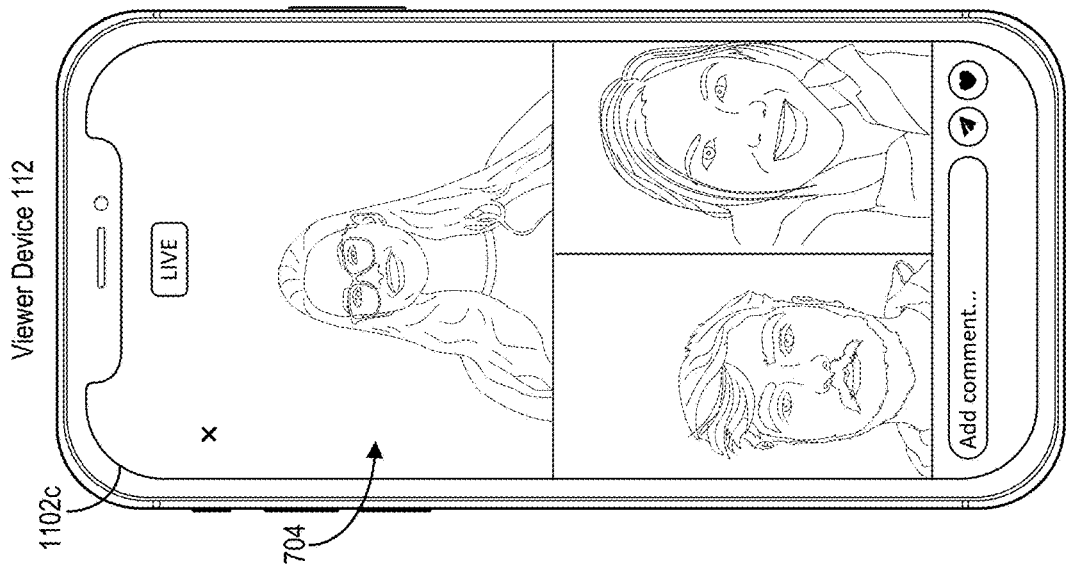
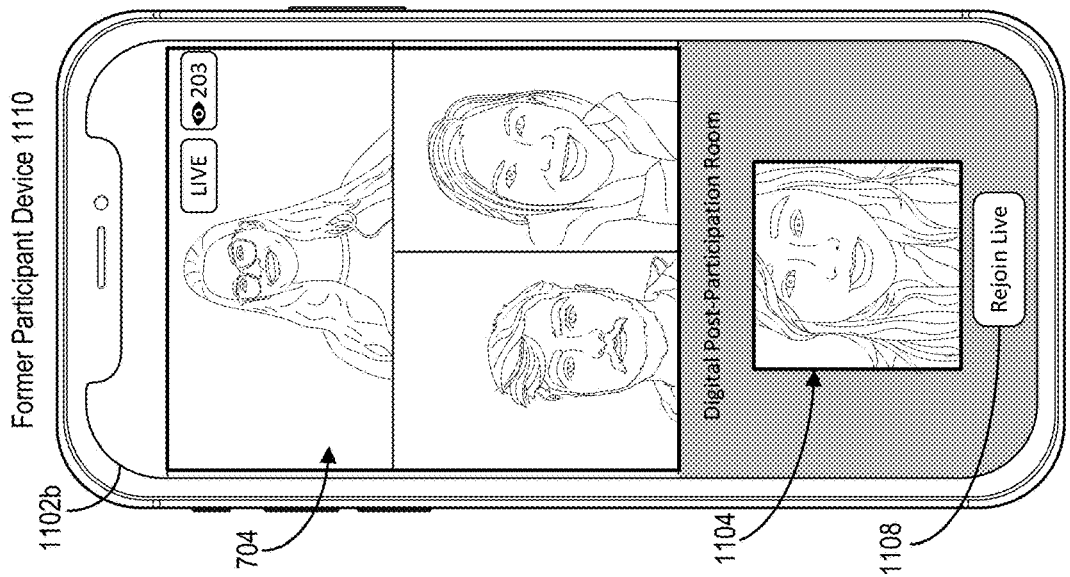
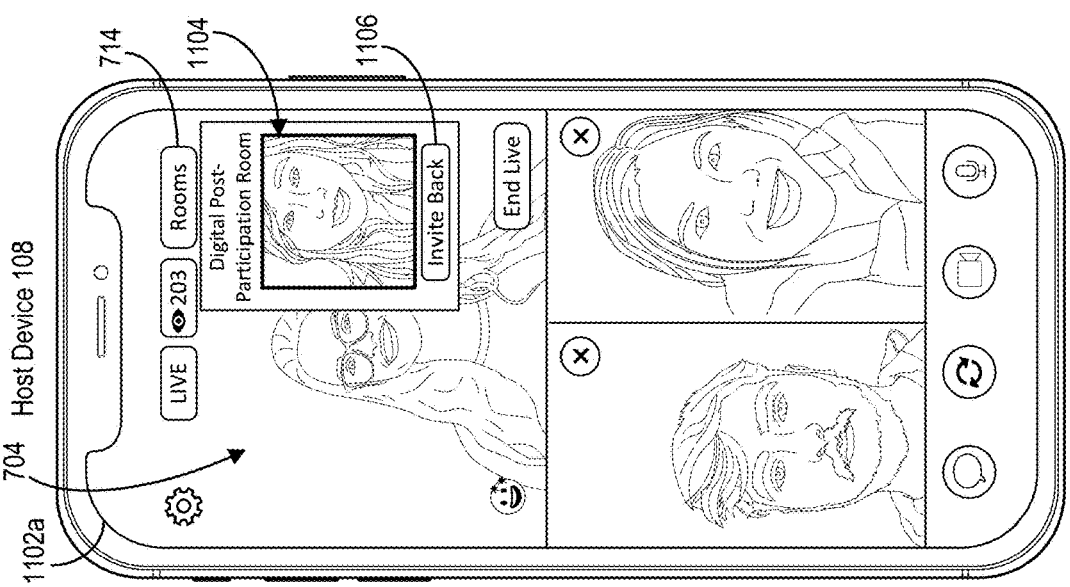

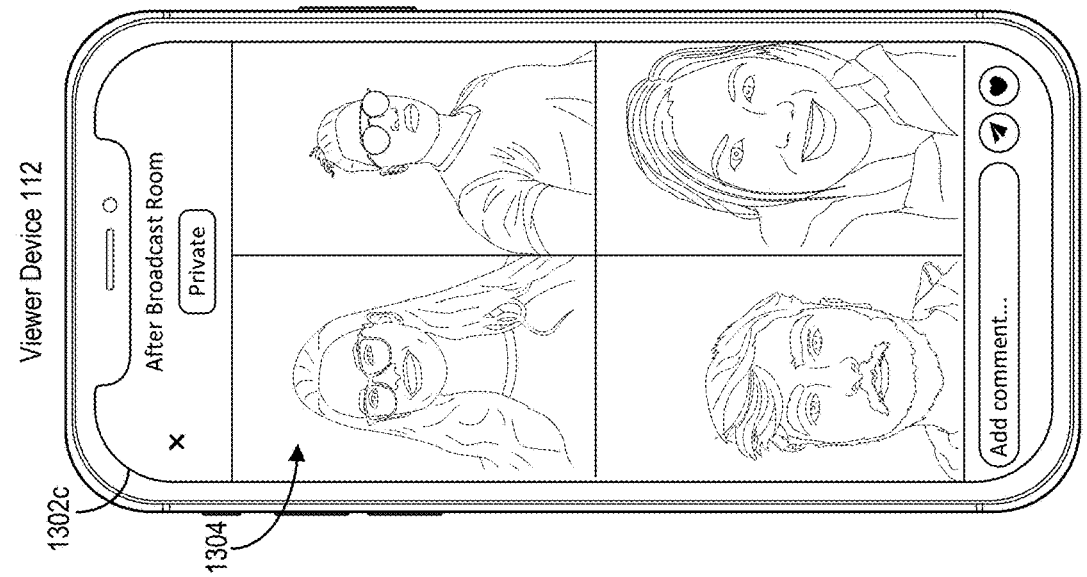
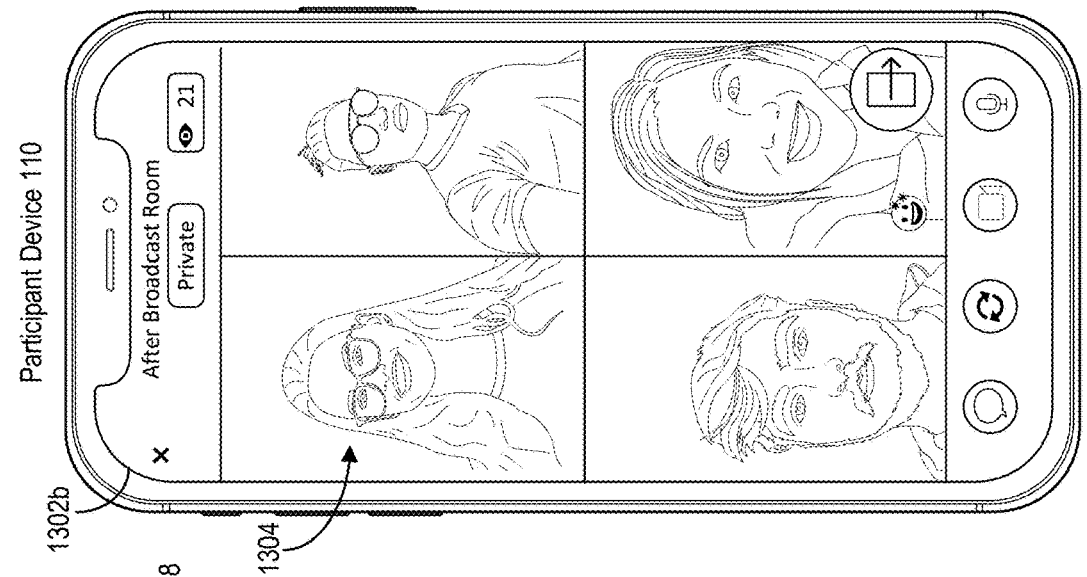
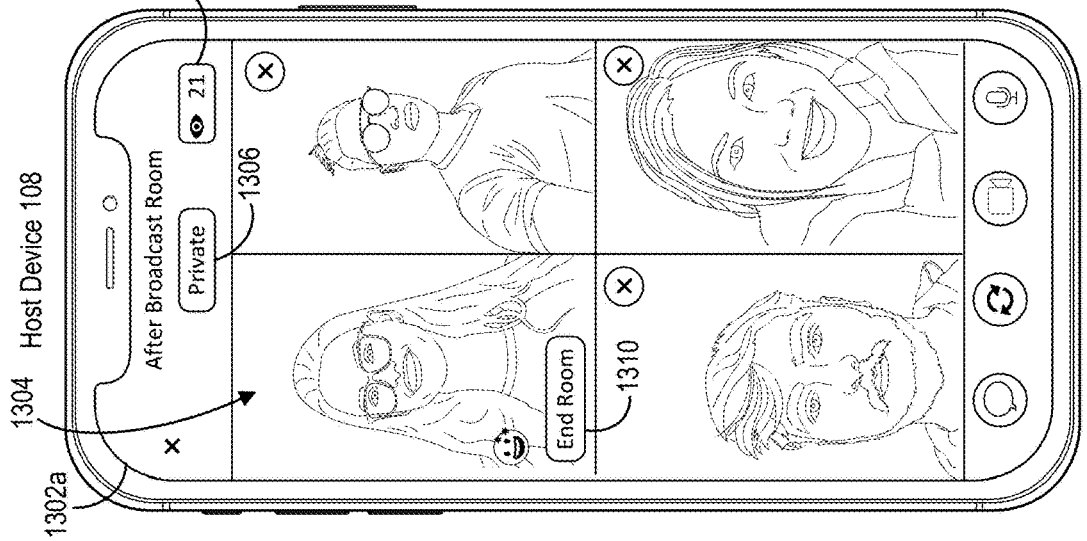

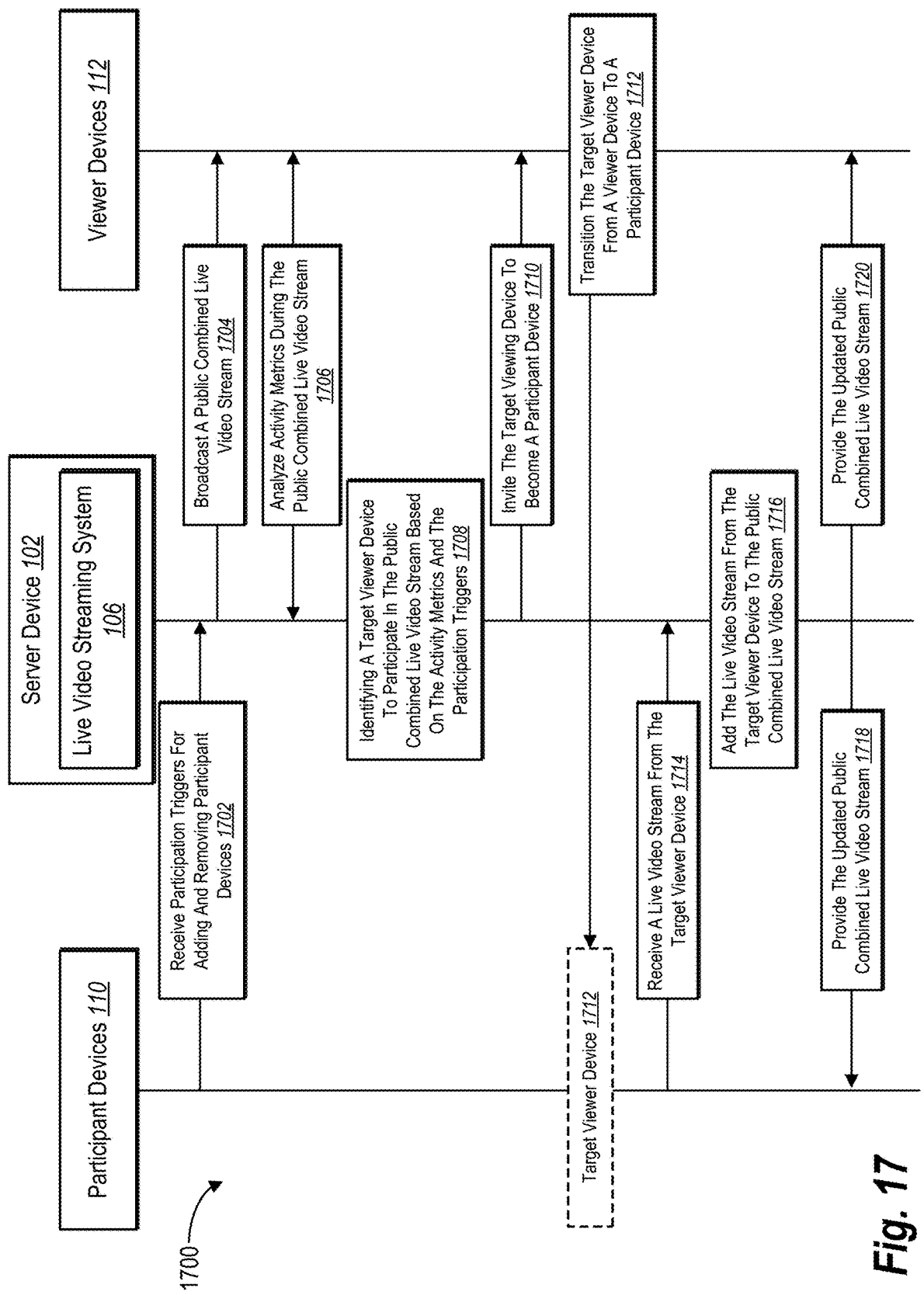

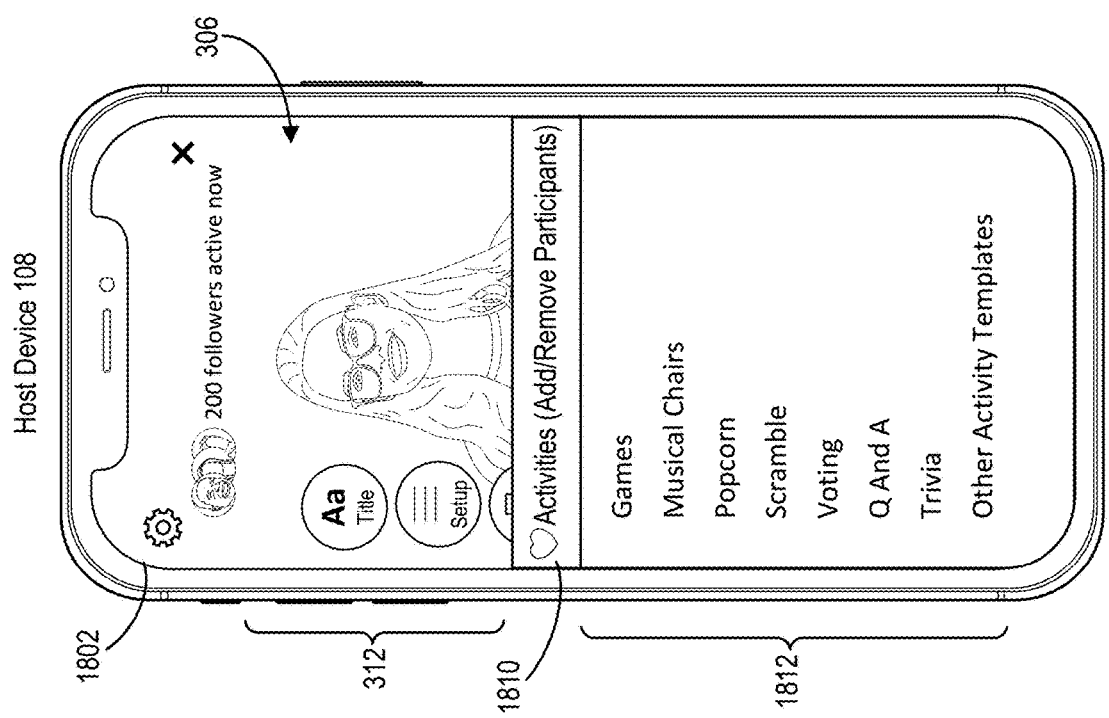
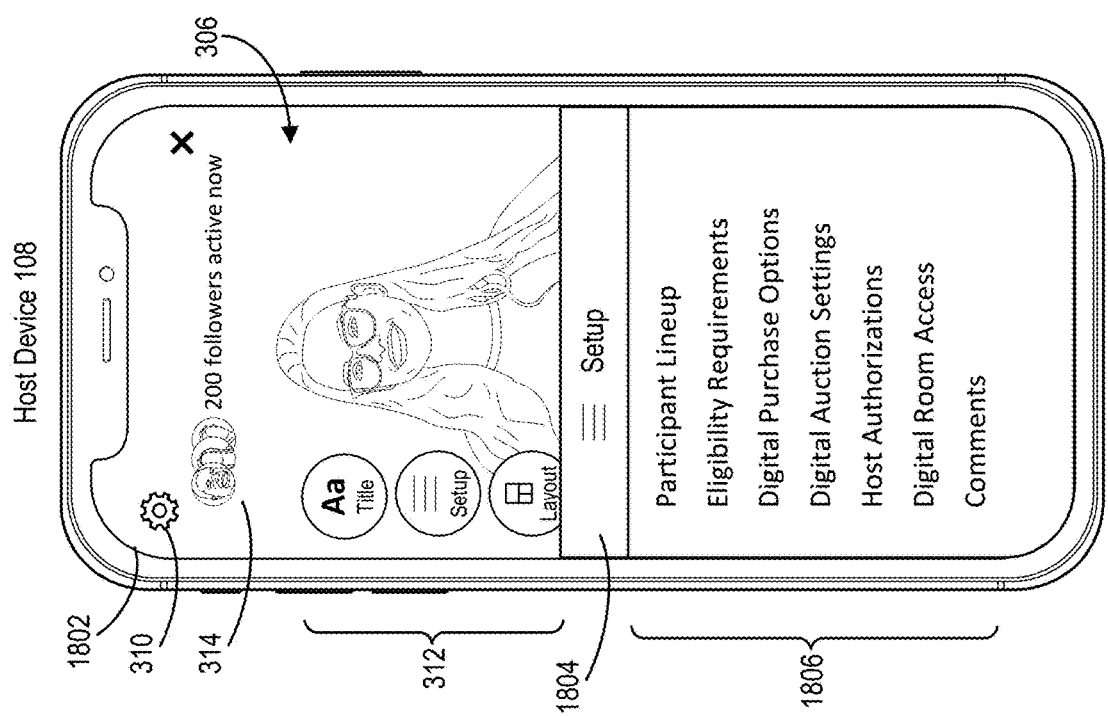

2000

```
┌─────────────────────────────────────────────────────────────┐
│ Combining Live Video Streams Received From Participant      │
│ Devices Into A Combined Live Video Stream 2010              │
└─────────────────────────────────────────────────────────────┘
                              │
                              ▼
┌─────────────────────────────────────────────────────────────┐
│ Broadcasting The Combined Live Video Stream To Viewer       │
│ Devices 2020                                                │
└─────────────────────────────────────────────────────────────┘
                              │
                              ▼
┌─────────────────────────────────────────────────────────────┐
│ Identifying Activity Metrics Associated With The Viewer     │
│ Devices 2030                                                │
└─────────────────────────────────────────────────────────────┘
                              │
                              ▼
┌─────────────────────────────────────────────────────────────┐
│ Identifying A Target Viewer Device To Participate In The    │
│ Combined Live Video 2040                                    │
└─────────────────────────────────────────────────────────────┘
                              │
                              ▼
┌─────────────────────────────────────────────────────────────┐
│ Adding The Target Viewer Device To The Combined Live Video  │
│ Stream 2050                                                 │
└─────────────────────────────────────────────────────────────┘
```

*Fig. 20*

LIVE GROUP VIDEO STREAMING

BACKGROUND

Recent years have seen significant technological improvements in hardware and software platforms for sharing user-generated digital media. For example, conventional video sharing systems can facilitate a client device capturing and sharing video communications with other client devices across computer networks. Often, these conventional systems facilitate live video sharing across client devices. Despite many advances, conventional video sharing systems continue to suffer from a number of technical drawbacks particularly in relation to efficiency, flexibility, and accuracy of implementing computer systems in providing and facilitating public combined live video streams from multiple client devices.

SUMMARY

One or more implementations described herein provide benefits and/or solve one or more of the foregoing or other problems in the art with methods, non-transitory computer-readable media, and systems that accurately, flexibly, and efficiently broadcast a public combined live video stream from multiple devices, which change throughout the live broadcast, as well as generate dynamic user interfaces that streamline adding, removing, and swapping participant devices with respect to the public combined live video stream. To illustrate, in response to receiving video streams from multiple participant devices, the disclosed systems can generate a digital room for the participant devices. In one or more implementations, the disclosed systems combine the video streams from the participant devices into a single combined live video stream and provide the combined live video stream to the participant devices within the digital room. In addition, based on receiving a broadcast request from a participant device in the digital room, the disclosed systems can broadcast the combined live video stream as a public combined live video stream to an audience of viewer devices.

In additional implementations, the disclosed systems can generate a digital waiting room during the public combined live video stream where a pending participant device can prepare to join the public combined live video stream. For example, the disclosed systems can generate a digital waiting room that includes an additional video stream from a pending participant device. In addition, the disclosed systems can provide the pending participant device with a digital waiting room user interface that includes the live video stream of the digital waiting room as well as the public combined live video stream. Similarly, the disclosed systems can provide one or more of the participant devices with a user interface that includes both the live video stream of the digital waiting room as well as the public combined live video stream. Moreover, the disclosed systems can generate and provide other digital rooms, such as a post-participation waiting room and an after broadcast room, along with corresponding room interfaces.

Further, the disclosed systems can dynamically add viewer devices to the public combined live video stream. For example, in one or more implementations, while broadcasting the public combined live video stream to multiple viewer devices, the disclosed systems can identify activity metrics associated with the viewer devices. Based on analyzing the activity metrics, the disclosed systems can identify a target viewer device to participate in the public combined live video stream. Indeed, the disclosed systems can add the target viewer device to the public combined live video stream as a participant device. Additionally, the disclosed systems can remove or swap participant devices in the public combined live video stream with other viewer devices based on the activity metrics, as further described below.

Additional features and advantages of one or more implementations of the present disclosure are outlined in the following description, and in part will be obvious from the description, or may be learned by the practice of such example implementations.

BRIEF DESCRIPTION OF THE DRAWINGS

The detailed description provides one or more implementations with additional detail through the use of the accompanying drawings, as briefly described below.

FIGS. 6A-6B illustrate graphical user interfaces of a digital preparation room on various client devices in accordance with one or more implementations.

FIGS. 11A-11C illustrate graphical user interfaces of a digital post-participation room in connection with a public combined live video stream on various client devices in accordance with one or more implementations.

FIGS. 13A-13C illustrate graphical user interfaces of an after broadcast room following a public combined live video stream on various client devices in accordance with one or more implementations.

FIG. 17 illustrates a sequence diagram of identifying a target viewer device to add to a public combined live video stream based on analyzing activity metrics in accordance with one or more implementations.

FIGS. 18A-18B illustrate graphical user interfaces for establishing parameters for adding and removing viewer devices from a public combined live video stream in accordance with one or more implementations.

FIG. 20 illustrates a flow diagram of a series of acts for identifying target viewer devices to participate in public combined live video streams in accordance with one or more implementations.

DETAILED DESCRIPTION

Figure 1:
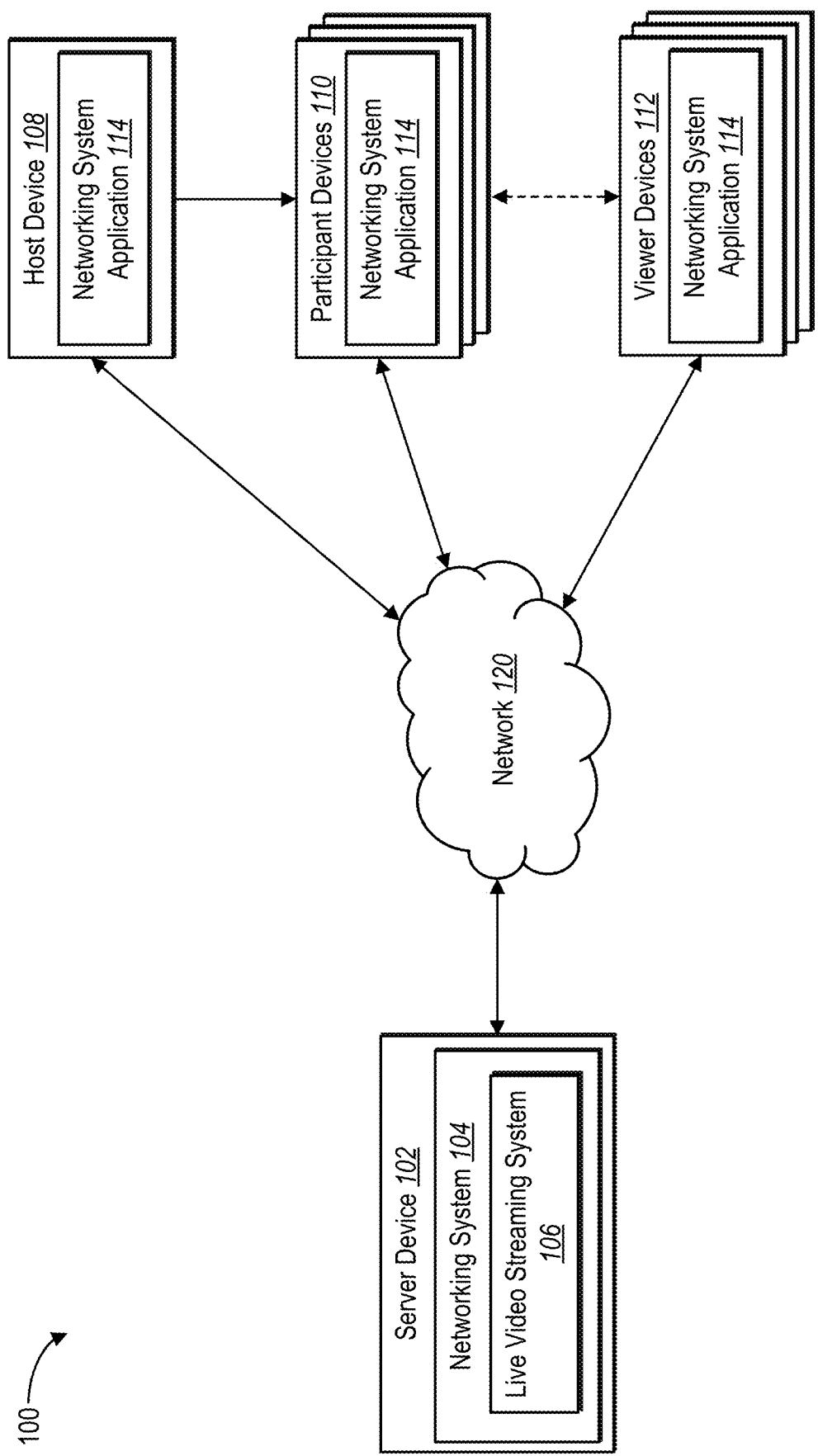
FIG. 1 illustrates a block diagram of a system environment for implementing a live video streaming system in accordance with one or more implementations.

This disclosure describes a live video streaming system that facilitates broadcasting a public combined live video stream generated from multiple participant devices to an audience of viewer devices. In one or more implementations, the live video streaming system combines live video streams from multiple participant devices into a combined live video stream within a digital room before broadcasting the combined live video stream as a public combined live video stream to viewer devices. In addition, the live video streaming system smoothly and efficiently transitions new participant devices from digital waiting rooms to the public combined live video stream as well as switches current participant devices from the public combined live video stream to the same or different digital waiting rooms, all while maintaining the live video streams of the participant devices.

Additionally, the live video streaming system can provide dynamic user interfaces to pending, current, and past participant devices. For example, for a pending participant device that is waiting in a digital waiting room before joining the public combined live video stream, the live video streaming system can provide a user interface to the pending participant device that includes a live video stream of the devices in the digital waiting room as well as includes the public combined live video stream. Additionally, the live video streaming system can provide a similar user interface to a participant device (e.g., a host device) currently participating in the public combined live video stream such that the participant device can view which pending participant devices are in the digital waiting room without having to leave the public combined live video stream. In this manner, the participant device can visually confirm that the pending participant devices in the digital waiting room are prepared and ready before the live video streaming system adds them to the public combined live video stream.

Further, the live video streaming system can facilitate adding, removing, and swapping viewer devices to and from the public combined live video stream. For example, the live video streaming system can automatically determine and invite target viewer devices to become participant devices and participate in the public combined live video stream. In some implementations, the live video streaming system identifies a target viewer device based on the monitored activity of the viewer device or other viewer devices, as described further below.

As mentioned above, the live video streaming system can utilize multiple digital rooms to improve broadcasting public combined live video streams to audiences of viewer devices. To provide additional context, participant devices can include client devices that capture and provide a live video stream to the live video streaming system to be composited into a public combined live video stream. Participant devices can include a host device or another participant device that can control the public combined live video stream. Participant devices can also include pending participant devices that join a public combined live video stream during the stream. In addition, participant device can include former participant devices that previously participated, but are no longer participating, in the public combined live video stream. Additionally, viewer devices can include client devices that receive and display a public combined live video stream.

In one or more implementations, the live video streaming system generates a digital preparation room (e.g., a virtual green room). For example, the live video streaming system generates the digital preparation room by combining live video streams from a group of participant devices into a combined stream and providing the combined live video stream to the group of participant devices within a digital preparation room interface. For instance, the digital preparation room interface allows the participant devices to prepare before going live to a more public audience, as further discussed below.

In some instances, the digital preparation room interface includes a broadcast element for sharing the combined live video stream with viewer devices. In these instances, in response to detecting the selection of the broadcast element, the live video streaming system begins broadcasting the combined live video stream as a public combined live video stream to viewer devices as well as provides an updated live broadcast interface to the group of participant devices. In addition, and as described further below, the digital preparation room interface can include additional elements for establishing a framework or agenda for the public combined live video stream.

In additional implementations, the live video streaming system can generate digital waiting rooms. For example, in various implementations, the live video streaming system generates a digital waiting room (e.g., a pending participant room) for one or more pending participant devices that are waiting to join the public combined live video stream. In some instances, the live video streaming system provides a digital waiting room interface to the pending participant devices in the digital waiting room that includes multiple streams, such as a live video stream of the digital waiting room as well as the public combined live video stream. In addition, the live video streaming system can provide an indication to a participant device, such as a live video stream of the digital waiting room to the host device, that the pending participant devices are ready to join the public combined live video stream. Moreover, the live video streaming system can transition the pending participant devices from the digital waiting room to the public combined live video stream, as further described below.

Similarly, the live video streaming system can generate a digital post-participation room (e.g., a prior participant room) where participant devices in the public combined live video stream can wait "off-camera" until the public combined live video stream ends. In some implementations, the live video streaming system provides a digital post-participation room interface to former participant devices in the digital post-participation room that includes a live video stream of the digital post-participation room as well as the public combined live video stream. As described below, a former participant device in the digital post-participation room can rejoin the public combined live video stream or transfer to an after broadcast room at or near the end of the public combined live video stream.

Moreover, the live video streaming system can generate an after broadcast room. In various implementations, the after broadcast room includes participant devices that participated in the public combined live video stream. For example, the live video streaming system generates the after broadcast room by transferring participant devices participating in the public combined live video stream at the end of the stream to the after broadcast room. The live video streaming system can also transfer former participant devices from a digital post-participation room to the after broadcast room and/or convert the digital post-participation room into the after broadcast room. In some instances, the after broadcast room is private and closed to viewer devices. In other instances, a select group of viewer devices is allowed to access the live video stream of the after broadcast room, as further detailed below.

In various implementations, the host device or a non-participant device (i.e., a non-video-participant device) can set up participation triggers in connection with the digital rooms. In various implementations, participation triggers provide a framework, structure, or agenda for the public combined live video stream. For example, in some implementations, participation triggers specify a lineup of participants that are to join the public combined live video stream at different times. In these implementations, participation triggers can include a participation trigger for adding a viewer device to the public combined live video stream, a participation trigger for removing a participant device from the public combined live video stream, a participation trigger for transitioning a participant device from a preparation room to the public combined live video stream, and a participation trigger for transitioning a participant device from the public combined live video stream to a digital waiting room.

As mentioned above, the live video streaming system can add viewer devices to the public combined live video stream during the video stream. For example, in various implementations, the live video streaming system broadcasts a public combined live video stream to a set of viewer devices. During the live broadcast, the live video streaming system identifies activity metrics associated with the set of viewer devices. Then, based on analyzing the activity metrics, the live video streaming system can identify a target viewer device from the viewer devices to participate in the public combined live video stream. Indeed, the live video streaming system can add the identified target viewer device to the public combined live video stream. Additionally, the live video streaming system can also determine participant devices to remove from the public combined live video stream based on activity metrics.

The live video streaming system can analyze a variety of activity metrics to identify a target viewer device. Examples of activity metrics include, but are not limited to active presence metrics, viewing time metrics, digital voting metrics, digital bidding metrics, digital purchase metrics, host input metrics, turn or interval-based metrics, and random selection metrics. Each of these activity metrics is further described below.

In various implementations, the live video streaming system identifies which activity metrics to analyze based on one or more selected participation triggers. As mentioned above, a host device (or another participant device) can select one or more participation triggers to serve as a framework for the public combined live video stream. In one or more implementations, participation triggers can correspond to adding, removing, and swapping out viewer devices with respect to the public combined live video stream. For example, one or more participation triggers correspond to how and when to add or remove a viewer device from the public combined live video stream. Indeed, in these implementations, the live video streaming system can identify a target viewer device based on identifying a particular activity metric from the target viewer device that satisfies a participation trigger from the one or more selected participation triggers.

Participation triggers for adding and removing viewer devices from the public combined live video stream can correspond to a variety of rules, settings, and themes. For example, participation triggers can correspond to digital games that involve the viewer devices to play. As another example, participation triggers can correspond to competitions where viewer devices compete to (e.g., show a skill, vote, bid, etc.) to become a participant in the public combined live video stream. In some examples, participation triggers are based on digital purchases. Still, in other examples, participation triggers can prioritize random selection. As described below, a selected participation trigger can indicate to the live video streaming system which activity metrics to monitor and analyze, as further detailed below.

In one or more implementations, the live video streaming system can facilitate and provide uniform layouts to the viewer devices. For example, the live video streaming system can generate a uniform visual arrangement (e.g., layout) of the public combined live video stream where each live video stream is correctly synchronized in time. The live video streaming system can provide this uniform layout to the viewer devices. In this manner, each viewer device shares the same experience of the public combined live video stream. In some implementations, however, the live video streaming system generates one or more alternative visual arrangements, which are also correctly synchronized in time, and provides a viewer device with a requested visual arrangement. In any case, the live video streaming system generates and provides a handful of layouts of the public combined live video stream rather than each viewer device trying to generate a separate layout.

In some implementations, the live video streaming system can facilitate the recovery of a lost public combined live video stream. For example, the live video streaming system can detect when a host device drops from a public combined live video stream. Here, the live video streaming system can provide the host device with options to resume the public combined live video stream, as further described below. In some implementations, the live video streaming system provides the public combined live video stream to the participant devices and the viewer devices utilizing different communication protocols, which enables the live video streaming system to better recover a lost public combined live video stream, as described below.

As mentioned above, conventional video sharing systems suffer from a number of technical drawbacks in relation to efficiency, flexibility, and accuracy of operation. To illustrate, conventional video sharing systems are often inefficient. For example, many conventional systems inefficiently rely on client devices to perform the majority of functions with respect to displaying multiple live video streams provided by other users. As an initial matter, many client devices, particularly mobile client devices, have limited hardware capabilities. Accordingly, these client devices can easily become overburdened as the number of live video streams increases or as the quality of the live video stream improves. Overall, these inefficiencies lead to poor performances at the client device and poor user experiences.

In addition, in many instances, conventional systems cause client devices to inefficiently perform duplicative tasks. To illustrate, for a broadcast of multiple live video streams, each client device that displays the live video stream is provided with each of the live video streams. Next, each client device individually compiles the streams into a layout and displays the layout of the multiple live video streams Causing each client device to perform similar and redundant functions as each other is inefficient and results in a large amount of computational waste. Further, conventional systems that cause each client device to receive each live video stream inefficiently waste bandwidth.

In addition, conventional systems are inflexible with respect to computing device operations. As mentioned above, conventional systems that rely on client devices to perform the bulk of operations are limited in their operational capabilities, including the number of technical features they can provide. Indeed, conventional systems are often unable to perform a number of operations when relying on client devices that have limited hardware capabilities. To illustrate, for reasons previously mentioned, conventional systems often are limited to displaying multiple live video streams at a lower resolution. In addition, conventional systems are limited to a small number of multiple live video streams at the same time.

Moreover, conventional systems often are unable to provide additional technical features. For example, conventional systems do not provide multiple digital rooms where video participants can wait while also viewing the live video streams. Similarly, conventional systems do not provide a host device with indications when other participant devices are ready to join the live video streams (e.g., waiting in a digital waiting room). Instead, conventional systems are rigidly fixed to a limited set of options.

Further, conventional systems frequently result in inaccuracies of operation. For instance, because each client device individually compiles multiple live video streams together, a display of multiple live video streams on one client device does not synchronize with those on another client device. Indeed, for two live video streams that are captured at the same time, a first client device may compile the first live video stream to display ahead in time of the second live video stream. Further, a second client device may display the second live video stream ahead of the first live video stream. As additional live video streams are introduced, the possibility for error and inaccuracy increases. These inaccuracies can result in viewer confusion and frustration as what is being captured is not what viewers are experiencing on their respective client devices.

In contrast, the live video streaming system can provide several technical advantages and benefits over conventional systems. More particularly, in many implementations, the live video streaming system resides at a server device that provides increases in efficiency, flexibility, and accuracy. As one example of improved efficiency, the live video streaming system can easily scale as the number of live video streams increases and/or the quality of live video stream improves without becoming overburdened. Indeed, the live video streaming system can utilize a server device that provides additional hardware capabilities over most client devices, which enables the live video streaming system to efficiently join a large number of live video streams into a public combined live video stream.

In addition, the live video streaming system can generate a public combined live video stream that is shared with each of the viewer devices displaying the public combined live video stream. For example, rather than having each client device receive and individually process all of the live video streams from each participant device, the live video streaming system generates the public combined live video stream at a central location into a uniform layout. Then, the live video streaming system can provide each of the viewer devices with the single public combined live video stream arranged in the same layout. Not only does this reduce each client device from inefficiently performing duplicative tasks, but it also reduced bandwidth as the number of the live video stream being provided to the viewer devices is reduced to the public combined live video stream.

Further, the live video streaming system can provide improvements in flexibility over conventional video sharing systems. Unlike conventional systems that utilize client devices having limited capabilities, the live video streaming system can utilize one or more server devices to implement numerous operations and technical features. Indeed, as mentioned above, the live video streaming system can flexibly scale to accommodate a large number of participant devices that each provide a live video stream. Further, the live video streaming system can dynamically adjust the video quality being provided to each participant device, including broadcasting the public combined live video stream to viewer devices at a higher resolution.

As another example, the live video streaming system can provide features not available to conventional systems. For example, the live video streaming system can provide digital rooms where video participants can wait while also viewing the public combined live video stream. Likewise, the live video streaming system can provide a host device or participant devices with video streams of one or more digital rooms while also displaying a public combined live video stream to those same devices. Indeed, as further described below, the live video streaming system can flexibly and dynamically provide one or more simultaneous live video streams (e.g., often one or more public combined live video stream s) to participant devices before, during, and after a public combined live video stream session. Moreover, as described below, the live video streaming system can provide additional operations, options, and features with respect to live video streams often not achievable by rigidly constrained conventional systems.

Furthermore, the live video streaming system can provide improved accuracy over conventional video sharing systems. To illustrate, the live video streaming system can synchronize each of the live video streams before generating the public combined live video stream. Further, the live video streaming system can generate a unified layout for the public combined live video stream. In this manner, each viewer device is provided with the same experience as intended by the host device and/or the other participant devices, rather than each viewer device generating a potentially separate experience.

In addition, as mentioned above, the live video streaming system can provide a streamlined user interface that reduces interactions and time by users of participant devices (including at the host device). As described, the live video streaming system can provide a dynamic user interface to the host device or other participant devices that automatically updates to show pending participants about to join the public combined live video stream or past participants. Indeed, the live video streaming system can generate and provide dynamic user interfaces that show both the public combined live video stream as well as a live video stream of a digital room that includes pending or past participants. Further, the live video streaming system provides elements within these dynamic user interfaces that allow a host device (or another participant device) to adds a live video stream from a digital room to the public combined live video stream without having to navigate away from or leave the public combined live video stream.

As indicated by the foregoing discussion, the present disclosure utilizes a variety of terms to describe the features and advantages of the live video streaming system. For example, as used herein, the term "live video" refers to digital audiovisual data captured and shared in real-time (non-time shifted) or near-real-time. Commonly, a live video is a video that is captured and broadcast simultaneously. Examples of live video include, but are not limited to, digital video files, digital audio files combined with digital photos, and/or streaming content. Accordingly, a live video may include media such as images, video, audio, text, animations, or any other audio/visual content that may be transmitted over a communication network in the form of a live video stream. Additionally, the term "live video stream," as used herein, refers to a transmission or broadcast of live video. Generally, a live video stream includes live or near-live transmissions of media.

When multiple participant devices share live video streams as part of a coordinated effort, the live video streaming system can generate a combined live video stream that includes the live video streams from each participant device. As used herein, the term "combined live video stream" refers to a single live video stream that is a composite of multiple live video streams from participant devices. Further, when a combined live video stream is shared with viewer devices (e.g., an audience of non-participant devices), the combined live video stream can become a public combined live video stream. Indeed, the live video streaming system can share a public combined live video stream with viewer devices as a single public combined live video stream.

In general, a public combined live video stream can include a live video stream shared with an audience of viewer devices. However, the live video streaming system can also generate combined live video streams that are associated with digital rooms. For example, if two or more pending participant devices are in a digital waiting room, the live video streaming system can generate a combined live video stream of the digital waiting room that includes the live video streams from the pending participant devices. In some implementations, the live video streaming system can provide the live video stream of the digital waiting room to the pending participant devices and/or one or more participant device currently participating in the public combined live video stream (e.g., a host device), and without broadcasting the live video stream of the digital waiting room to the viewer devices.

As used herein, the term "participant device" refers to a client device that is participating in a combined live video stream. For instance, a participant device provides a live video stream to the live video streaming system (when appropriate permissions are granted) for the live video streaming system to include the live video stream in a combined live video stream (including a public combined live video stream). In some implementations, a participant device can include a host device that initiates and controls a public combined live video stream. In general, a host device is a participant device that has access to additional settings and authorizations of a public combined live video stream. For example, a host device can select participation triggers that serve as a framework or agenda for a public combined live video stream. In additional implementations, one or more of the participant devices are also granted the same or similar additional settings and authorizations as the host device. Further, as detailed below, a non-participant device (e.g., a stage manager device) can also perform functions of a host device without providing a live video stream to the live video streaming system.

As mentioned above, a participant device can include a pending participant device (e.g., a participant device waiting to join the public combined live video stream) as well as a former participant device (e.g., a participant device that previously participated on the public combined live video stream and is no longer participating) In general, while pending participant devices and former participant devices are not currently participating in the public combined live video stream, they can still provide a live video stream to the live video streaming system, which the live video streaming system keeps active and/or adds to a digital room. Otherwise, they can become viewer devices.

The term "viewer device," as used herein refers to a computing device that receives and consumes a public combined live video stream. In various implementations, a viewer device can provide written or graphical feedback within a public combined live video stream. Generally, a viewer device does not participate in a public combined live video stream by sending a live video stream to the live video streaming system for inclusion in the public combined live video stream. However, in some implementations, the live video streaming system can identify a viewer device (e.g., a target viewer device) to participate in the public combined live video stream. In these implementations, the live video streaming system converts the viewer device into a participant device when their live video stream is added to the public combined live video stream.

As used herein, the term "digital room" refers to a virtual location or collection of participant devices for sharing live video streams. For example a digital room can include a collection of one or more participant devices portraying a live video stream (without currently participating in a public combined live video stream broadcasted to public viewer devices). In particular, a digital room can include a collection of participant devices each transmitting a live video stream and receiving a combined live video stream from the live video streaming system. For instance, the term digital room refers to one or more live video streams provided to the live video streaming system that is not currently being added to the public combined live video stream being broadcast to other viewer devices.

An example of a digital room includes a digital preparation room where one or more participant devices gather before broadcasting a public combined live video streams to viewer devices. Another example includes a digital waiting room where one or more participant devices (e.g., pending participant devices) wait before joining a public combined live video stream broadcast to other viewer devices. Other examples of digital rooms include a digital post-participation room and an after broadcast room. Further, the live video streaming system can generate multiple instances of a digital room as well as generate and provide different digital room interfaces to participant devices within the different digital rooms.

As used herein, the term "activity metric" refers to a measure of digital participation, digital events, or digital interactions of viewer devices and/or participant devices associated with a public combined live video stream. For instance, the term activity metric refers to implicit or explicit activity data provided by, or detected from, viewer devices displaying the public combined live video stream and/or participant devices. The live video streaming system can analyze one or more activity metrics to determine a participation level or participation willingness of a viewer device and/or participant device. As further described below, activity metrics can include active presence metrics, viewing time metrics, digital voting metrics, digital bidding metrics, digital purchase metrics, host input metrics, turn or interval-based metrics, and random selection metrics.

The term "participation trigger," as used herein, refers to a condition associated with a public combined live video stream. For instance, a participation trigger can provide a framework, structure, and/or agenda for a public combined live video stream. In various implementations, one or more participation triggers form an algorithm or set of rules for conducting the public combined live video stream. For example, participation triggers can include rules with respect to the beginning and ending the public combined live video stream, determining who can participate in the public combined live video stream (e.g., eligibility requirements), and transitioning participant devices in and out of digital rooms. As another example, participation triggers can indicate how to identify a target viewer device to add to the public combined live video stream, remove a participant device from the public combined live video stream, and/or swap a participant device with a viewer device. Participation triggers are further described below.

Additional detail will now be provided regarding one or more implementations of the live video streaming system in relation to the illustrated figures. As an overview, FIGS. 1-3 correspond to the live video streaming system generating and broadcasting public combined live video streams; FIGS. 4-15 correspond to the live video streaming system generating and utilizing digital rooms in connection with a public combined live video stream; FIGS. 16-20 correspond to dynamically adding, removing, and switching participant devices within a public combined live video stream; and FIG. 21 corresponds to the live video streaming system recovering a dropped instance of a public combined live video stream.

For example, FIG. 1 illustrates a block diagram of a system environment 100 (or "system 100") for implementing a live video streaming system 106 in accordance with one or more implementations. As shown, the system 100 includes a server device 102 hosting a networking system 104 and a live video streaming system 106. The system 100 further includes client devices, such as a host device 108, participant devices 110, and viewer devices 112, which can communicate with the live video streaming system 106 via a network 120.

The server device 102 can include one or more computing devices to implement the networking system 104 and/or the live video streaming system 106. In one or more implementations, the server device 102 can implement all or a portion of the networking system 104 and/or the live video streaming system 106. For example, in some embodiments, the server device 102 comprises a content server and/or a data collection server. The server device 102 can also comprise an application server, a communication server, a web-hosting server, a social networking server, or a digital content management server. Additionally, the host device 108, participant devices 110, and the viewer devices 112 can include various types of computing devices, such as a mobile computing device. Additional description regarding the illustrated devices (102, 108, 110, and 112), as well as the network 120, is provided with respect to FIGS. 23 and 24 below.

As mentioned above, the server device 102 includes the networking system 104. In one or more implementations, the networking system 104 may generate, store, receive, and transmit various types of data, including networking data and content items (e.g., live streams, images, video, audio, text, etc.) shared by users of the networking system 104. Accordingly, the networking system 104 can connect users together and enable users to share content items with each other. In various implementations, the networking system 104 can include a social networking system, an electronic messaging system, or another type of networking system that enables users to communicate with each other. Additional detail regarding the networking system 104 is provided below in connection with FIGS. 24 and 25.

The networking system 104 can include the live video streaming system 106. In alternative implementations, the live video streaming system 106 is implemented separately from the networking system 104 on the server device 102 or another computing device. In various implementations, the live video streaming system 106 facilitates receiving, generating, combining, compositing, synchronizing, arranging, converting, broadcasting, sharing, editing, and/or otherwise managing live video streams. For example, the live video streaming system 106 can combine live video streams from multiple participant devices 110 into a combined live video stream and broadcast it as a public combined live video stream to the viewer devices 112. Additional detail regarding implementations of the live video streaming system 106 is provided in the subsequent figures.

Moreover, the networking system 104 and/or the live video streaming system 106 can comprise one or more applications running on the server device 102 or a portion can be downloaded from the server device 102. For example, the live video streaming system 106 can include a web hosting application that allows the client devices to interact with content hosted at the server device 102.

As noted above, the system 100 includes client devices such as the host device 108, the participant devices 110, and the viewer devices 112. In general, the host device 108 initiates a combined live video stream that also includes the participant devices 110. Indeed, a combined live video stream includes live video streams from both the host device 108 and the participant devices 110. In one or more implementations, the live video streaming system 106 provides the host device 108 with additional access to settings, permissions, authorization, etc. for a combined live video stream. In some implementations, the live video streaming system 106 grants one or more participant devices 110 the same or similar access. As mentioned above, the host device 108 can be one of the participant devices 110 during a combined live video stream, as represented by the solid one-way line from the host device 108 to the participant devices 110.

The viewer devices 112 can receive a combined live video stream from the live video streaming system 106. For example, live video streaming system 106 provides a combined live video stream from the participant devices 110 (including the host device 108) to the viewer devices 112. In some implementations, a viewer device can become a participant device, as indicated by the dashed two-way line between the viewer devices 112 and the participant devices 110. For instance, the live video streaming system 106 identifies a target viewer device from the viewer devices 112 to participate in a public combined live video stream, as further described below. Further, the live video streaming system 106 can cause a participant device (e.g., a former viewer device) to transition back to being a viewer device during a public combined live video stream, as further described below.

As illustrated, the host device 108, the participant devices 110, and the viewer devices 112 each include a networking system application 114 that corresponds to the live video streaming system 106. In various implementations, the networking system application 114 can optionally include computer-executable instructions that, when executed by a client device, causes the client device to perform certain functions as described herein. In many implementations, the networking system application 114 is downloaded, received, accessed, and/or provided (directly or indirectly) from the live video streaming system 106 and/or networking system 104 on the server device 102.

Generally, the networking system application 114 enables a user of a client device to participate in a live video stream, view a live video stream, and otherwise interact with the live video streaming system 106 and/or networking system 104. For example, the networking system application 114 includes a web application (e.g., a web browser) to allow a client device to access, view, and/or interact with a webpage or website hosted at the server device 102. In another example, the networking system application 114 is a stand-alone mobile application related to the live video streaming system 106 and/or downloaded from the server device 102 (e.g., in part or in full).

Although the system 100 of FIG. 1 is illustrated in a particular arrangement, various additional arrangements are possible. For example, the live video streaming system 106 can be implemented in whole or in part on another device (e.g., one or more of the client devices perform some or all of the functions of the live video streaming system 106). Similarly, although the system 100 is depicted as having various components, the system 100 may have additional or alternative components. For instance, the system 100 can include multiple host devices (e.g., co-hosts). In another instance, the system 100 can include a social networking system on a separate computing device that communicates with the server device 102 and the networking system 104.

Figure 2:
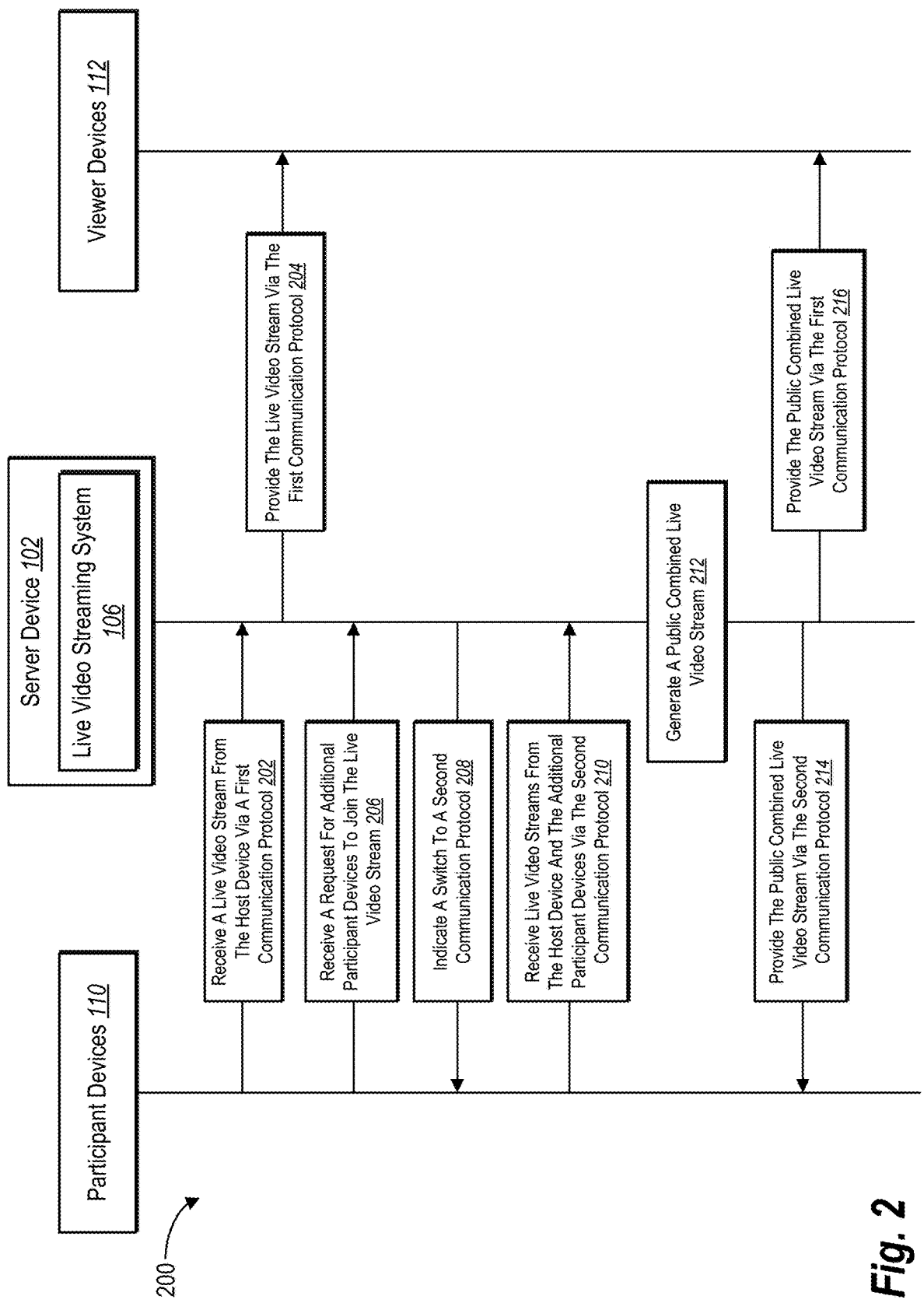
FIG. 2 illustrates a sequence diagram of generating and broadcasting a public combined live video stream to viewer devices in accordance with one or more implementations.

Turning now to FIG. 2, additional detail is provided regarding the live video streaming system 106 providing a public combined live video stream to viewer devices 112. In particular, FIG. 2 illustrates a sequence diagram of a series of acts 200 of the live video streaming system 106 generating and broadcasting a public combined live video stream to viewer devices 112 in accordance with one or more implementations. As shown, the series of acts 200 includes the live video streaming system 106 communicating with the participant devices 110 (which can include a host device) and the viewer devices 112.

As shown, the series of acts 200 includes an act 202 of the live video streaming system 106 receiving a live video stream from the host device via a first communication protocol. For example, the host device 108 initiates a live video stream utilizing the networking system application disclosed above. In many implementations, the live video stream includes a video with sound captured by the host device or via a hardware device attached to the host device (e.g., an external camera or microphone).

As shown in the act 202, the host device can send the live video stream to the live video streaming system 106 utilizing a first communication protocol. For example, the live video stream is sent via a real-time messaging protocol (RTMP) or another protocol that prioritizes quality connections over latency speed (e.g., Facebook Video Protocol (FBVP)). Indeed, because only the host device in this example is providing a live video stream to the live video streaming system 106, the live video stream can be delayed ensuring a higher quality stream.

The series of acts 200 includes an act 204 of the live video streaming system 106 providing the live video stream via the first communication protocol to the viewer devices 112. For example, upon receiving the live video stream from the host device, the live video streaming system 106 notifies the viewer devices 112 (e.g., which are associated with users of the networking system that follow the host) that the host device is currently streaming live. In response, the viewer devices 112 can access the live video stream (e.g., via a networking system application). Further, the live video streaming system 106 can provide the live video stream to the viewer devices 112 via the first communication protocol that prioritizes video quality over speed.

In some implementations, the live video streaming system 106 buffers the live video stream at the server device 102 before broadcasting it to the viewer devices 112. For example, the live video streaming system 106 builds up a buffer of up to 30 seconds, which enables the live video streaming system 106 to provide multiple frames of the public combined live video stream to the viewer devices 112 via the first communication protocol. The buffer also enables the live video streaming system 106 to resend dropped or missing data packets before the viewer devices 112 play the corresponding portion of the public combined live video stream.

As shown, the series of acts 200 includes an act 206 of the live video streaming system 106 receiving a request for additional participant devices to join the live video stream. For example, in various implementations, while the host device is live streaming to the viewer devices 112, additional participant devices can request to participate in the live video stream. In some implementations, the host device invites the additional participant devices to participate in the live video stream.

In response to detecting the request from the additional participant devices to join the host device in the live video stream, the live video streaming system 106 can determine to change the communication protocol. To illustrate, the series of acts 200 includes an act 208 of the live video streaming system 106 indicating a switch to a second communication protocol to the participant devices 110. For example, to prepare for multiple participant devices 110, the live video streaming system 106 instructs the participant devices 110 to provide live video stream via a communication protocol that prioritizes low-latency over video quality, such as a real-time communication (RTC) protocol. In some instances, the second communication protocol has a latency of around 200 milliseconds.

As shown, the series of acts 200 includes an act 210 of the live video streaming system 106 receiving live video streams from the host device and the additional participant devices via the second communication protocol. As mentioned above, the second communication protocol can prioritize video packet delivery speed over video quality. Accordingly, when multiple participant devices 110 begin to participate, the live video streaming system 106 can switch from receiving a single live video stream from the host device via the first communication protocol to receiving multiple live video streams via the second communication protocol.

The series of acts 200 can include an act 212 of the live video streaming system 106 generating a public combined live video stream. For example, in various implementations, the live video streaming system 106 composites each of the live video streams received from the participant devices 110 at the server device 102 into a single public combined live video stream that displays the live video streams from the participant devices 110 as a unified video stream.

As noted above, by utilizing the server device 102 (or multiple server devices) to generate the public combined live video stream, the live video streaming system 106 can provide improvements in the areas of efficiency, flexibility, and accuracy. For example, utilizing the server device 102 rather than individual client devices allows the live video streaming system 106 to easily scale and add a large number of participant devices 110 to a public combined live video stream. Further, as disclosed above, the live video streaming system 106 can achieve uniformity in terms of synchronization and layouts for a public combined live video stream. Additionally, the live video streaming system 106 can provide public combined live video streams to viewer devices 112 at higher-definition resolutions. Moreover, by utilizing the server device 102, the live video streaming system 106 can provide a larger number of customizations and animations as a server device will largely offers additional computing resources over client devices.

In various implementations, as part of generating the public combined live video stream, the live video streaming system 106 can synchronize the live video streams. For example, the live video streaming system 106 can match timestamps from each of the live video streams from the participant devices 110 with each other to properly align the streams within the public combined live video stream. In this manner, the live video streaming system 106 generates the public combined live video stream as it was intended to be captured by the participant devices 110.

In addition, the live video streaming system 106 can arrange the received live video streams into an arrangement and dynamically update the layout based on activity metrics associated with the participant devices 110 (e.g., detecting when speakers change), as participant devices 110 enter and exit the public combined live video stream, and/or based on input provided by a participant device (e.g., the host device).

As shown, the series of acts 200 includes an act 214 of the live video streaming system 106 providing the public combined live video stream to the participant devices 110 via the second communication protocol. As mentioned above, the second communication protocol prioritizes latency, which is better suited for real-time communications, such as between each of the participant devices 110. Accordingly, the live video streaming system 106 provides the public combined live video stream back to the participant devices 110 such that the participant devices 110 can interact with each other naturally and in real time.

As shown, the series of acts 200 includes an act 216 of the live video streaming system 106 providing the public combined live video stream to the viewer devices 112 via the first communication protocol. For example, as described above, the live video streaming system 106 broadcasts the public combined live video stream to the viewer devices 112 via quality-prioritized communication protocols. Indeed, in some implementations, the live video streaming system 106 utilizes a buffer between 15-30 seconds to allow for that the public combined live video stream to be sent over to the viewer devices 112 at a higher quality level.

Thus, as shown in the series of acts 200, the live video streaming system 106 can send the public combined live video stream to the participant devices 110 in real time (around ~200 ms) while also sending a buffered version of the public combined live video stream to the viewer devices 112 at the same time. Indeed, utilizing different communication protocols enables the participant devices 110 to interact with each other naturally in real time while also enabling the viewer devices 112 to enjoy a rich high-quality version of the public combined live video stream (e.g., via a buffered version of the public combined live video stream).

As shown and described, FIG. 2 shows a series of acts 200 for first broadcasting a single live video stream to the viewer devices 112, then converting it to a public combined live video stream as additional participant devices 110 are added. In some implementations, however, the live video streaming system 106 can begin generating the public combined live video stream before providing it to the viewer devices 112. Indeed, as described below with respect to FIGS. 4-15, the live video streaming system 106 can utilize digital rooms (e.g., a digital preparation room) to first generate the public combined live video stream, then provide it to the viewer devices 112. In these implementations, the live video streaming system 106 can still utilize the different communication protocols, as described above.

Figure 3B:
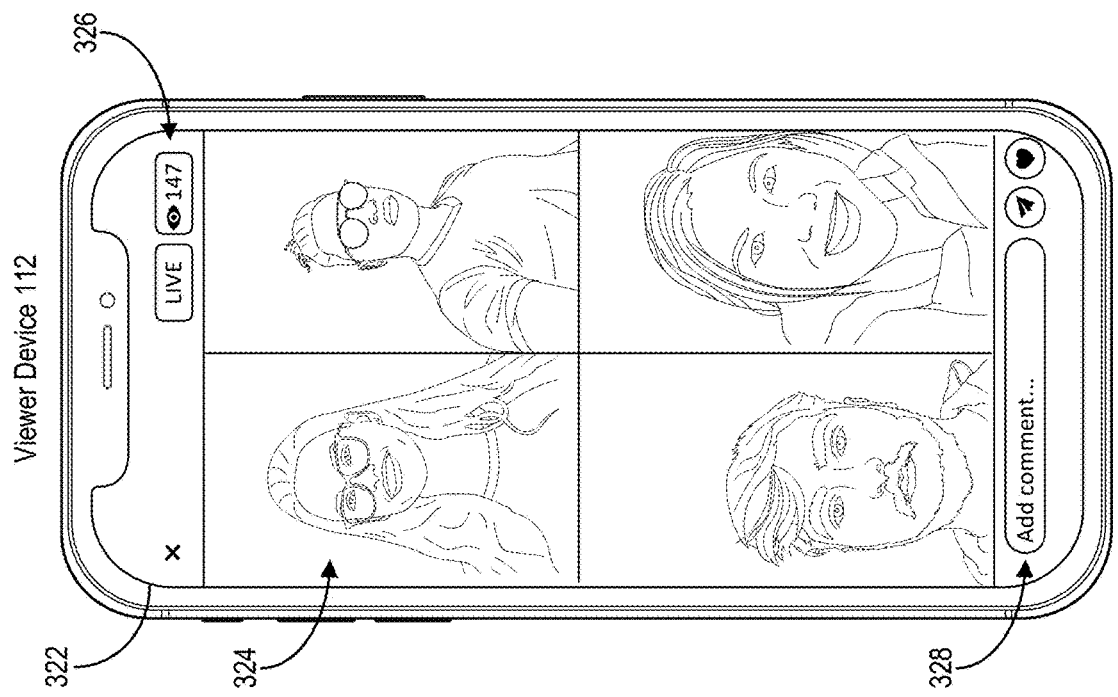
FIGS. 3A-3B illustrate graphical user interfaces for launching and broadcasting a public combined live video stream in accordance with one or more implementations.
Figure 3A:
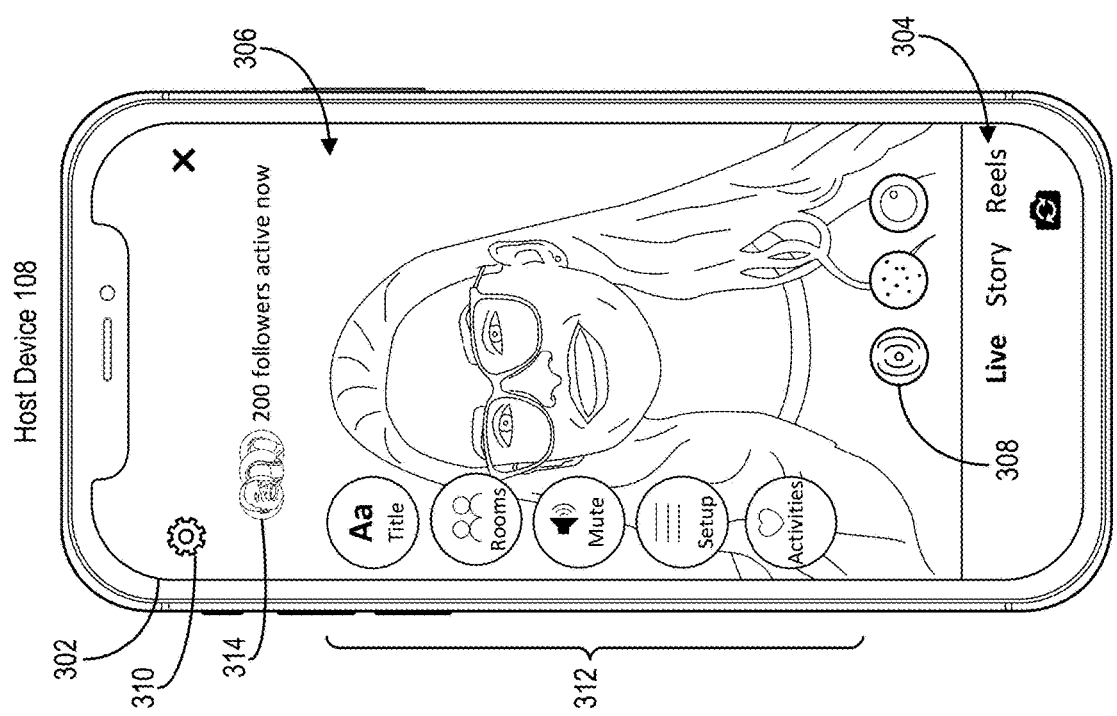

Turning now to FIGS. 3A-3B, visual examples and additional detail are provided with respect to the live video streaming system 106 providing a public combined live video stream to viewer devices 112. In particular, FIGS. 3A-3B illustrate graphical user interfaces for launching and broadcasting a public combined live video stream in accordance with one or more implementations. Indeed, FIGS. 3A-3B show how the live video streaming system 106 can cause a host device (e.g., FIG. 3A) and a viewer device (FIG. 3B) to update with respect to broadcasting a public combined live video stream. In various implementations, a networking system application corresponding to the live video streaming system 106 can display the user interfaces shown in FIGS. 3A-3B.

As illustrated, FIG. 3A includes the host device 108 (e.g., a participant device). The host device 108 includes a host graphical user interface 302 (or simply "host user interface 302") that includes elements, features, graphics, and options for requesting and starting a live video stream. As shown, the host user interface 302 corresponds to the host device 108 preparing to start a live video stream. Indeed, the bottom of the host user interface 302 shows a "Live" mode selected from a set of media sharing modes 304.

As mentioned above, the host device 108 can capture video (and audio), for example, utilizing a built-in camera and microphone. Accordingly, in some implementations, such as the illustrated implementation, the host user interface 302 displays images 306 captured by the host device 108. In addition, the host user interface 302 includes a start live broadcast element 308 for starting the live video stream.

Further, as shown, the host user interface 302 includes an application settings element 310 that can correspond to various preferences and settings with respect to the host device 108 and/or a networking system application (e.g., account settings, hardware settings, privacy settings, etc.). Additionally, the host user interface 302 can include live stream settings elements 312 that correspond to setting up and facilitating a public combined live video stream. For example, as shown, the live stream settings elements 312 include elements corresponding to adding a title to the public combined live video stream, setting up various digital rooms, changing the setup or scheme of the public combined live video stream, and adding activities to the public combined live video stream. Many of the live stream setting elements are further described below.

Moreover, as shown, the host device 108 can include various notification elements, such as an active followers indication 314. As shown, the active followers indication 314 indicates the number of users of the networking system that are currently logged on or active on the networking system. In many implementations, these followers can correspond to many of the viewer devices 112 that would watch a public combined live video stream.

As mentioned above, the host user interface 302 includes the start live broadcast element 308. Upon detecting selection of the start live broadcast element 308, the host device 108 can provide a live video stream of video captured at the host device 108 to the live video streaming system 106. Additionally, as other participant devices provide corresponding live video streams, the live video streaming system 106 can generate a combined live video stream, as previously described. Further, the live video streaming system 106 can broadcast the combined live video stream as a public combined live video stream to viewer devices 112 (as a single live video stream).

To illustrate, FIG. 3B shows a viewer device 112 having a viewer user interface 322 (or simply "viewer user interface 322"). As shown, the viewer user interface 322 includes the public combined live video stream 324 showing four participants. In addition, the viewer user interface 322 includes various notification elements, such as live broadcast indicators 326 (e.g., a live indicator and the current number of viewer devices watching the public combined live video stream). Further, the viewer user interface 322 can include communication elements 328 where the viewer device 112 can provide general or direct messages to the participant devices and/or other viewer devices as well as "like" a portion of the public combined live video stream.

The viewer device 122 can access the public combined live video stream from a variety of locations. For example, in one or more implementations, the viewer device 122 follows one of the participant devices (e.g., via social media) and receives a notification (e.g., a post, a story, an electronic message, a push notification, an invitation, etc.) indicating the existence of a public combined live video stream that includes the participant device. For instance, the live video streaming system 106 can maintain a list of viewer devices for each participant device. Then, when the participant device joins a public combined live video stream, the live video streaming system 106 can provide their followers with a notification. In some implementations, the notification itself is the public combined live video stream. In some embodiments, the live video streaming system 106 provides the public combined live video stream as part of social networking feeds of the viewer devices.

In some implementations, the live video streaming system 106 makes the live video streaming system 106 accessible through a link (e.g., a text or graphics link) on a website or within a networking system application the viewer device 122 while the live video streaming system 106 is broadcasting the public non-participant device. In various implementations, the live video streaming system 106 plays the public combined live video stream as an element within a website or within a networking system application the viewer device 122 (e.g., as an embedded video).

Figure 4:
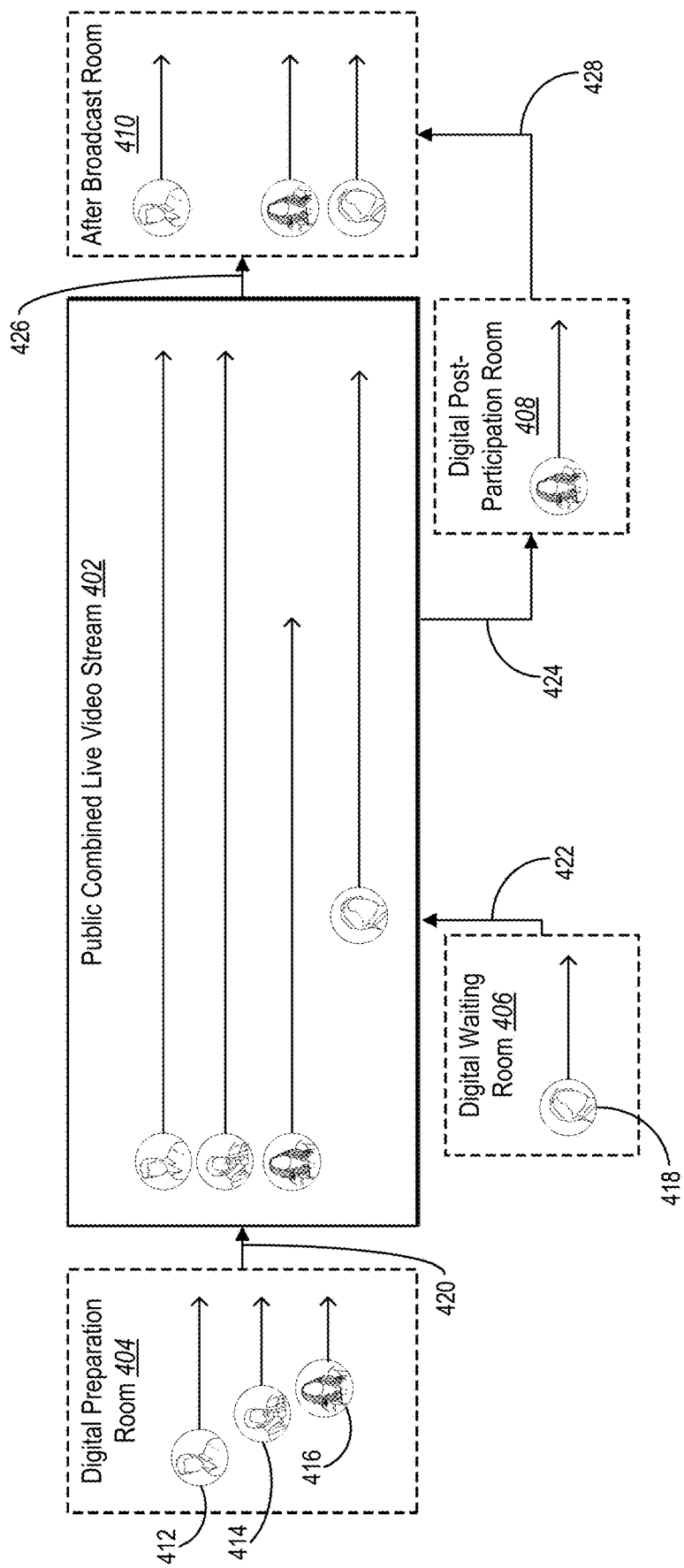
FIG. 4 illustrates an overview diagram of utilizing multiple digital rooms to improve a public combined live video stream in accordance with one or more implementations.

As mentioned above, FIGS. 4-15 provide additional detail regarding the live video streaming system generating and utilizing digital rooms associated with a public combined live video stream. To illustrate, FIG. 4 shows an overview diagram of utilizing multiple digital rooms to improve a public combined live video stream in accordance with one or more implementations. As shown, FIG. 4 includes a public combined live video stream 402 and multiple digital rooms 404-410 (indicated with dashed lines). As described below, the live video streaming system 106 can utilize digital rooms to seamlessly begin a public combined live video stream with multiple participant devices as well as add and remove participant devices from a current public combined live video stream.

Additionally, FIG. 4 shows multiple participant devices 412-418 (illustrated by icons) providing corresponding live video streams (illustrated as arrows attached to the participant devices) to the live video streaming system 106. As previously described, the live video streaming system 106 can combine the multiple live video streams into the public combined live video stream 402. Further, as described above, the live video streaming system 106 can provide the public combined live video stream 402 to viewer devices. A visual example of a combined live video stream is shown in FIG. 3B, as described above. Additional visual examples of combined live video streams are provided below with respect to FIGS. 7A-7B.

As shown in FIG. 4, the digital rooms 404-410 include a digital preparation room 404, a digital waiting room 406, a digital post-participation room 408, and an after broadcast room 410. In addition, each digital room includes one or more of the participant devices 412-418. In many implementations, while the live video streaming system 106 can provide live video streams from the digital rooms to other participant devices as described below, the live video streaming system 106 does not broadcast live video streams from the digital rooms to the viewer devices.

In FIG. 4, the digital rooms and the public combined live video stream 402 in FIG. 4 are arranged in a chronological manner, where time progresses from left to right. Thus, the digital preparation room 404 is created before the creation of the public combined live video stream 402 (i.e., the stream broadcast to other public viewing devices), the digital waiting room 406 and the digital post-participation room 408 are concurrent with the public combined live video stream 402, and the after broadcast room 410 occurs after the public combined live video stream 402.

As shown, FIG. 4 includes the digital preparation room 404. Generally, a digital preparation room enables participant devices to privately converse and prepare before broadcasting to live to a more public audience. As also shown, the digital preparation room 404 includes the first participant device 412 (e.g., a host device), a second participant device 414, and a third participant device 416. For example, the host device (i.e., the first participant device 412) creates and joins the digital preparation room 404. The second participant device 414 then joins the digital preparation room 404 followed by the third participant device 416.

In various implementations, the live video streaming system 106 can generate a combined (e.g., non-public) live video stream as a single live video stream of the digital preparation room 404 from the live video streams of the first participant device 412, the second participant device 414, and the third participant device 416. Further, the live video streaming system 106 can provide the live video stream of the digital preparation room 404 back to the participant devices in the room. For example, the live video streaming system 106 provides a digital preparation room interface to the participant devices that include the live video stream of the digital preparation room 404. Additional detail regarding generating and utilizing the digital preparation room 404 is provided below with respect to FIGS. 5-6B.

In many implementations, the live video streaming system 106 utilizes the digital preparation room 404 to generate the public combined live video stream 402. For example, based on detecting user input from a participant device within the digital preparation room 404, the live video streaming system 106 can transfer the live video streams of the participant devices in the digital preparation room 404 (e.g., the combined live video stream) to the public combined live video stream 402. As a result, the live video streaming system 106 can start broadcasting a combined live video stream that includes multiple participant devices, which are ready to participate, in an efficient and seamless manner.

As mentioned above, the live video streaming system 106 can also utilize digital rooms to add, remove, and swap out participant devices in connection with the public combined live video stream 402. For example, the live video streaming system 106 can utilize one or more digital waiting rooms to add participant devices to the public combined live video stream 402 after the public combined live video stream 402 has started. Indeed, the live video streaming system 106 can utilize digital waiting rooms to receive and optimize live video streams from pending participant devices before they are seamlessly joined to the public combined live video stream 402.

To demonstrate, FIG. 4 includes the digital waiting room 406. In various implementations, the live video streaming system 106 can utilize the digital waiting room 406 to transition pending participant devices into the combined live video stream 402, as shown by arrow 422. As illustrated, the digital waiting room 406 includes the fourth participant device 418 (e.g., a pending participant device) that is waiting to participate in the public combined live video stream 402. The digital waiting room 406 can include multiple pending participant devices, and in some cases, non-participant devices (e.g., a production manager device that assists the fourth participant device 418 in preparing for and joining the public combined live video stream 402).

In one or more implementations, the live video streaming system 106 generates a live video stream of the digital waiting room 406 and provides it to the pending participant device within the room. For example, the live video streaming system 106 can generate a digital waiting room graphical user interface (or simply digital waiting room interface) and provide it to pending participant devices in the digital waiting room 406. As described below, the digital waiting room interface can include both the live video stream of the digital waiting room 406 as well as the public combined live video stream 402.

Moreover, the live video streaming system 106 can provide the live video stream of the digital waiting room 406 to a participant device (e.g., the host device) within the public combined live video stream 402 as well as enable the participant device to request that one or more pending participant devices in the digital waiting room 406 be added to the public combined live video stream 402. To illustrate, the live video streaming system 106 receives a request to add the fourth participant device 418 (e.g., the pending participant device) to the public combined live video stream 402. In response, the live video streaming system 106 transitions the live video stream of the fourth participant device 418 from the live video stream of the digital waiting room 406 to the public combined live video stream 402, as shown in FIG. 4 by the arrow 422. Additional detail regarding the digital waiting room 406 is provided below in connection with FIGS. 8-9C.

As shown, FIG. 4 includes the digital post-participation room 408. In various implementations, the live video streaming system 106 can transition participant devices from the public combined live video stream 402 to the digital post-participation room 408. Generally, the live video streaming system 106 provides a digital post-participation room for former participant devices to wait "off-camera" who can later rejoin a public combined live video stream or join with the participant devices after a public combined live video stream ends. A digital post-participation room can include multiple former participant devices. Further, the live video streaming system 106 can create multiple digital post-participation rooms. Additionally, the live video streaming system combines a digital post-participation room with a digital waiting room into a single off-camera digital waiting room.

As FIG. 4 illustrates, the live video streaming system 106 removes the live video stream of the third participant device 416 from the public combined live video stream 402 and adds it to the digital post-participation room 408, as shown by the arrow 424. As mentioned above, in some implementations, the live video streaming system 106 drops a participant device from a public combined live video stream without adding their live video stream to a digital room. For example, upon no longer receiving the live video stream of a participant device, the live video streaming system 106 changes the participant device into a viewer device.

While in the digital post-participation room 408, the live video streaming system 106 can provide a digital post-participation room interface to the third participant device 416 (e.g., now a former participant device). For example, the live video streaming system 106 provides a live stream of the digital post-participation room 408 to each former participant device in the digital post-participation room 408. In various implementations, the live video streaming system 106 can also provide the live video stream of the digital post-participation room 408 to one or more participant devices (e.g., the host device) within the public combined live video stream 402. Additional detail regarding the digital post-participation room 408 is provided below in connection with FIGS. 10-11C.

As mentioned above, FIG. 4 includes the after broadcast room 410. Generally, an after broadcast room follows after a public combined live video stream. In one or more implementations, an after broadcast room includes some or all of the participant devices of a public combined live video stream, including former participant devices. In some implementations, only the participant devices are able to access, participate in, and/or view an after broadcast room. In alternative implementations, a limited number of viewer devices 112 are provided access to view the after broadcast room.

As shown, the after broadcast room 410 in FIG. 4 includes the first participant device 412 and the fourth participant device 418 from the public combined live video stream 402, as shown by arrow 426. For example, the live video streaming system 106 transfers the live video stream from the first participant device 412 and the fourth participant device 418 to the after broadcast room 410. In addition, the after broadcast room 410 includes the third participant device 416 that was waiting in the digital post-participation room 408. Similarly, the live video streaming system 106 transfers the live video stream of the third participant device 416 from the digital post-participation room 408 to the after broadcast room 410, as shown by the arrow 428.

In various implementations, the live video streaming system 106 provides an after broadcast room graphical user interface (or simply after broadcast room interface) to the participant devices in the digital room. For example, the after broadcast room interface includes one or more visual elements indicating to the participant devices that the after broadcast room is a private digital room or that a limited audience of viewer devices have access to the after broadcast room. Additional detail regarding the after broadcast room 410 is provided below in connection with FIGS. 12-13C.

Figure 5:
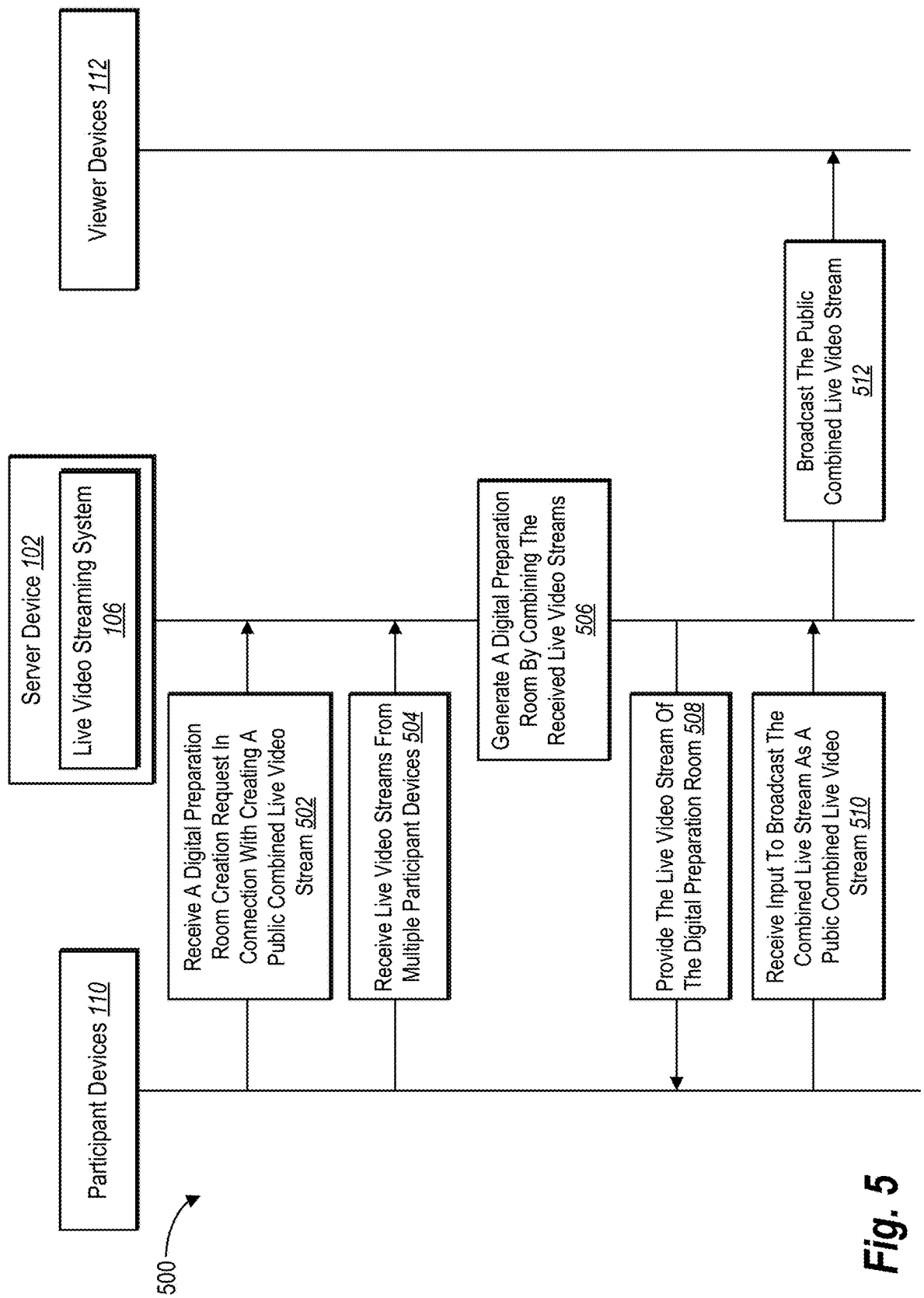
FIG. 5 illustrates a sequence diagram of generating and utilizing a digital preparation room in connection with a public combined live video stream in accordance with one or more implementations.

As mentioned above, FIGS. 5-6B provide additional detail regarding generating and utilizing the digital preparation room 404. For instance, FIG. 5 illustrates a sequence diagram of a series of acts 500 of the live video streaming system 106 generating and utilizing a digital preparation room in connection with a public combined live video stream in accordance with one or more implementations. As shown, the series of acts 500 includes the live video streaming system 106 communicating with the participant devices 110 (which can include a host device) and the viewer devices 112.

As illustrated, the series of acts 500 includes an act 502 of the live video streaming system 106 receiving a digital preparation room creation request in connection with creating a public combined live video stream from one of the participant devices 110. For example, in setting up a live video stream at a host device, the live video streaming system 106 detects a request to have multiple participant devices gather in a digital preparation room before broadcasting the combined live video stream to viewer devices as the public combined live video stream.

In some implementations, the digital preparation room creation request includes which participant devices to include in the digital preparation room. For example, the host device provides a list of participant devices to the live video streaming system 106, which then sends invitations out to join the digital preparation room. In alternative implementations, the live video streaming system 106 can create the digital preparation room and provide a shareable link to the digital room to the host device. Further, the live video streaming system 106 can grant access to any participant devices that access the digital preparation room via the link.

Additionally, in one or more implementations, the digital preparation room creation request can establish parameters of the digital room. For example, the request indicates a start and/or end time of the digital preparation room. In some instances, the end time corresponds to the start time of the public combined live video stream. Further, parameters can include minimum bandwidth and/or connection requirements (e.g., video quality metrics) for participant devices.

As illustrated, the series of acts 500 includes an act 504 of the live video streaming system 106 receiving live video streams from multiple participant devices 110. For example, in one or more implementations, the live video streaming system 106 receives a live video stream from a host device as well as one or more additional participant devices 110. As mentioned above, in various implementations, the live video streaming system 106 receives the live video stream at the server device 102.

In addition, as shown, the series of acts 500 includes an act 506 of the live video streaming system 106 generating a digital preparation room by combining the live video streams (e.g., generating a non-public combined live video stream). For instance, in various implementations, the live video streaming system 106 combines or composites the received live video streams (e.g., at the server device 102) into a digital preparation room live video stream (i.e., a live video stream for the digital preparation room).

In many implementations, the digital preparation room enables the participant devices 110 to be present and ready before starting the public combined live video stream. For example, before going live to the viewer devices 112, the digital preparation room provides the opportunity for each participant device to address and overcome technical hurdles (e.g., video and audio issues) of joining a public combined live video stream. For instance, the digital preparation room provides time for participant devices to commit their live video stream to the live video streaming system 106 (e.g., perform a two-way or three-way commitment handshake). In addition, the digital preparation room enables participant devices to grant permissions and authorizations for the live video streaming system 106 to share their live video stream.

Further, the digital preparation room provides the participant devices 110 with a real-world venue where equipment can be tested and verified, but with the security of being "off-camera." Moreover, the digital preparation room also allows for participant devices (e.g., users associated with the participant devices) to converse with each other and establish a plan or agenda for the public combined live video stream if one is not already in place.

Further, as shown, the series of acts 500 includes an act 508 of the live video streaming system 106 providing the live video stream of the digital preparation room to the participant devices 110. For example, the live video streaming system 106 can provide the live video stream of the digital preparation room within a digital preparation room graphical user interface (or simply a digital preparation room interface). In some implementations, the digital preparation room interface indicates that the live video stream of the digital preparation room is only being shown to the participant devices 110 within the digital preparation room.

In one or more implementations, the digital preparation room interface provides elements that enable one or more of the participant devices 110 to set up or modify the framework of the pending public combined live video stream. For example, the digital preparation room interface provides the host device (or another participant device) with options to modify a participant device lineup (e.g., which participant devices are to join the public combined live video stream and when) or to add an activity to the pending public combined live video stream. Further, the digital preparation room interface can provide elements to manage controls, permissions, and/or authorizations of the public combined live video stream, such as add other participant devices as moderators or co-host devices.

In some implementations, the digital preparation room interface includes a selectable broadcast element to transition the digital preparation room to the public combined live video stream. For example, the digital preparation room interface at a participant device includes a "Broadcast Room Live" or "Start Live Broadcast" graphical button or another virtual element. Upon detecting selection of the element, the live video streaming system 106 can begin broadcasting the live video stream of the digital preparation room as the public combined live video stream. In some implementations, the live video streaming system 106 updates the digital preparation room interface to a public combined live video stream graphical user interface (or simply live video stream interface).

To illustrate, the series of acts 500 includes an act 510 of the live video streaming system 106 receiving input to broadcast the public combined live video stream to the viewer devices 112. In one or more implementations, the live video streaming system 106 detects user input at the host device requesting that the digital preparation room be broadcast to the viewer devices 112. In alternative implementations, the live video streaming system 106 begins broadcasting the public combined live video stream to the viewer devices 112 at a predetermined time, as indicated by previously received input. In these implementations, the digital preparation room interface can include a countdown indicating the time until the digital preparation room goes live to the viewer devices 112.

In some implementations, the live video streaming system 106 can transition a subset of the participant devices 110 (e.g., less than all) from the digital preparation room to the public combined live video stream. For example, a non-video-participant device (e.g., a manager device) helps other participant devices get ready for the public combined live video stream and/or initiates the public combined live video stream does not join the public combined live video stream. As another example, one or more of the participant devices in the digital preparation room do remain in the digital preparation room at the start of the public combined live video stream. Here, the live video streaming system 106 can transition the digital preparation room to a digital waiting room at the start of the public combined live video stream.

As illustrated, the series of acts 500 includes an act 512 of the live video streaming system 106 broadcasting the public combined live video stream to the viewer devices 112. As described above, in some implementations, the live video streaming system 106 provides the live video stream of the digital preparation room to the viewer devices 112 as the public combined live video stream. In some implementations, the live video streaming system 106 utilizes the live video streams provided by the participant devices 110 in the digital preparation room to create a new and/or separate public combined live video stream, which is then provided to the viewer devices 112.

In one or more implementations, the act 512 includes the live video streaming system 106 first broadcasting the live video stream of a host device (e.g., of the participant devices 110) to the viewer devices 112. Then, the live video streaming system 106 adds the remaining participant devices 110 to the live video stream. For example, the public combined live video stream initially includes the live video stream of the host device, who first appears to introduce the additional participant devices. Then, the live video streaming system 106 adds the remaining participant devices (e.g., one-by-one, as a group, or in multiple groups). For instance, the host device provides input to the live video streaming system 106 as to who and/or when to add each of the participant devices to the public combined live video stream.

FIGS. 6A-6B illustrate graphical user interfaces of a digital preparation room on various client devices in accordance with one or more implementations. In particular, FIG. 6A shows a digital preparation room interface on the host device 108 and FIG. 6B shows a digital preparation room interface on a participant device 110. Indeed, FIGS. 6A-6B correspond to implementations where the live video streaming system 106 provides different digital preparation room interfaces to the host device 108 and the other participant devices 110.

As mentioned, FIG. 6A shows the host device 108 displaying a digital preparation room interface 602a (i.e., a digital preparation room graphical user interface). As shown, the digital preparation room interface 602a includes various notification elements, such as a room title 604 and the active followers indication 314. In addition, the digital preparation room interface 602a includes the live stream settings elements 312, which were introduced above. For example, the live stream settings elements 312 include elements corresponding to adding or changing the title of the public combined live video stream (or a digital room), changing the setup or scheme of the public combined live video stream, modifying the layout of one or more live video streams, adding activities to the public combined live video stream, and inviting participant devices to join the digital preparation room and/or the public combined live video stream. The live stream settings elements 312 can include additional, fewer, or different elements.

The digital preparation room interface 602a also includes the digital preparation room live video stream 606. As described above, the live video streaming system 106 (e.g., at a server device) can combine live video streams from each participant device to generate the digital preparation room live video stream 606. Further, the live video streaming system 106 can arrange the live video streams into a dynamic layout based on a default layout scheme or a layout scheme selected by the host device 108. Then, the live video streaming system 106 can provide the digital preparation room live video stream 606 to each of the participant devices (e.g., to both the host device 108 and the participant devices 110).

As shown in the top frame, the digital preparation room live video stream 606 includes content (e.g., audio and images) from the live video stream of the host device 108. Further, the digital preparation room live video stream 606 includes content from two participant devices shown in the bottom left and right frames. Indeed, while the digital preparation room live video stream 606 appears as separate live video streams at the host device 108, the live video streaming system 106 can provide the digital preparation room live video stream 606 to the host device 108 as a single, uniform live video stream.

In addition, the digital preparation room interface 602a includes participant device removal elements 608 for the host device 108 to remove a participant device. Based on detecting selection of a participant device removal elements 608 corresponding to a target participant device, the live video streaming system 106 can drop the target participant device. In some implementations, the live video streaming system 106 can provide instructions to the host device 108 as to where to locate each of the participant device removal elements 608 over the digital preparation room live video stream 606 so that each element corresponds to a different participant device. In alternative implementations, the live video streaming system 106 allows the host device 108 to remove participant devices using other approaches, such as from a drop-down list or from a live stream settings element.

As mentioned above, the digital preparation room interface 602a can include a selectable element to transition the digital preparation room to the public combined live video stream. To illustrate, the digital preparation room interface 602a includes a live broadcast element 610 (e.g., the button that reads "Broadcast Room Live") at the top of the room interface. Upon detecting selection on the live broadcast element 610, the live video streaming system 106 can convert the digital preparation room live video stream 606 to a public combined live video stream, as described previously. For example, the live video streaming system 106 can instantaneously transition the combined live video stream of the participant devices (e.g., the digital preparation room live video stream) to the public combined live video stream, provide a countdown within the digital preparation room interface 602a indicating when the change will occur, and/or provide an option to transition to the public combined live video stream at a future time (e.g., in 1 minute or at 7:00 PM).

FIG. 6B illustrates a participant device 110 that includes a digital preparation room interface 602b. Here, the participant device can correspond to the participant shown in the bottom right section. As shown, the digital preparation room interface 602b differs from the digital preparation room interface 602a shown on the client device in FIG. 6A. Indeed, in various implementations, the live video streaming system 106 can provide different versions of the digital preparation room interface to a host device than to other participant devices. In some implementations, however, the live video streaming system 106 can provide a host device and one or more of the participant devices with the same digital preparation room interface.

As shown in FIG. 6B, the digital preparation room interface 602b includes various notification elements, such as the room title 604 and a non-broadcast notification 612. In various implementations, the non-broadcast notification 612 provides additional information to the participant device 110 that the digital preparation room live video stream 606 is not being sent to viewer devices, but only send to participant devices in the digital preparation room.

In addition, the digital preparation room interface 602b includes the digital preparation room live video stream 606. In many implementations, the live video streaming system 106 provides the same digital preparation room live video stream 606 to the participant device 110 as is provided to the host device 108. In alternative implementations, the live video streaming system 106 sends a different digital preparation room live video stream to a participant device (e.g., arranged in an alternate arrangement).

Further, the digital preparation room interface 602b includes an exit live video stream element 614. For example, the participant device 110 can exit the digital preparation room (and/or a corresponding combined live video stream) by selecting the exit live video stream element 614. In some implementations, upon selecting the exit live video stream element 614, the live video streaming system 106 provides various options to the participant device 110, such as transferring to another digital room, as described below.

Figure 7C:
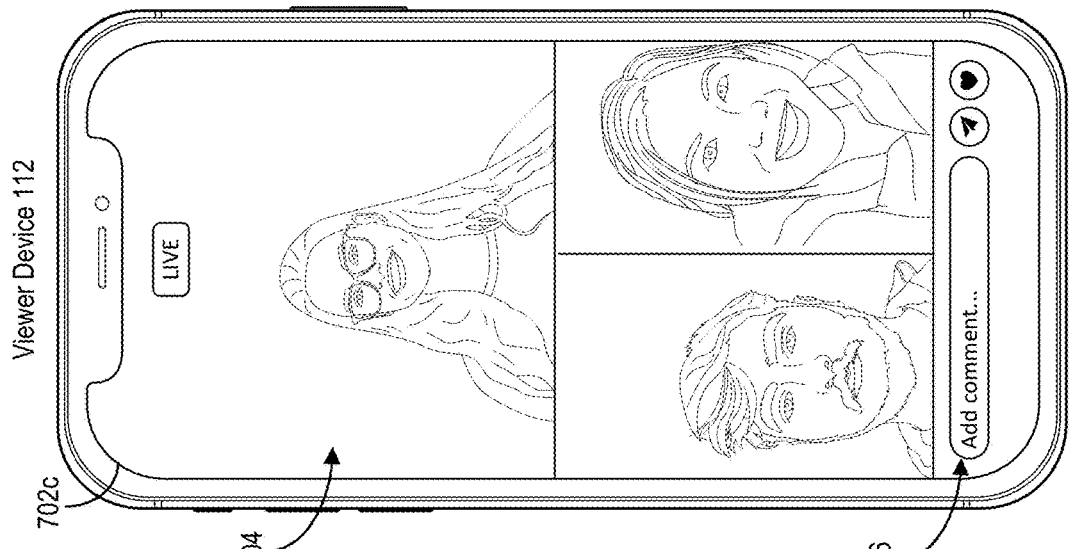
FIGS. 7A-7C illustrate graphical user interfaces of a public combined live video stream on various client devices in accordance with one or more implementations.
Figure 7B:
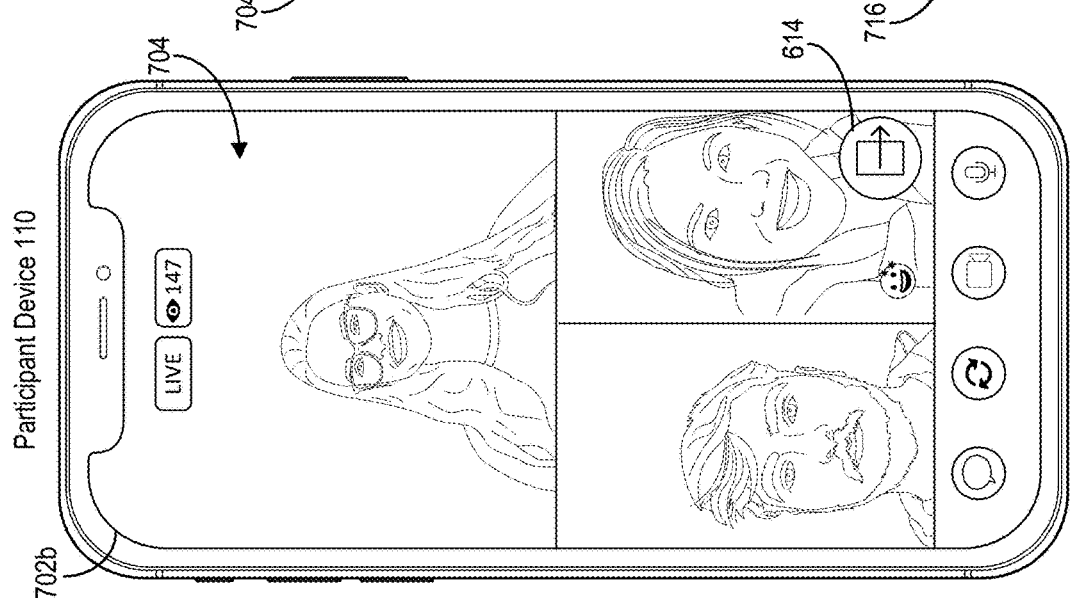
Figure 7A:
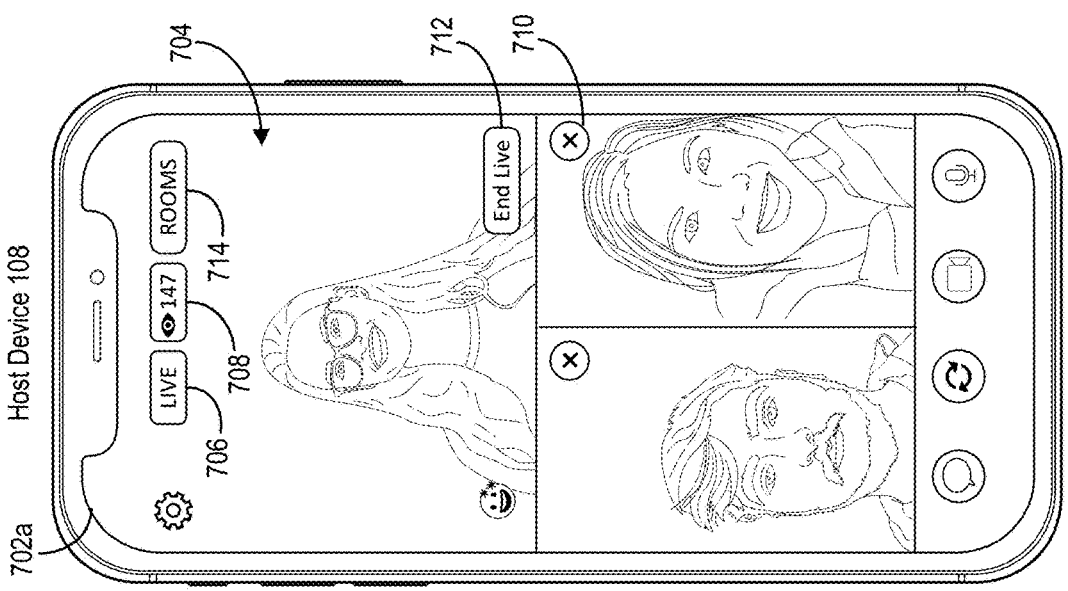

Turning now to FIGS. 7A-7C, additional description is provided with respect to the live video streaming system 106 facilitating a public combined live video stream across various client devices. For example, FIGS. 7A-7C illustrate graphical user interfaces of a public combined live video stream on various client devices in accordance with one or more implementations. In particular, FIG. 7A corresponds to a public combined live video stream displayed on the host device 108. FIG. 7B corresponds to a public combined live video stream displayed on the participant device 110. FIG. 7C corresponds to a public combined live video stream displayed on a viewer device 112.

As shown in FIG. 7A, the host device 108 includes a public combined live video stream interface 702a (i.e., a public combined live video stream graphical user interface). The public combined live video stream interface 702a includes a public combined live video stream 704. As described above, the live video streaming system 106 can generate the public combined live video stream 704 from combining the live video streams received from participant devices. Indeed, while the public combined live video stream 704 can appear as multiple live video streams within the public combined live video stream interface 702a, the public combined live video stream 704 is a single live video stream provided by the live video streaming system 106, as described above.

As also shown, the public combined live video stream interface 702a includes notification elements, such as a live-broadcast notification 706 and an active viewers count 708 and/or a number of participant devices (not shown). The public combined live video stream interface 702a also includes participant device removal elements 710. Based on detecting selection of a participant device removal elements 710 corresponding to a target participant device, the live video streaming system 106 can drop the live video stream of target participant device and/or move the live video stream of the target participant device from the public combined live video stream 704 to a digital room, such as a digital post-participation room.

Further, the public combined live video stream interface 702a includes an end broadcast element 712. In various implementations, upon selecting the end broadcast element 712, the live video streaming system 106 ends broadcasting the public combined live video stream to the participant devices and the viewer devices 112. In some implementations, upon selecting the end broadcast element 712, the live video streaming system 106 prompts the host device 108 whether to end broadcasting the public combined live video stream and/or to move the live video streams of one or more participant devices to a digital room, such as an after broadcast room.

In one or more implementations, the public combined live video stream interface 702a includes a digital rooms element 714. As mentioned above, the live video streaming system 106 can generate and utilize various digital rooms to facilitate transitioning participant devices in and out of the public combined live video stream 704. Accordingly, when one or more participant devices are present in a digital room, the public combined live video stream interface 702a can surface (e.g., cause to appear, emphasize, or change the appearance of) the digital rooms element 714. Upon selecting the digital rooms element 714, the live video streaming system 106 can provide additional information regarding a target digital room. For example, the live video streaming system 106 indicates the number and/or names of each participant device in occupied digital rooms. As another example, the live video streaming system 106 can show the live video stream of a target digital room upon detecting selection of the target digital room.

The public combined live video stream interface 702a can include additional elements. For example, the public combined live video stream interface 702a can show comments from viewer devices 112 overlaid on the public combined live video stream 704. In some implementations, the public combined live video stream interface 702a provides additional notifications or indications. For instance, the live video streaming system 106 provides indications when a lineup change is scheduled to occur or when participant devices are added or removed from the public combined live video stream 704.

FIG. 7B illustrates a participant device 110 that includes a public combined live video stream interface 702b. Here, the participant device 110 can correspond to the participant shown in the bottom right section. As shown, the public combined live video stream interface 702b also includes various notification elements and the public combined live video stream 704, as described previously with respect to FIG. 7A. In addition, the public combined live video stream interface 702b includes the exit live video stream element 614, which is described above.

As shown, the live video streaming system 106 provides the same public combined live video stream 704 to the host device 108 and the participant device 110. In some implementations, the live video streaming system 106 can provide different versions of the public combined live video stream. However, in both cases, the live video streaming system 106 creates the one or more versions of the public combined live video stream at a server device and sends the public combined live video stream as a single live video stream to the host device 108 and the participant device 110.

As mentioned, the live video streaming system 106 provides the public combined live video stream 704 to the viewer device 112. To illustrate, FIG. 7C shows a viewer device 112 that includes a public combined live video stream interface 702c. As shown, the public combined live video stream interface 702b includes the public combined live video stream 704. The public combined live video stream interface 702b can include one or more notification elements, which can be the same or different notification elements from the host device 108 and/or the participant device 110. Further, the public combined live video stream interface 702b can include communication elements 716 where the viewer device 112 can provide general or direct messages to the participant devices and/or other viewer devices as well as "like" a portion of the public combined live video stream.

In various implementations, the public combined live video stream provided to the viewer device 112 can be a delayed or buffered version of the public combined live video stream. As described above, the live video streaming system 106 can provide the public combined live video stream to the viewer device 112 using a communication protocol that prioritizes video quality over latency. Accordingly, while the live video streaming system 106 can provide a real-time or near-real-time version of the public combined live video stream to the host device 108 and the participant device 110 via a first communication protocol that is prioritized for speed, the live video streaming system 106 can also provide a buffered version the public combined live video stream to the viewer device 112 via a second communication protocol that is prioritized for video quality, as described above.

Figure 8:
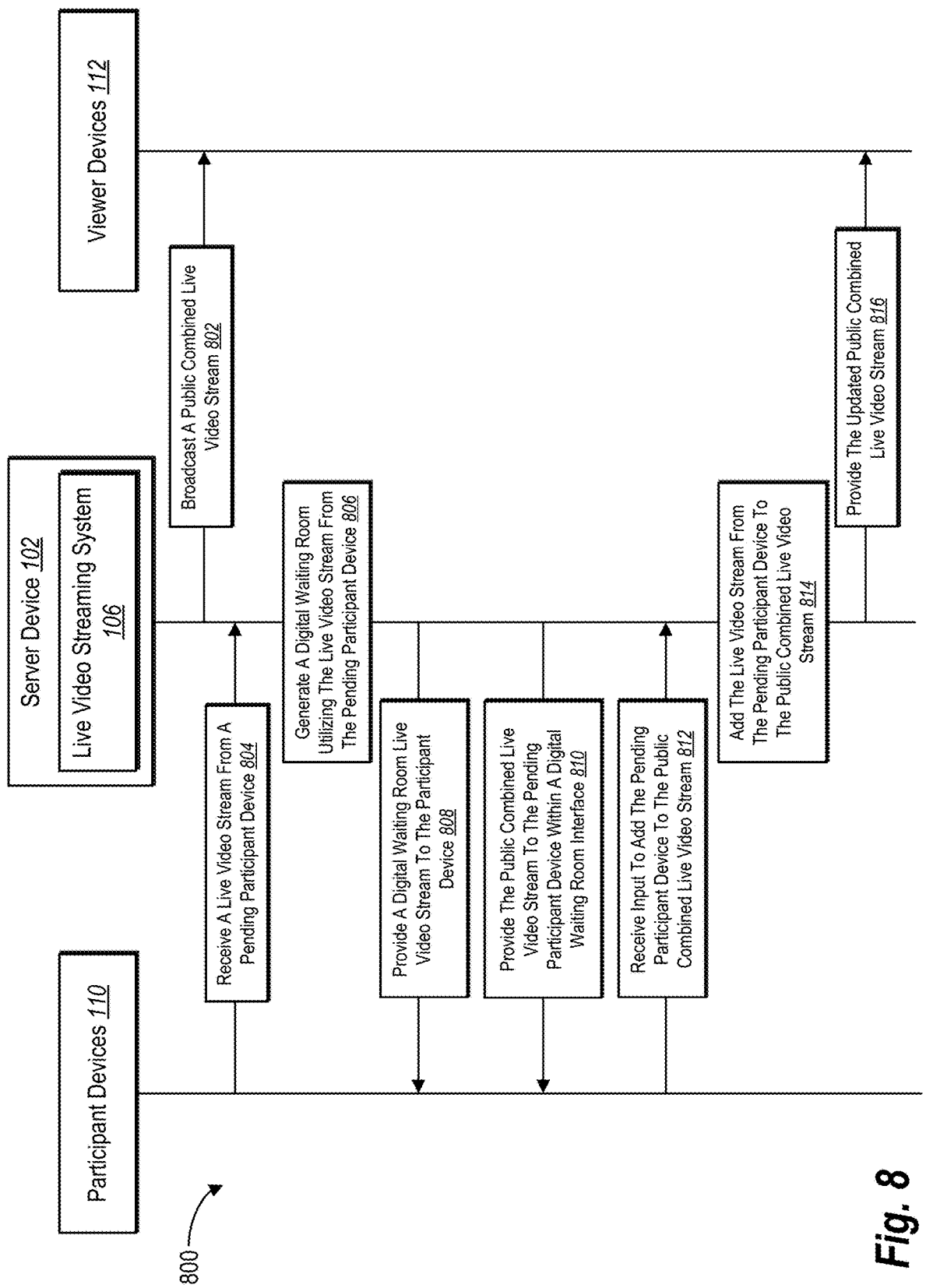
FIG. 8 illustrates a sequence diagram of generating and utilizing a digital waiting room in connection with a public combined live video stream in accordance with one or more implementations.

As mentioned above, FIGS. 8-9C provide additional detail regarding digital waiting rooms. For instance, FIG. 8 illustrates a sequence diagram of a series of acts 800 of the live video streaming system 106 generating and utilizing a digital waiting room in connection with a public combined live video stream in accordance with one or more implementations. As shown, the series of acts 800 includes the live video streaming system 106 communicating with the participant devices 110 (which can include a host device as well as a pending participant device) and the viewer devices 112.

As illustrated, the series of acts 800 includes an act 802 of the live video streaming system 106 broadcasting a public combined live video stream to the viewer devices 112, which is described previously. In addition, the series of acts 800 includes an act 804 of the live video streaming system 106 receiving a live video stream from a pending participant device. For example, a pending participant device desires to participate in the public combined live video stream. Accordingly, the pending participant device provides a live video stream to the live video streaming system 106.

In response, the live video streaming system 106 can create a digital waiting room for the pending participant device to wait before joining the public combined live video stream. To illustrate, the series of acts 800 includes an act 806 of the live video streaming system 106 generating a digital waiting room utilizing the live video stream from the pending participant device. For example, in various implementations, the live video streaming system 106 generates a digital waiting room live video stream from the live video stream of the pending participant device. If the live video streaming system 106 has previously created a digital waiting room with one or more additional pending participant devices, the live video streaming system 106 can add the live video stream of the pending participant device to a previously generated digital waiting room live video stream that includes the live video streams of the one or more additional pending participant devices.

In various implementations, the live video streaming system 106 can add multiple pending participant devices into one digital waiting room. In alternative implementations, the live video streaming system 106 can generate multiple digital waiting rooms for each pending participant device or groups of pending participant devices. For example, the live video streaming system 106 generates a first digital waiting room for a first pending participant device that is to join the public combined live video stream at a first time. In addition, the live video streaming system 106 generates a second digital waiting room for a group of pending participant devices that are to join the public combined live video stream at a second time.

As shown, the series of acts 800 includes an act 808 of the live video streaming system 106 providing a digital waiting room live video stream to the pending participant device. For example, the live video streaming system 106 can provide the digital waiting room live video stream to the pending participant device as well as any additional pending participant devices. In some implementations, if the pending participant device is the only pending participant device in the digital waiting room, the live video streaming system 106 can send instructions to the pending participant device that causes it to show its live video stream on the pending participant device within the room interface rather than the live video streaming system 106 sending the pending participant device a duplicative copy of the digital waiting room live video stream.

In various implementations, the live video streaming system 106 provides the digital waiting room live video stream within a digital waiting room interface. For example, the digital waiting room interface includes the digital waiting room live video stream and the public combined live video stream. Examples and additional description of a digital waiting room interface shown on a participant device is provided below in connection with FIG. 9B.

In addition, the series of acts 800 includes an act 810 of the live video streaming system 106 providing the public combined live video stream to the pending participant device with a digital waiting room interface. For instance, just as the live video streaming system 106 can provide the digital waiting room live video stream within the digital waiting room interface, the live video streaming system 106 can also include the public combined live video stream within the digital waiting room interface. In some implementations, the live video streaming system 106 provides the public combined live video stream to the pending participant device via the first communication protocol in real time or near-real time.

By providing both the digital waiting room live video stream and the public combined live video stream within a digital waiting room interface, the live video streaming system 106 enables the pending participant device to prepare "off-camera" to join the public combined live video stream while also being kept up-to-date as to the state of the public combined live video stream. For example, while in the digital waiting room, the pending participant device can test and verify their equipment (e.g., make sure the pending participant device is properly capturing a live video stream), grant permissions and authorizations, and/or wait for the appropriate time to join the public combined live video stream.

In various implementations, while the pending participant device is waiting in the digital waiting room, the live video streaming system 106 generates an updated public combined live video stream that includes the live video stream of the pending participant device as well as the live video streams of the current participant devices. However, the live video streaming system 106 keeps the updated public combined live video stream at the server device 102. Then, upon receiving input to add the pending participant device to the public combined live video stream, the live video streaming system 106 begins providing (e.g., switches to provide) the updated public combined live video stream to the viewer devices 112 and/or the participant devices 110, as described below. In this manner, the live video streaming system 106 can instantaneously and seamlessly add additional participant devices to the public combined live video stream.

As illustrated, the series of acts 800 includes an act 812 of the live video streaming system 106 receiving input to add the pending participant device to the public combined live video stream. In one or more implementations, the pending participant device provides input to join the public combined live video stream. For example, the pending participant device confirms that it is ready to join and, in response, the live video streaming system 106 adds the live video stream of the pending participant device to the public combined live video stream. For instance, the pending participant device is pre-authorized to join the public combined live video stream.

In some implementations, a host device provides input to the live video streaming system 106 to add the pending participant device from the digital waiting room to the public combined live video stream. For instance, upon the pending participant device joining the digital waiting room and/or becoming ready to join the public combined live video stream, the live video streaming system 106 can provide a corresponding indication to the host device. In response, the host device can request that the live video streaming system 106 add the pending participant device to the public combined live video stream.

In one or more implementations, the indication provided to the host device can include a text or graphic signaling that the pending participant device in the digital waiting room is ready to join the combined live video. For example, when the pending participant device enters the digital waiting room, the live video streaming system 106 provides the digital waiting room live video stream (or an image of the digital waiting room live video stream to the host device) so that the host device can see when the pending participant device is ready to join the public combined live video stream.

As illustrated, the series of acts 800 includes an act 814 of the live video streaming system 106 adding the live video stream from the pending participant device to the public combined live video stream. For example, the live video streaming system 106 at the server device 102 updates the public combined live video stream to include the live video stream of the pending participant device (e.g., now a participant device) as well as provide the updated public combined live video stream to the viewer devices 112, as shown in an act 816 of the series of acts 800. Also, while not shown, the series of acts 800 can include an act of the live video streaming system 106 providing the updated public combined live video stream to the participant devices 110.

In some implementations, the live video streaming system 106 adds the live video stream of the pending participant device to the public combined live video stream upon receiving input from the pending participant device, the host device, or another participant device. In alternative implementations, the live video streaming system 106 can delay adding the live video stream of the pending participant device to the public combined live video stream. For example, the live video streaming system 106 delays adding the pending participant device, such as until a predetermined time arrives or a countdown timer elapses.

Figure 9C:
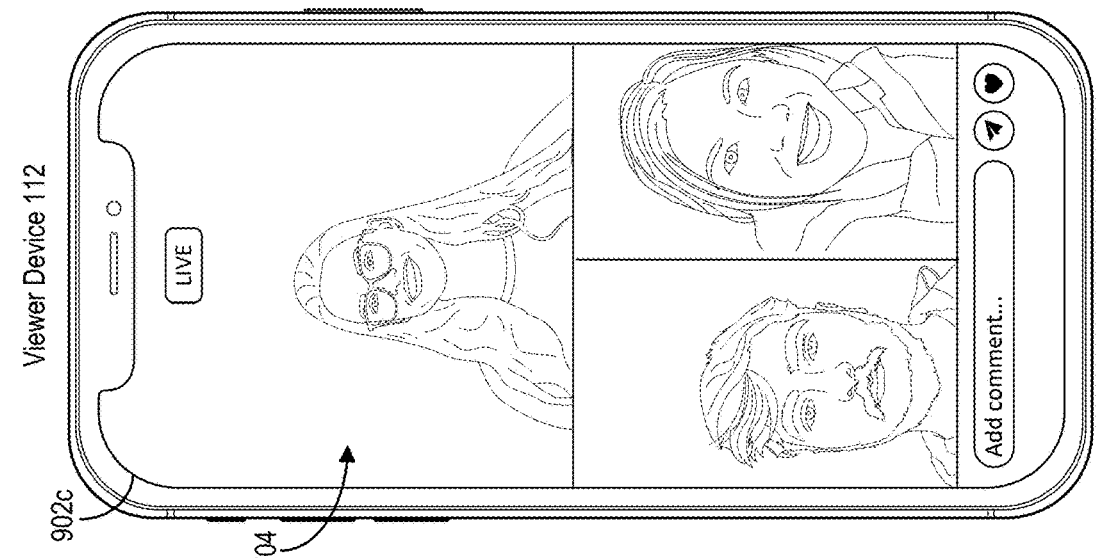
FIGS. 9A-9C illustrate graphical user interfaces that include a digital waiting room and/or a public combined live video stream on various client devices in accordance with one or more implementations.
Figure 9B:
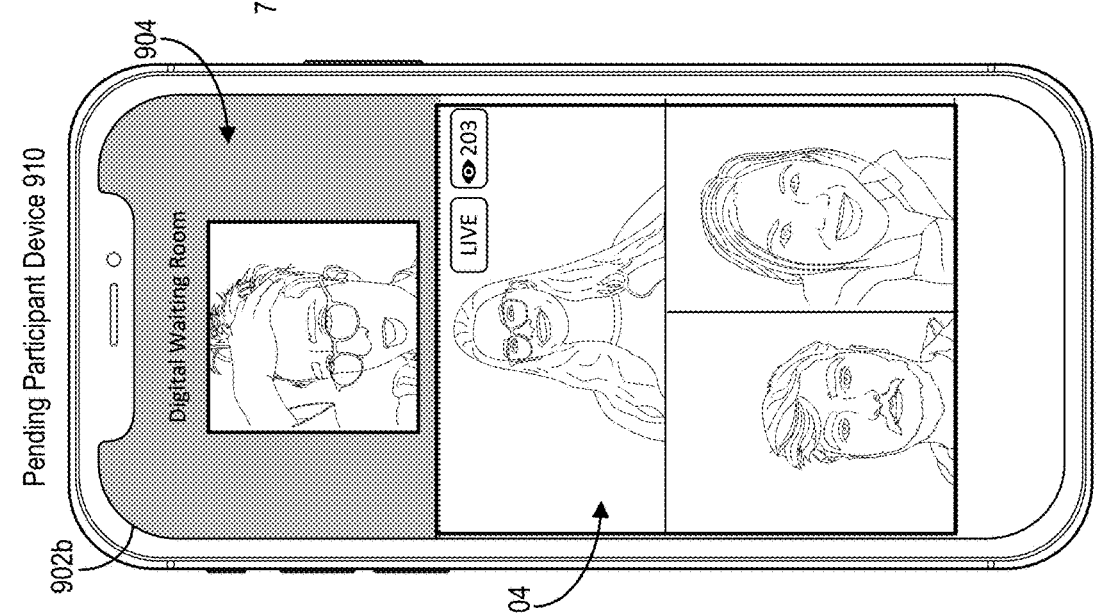
Figure 9A:
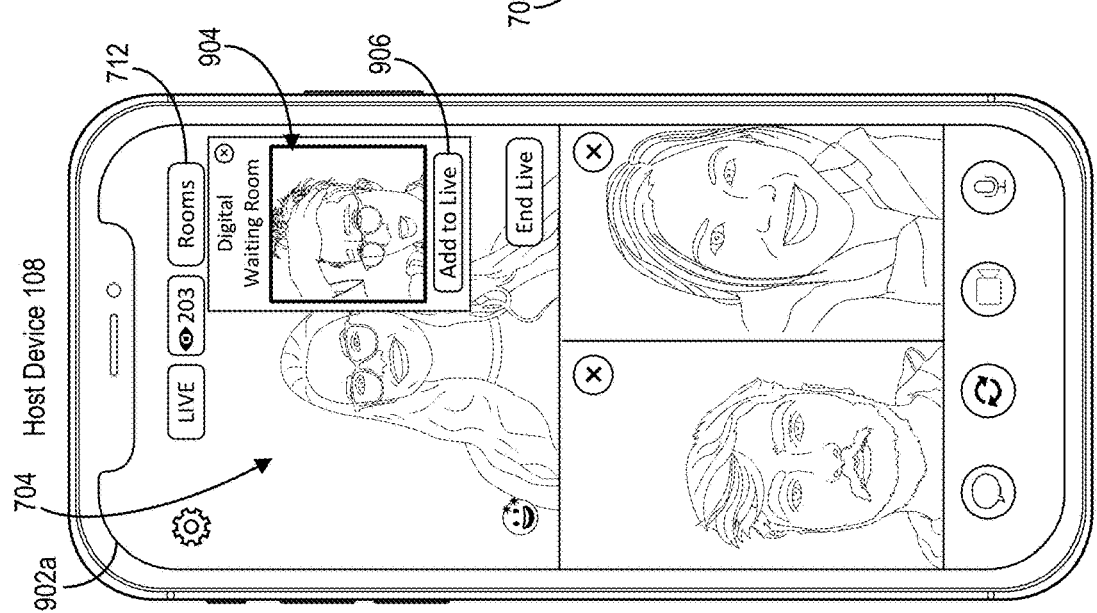

Turning now to FIGS. 9A-9C, additional description is provided with respect to the live video streaming system 106 providing a digital waiting room during a combined live video. In particular, FIGS. 9A-9C illustrate graphical user interfaces that include a digital waiting room and/or a public combined live video stream on various client devices in accordance with one or more implementations. In particular, FIG. 9A corresponds to a public combined live video stream displayed on the host device 108 when a pending participant device is in a digital waiting room. FIG. 9B corresponds to a pending participant device 910 waiting in a digital waiting room. FIG. 9C corresponds to the public combined live video stream displayed on a viewer device 112.

As shown in FIG. 9A, the host device 108 includes a public combined live video stream interface 902a. The public combined live video stream interface 902a can include similar elements as described above in connection with the public combined live video stream interface 702a of FIG. 7A. For example, the public combined live video stream interface 902a can include the public combined live video stream 704, notification elements, participant device removal elements, the end broadcast element, and the digital rooms element 714 (which can appear or change when a digital room becomes occupied).

In addition, the public combined live video stream interface 902a can also include a digital waiting room live video stream 904 showing the pending participant device 910 and any additional pending participant devices in the digital waiting room. As shown, the public combined live video stream interface 902a can overlay the digital waiting room live video stream 904 on the public combined live video stream 704. As described above, when the digital waiting room becomes occupied by a pending participant device and/or the pending participant device indicates a readiness to join the public combined live video stream, the live video streaming system 106 can provide an indication to the host device 108. For example, the live video streaming system 106 flashes or otherwise emphasizes the digital rooms element 714. Alternatively, the live video streaming system 106 can automatically show the digital waiting room live video stream 904 over a portion of the public combined live video stream 704. In some implementations, the live video streaming system 106 otherwise notifies the host device 108, such as with a popup or on-screen text notification.

While the digital waiting room live video stream 904 is shown as an overlay, in some implementations, the live video streaming system 106 reduces the size of the public combined live video stream 704 to show the digital waiting room live video stream 904 adjacent to the public combined live video stream 704. In one or more implementations, the live video streaming system 106 enables the host device 108 to move, close, or minimize the digital waiting room live video stream 904.

As shown, in connection with the digital waiting room live video stream 904, the public combined live video stream interface 902*a* includes a participant device inclusion element 906 (e.g., the "Add To Live" graphical button). For example, upon detecting selection of the participant device inclusion element 906, the live video streaming system 106 joins the pending participant device in the digital waiting room to the public combined live video stream. In this manner, the host device 108 can introduce and prepare the viewer devices 112 for the public combined live video stream 704 to update to include the pending participant device 910. Additionally, if the digital waiting room live video stream 904 shows multiple pending participant devices in the digital waiting room, the live video streaming system 106 can further prompt the host device 108 whether to add all or a subset (e.g., less than all) of the pending participant devices in the digital waiting room to the public combined live video stream 704.

In various implementations, the live video streaming system 106 can provide the digital waiting room live video stream 904 to other participant devices currently participating in the public combined live video stream 704. For example, the live video streaming system 106 sends the digital waiting room live video stream 904 to a co-host or a pending participant device having the authorization to add the pending participant device 910 to the public combined live video stream 704. Indeed, the live video streaming system 106 can provide the digital waiting room live video stream 904 to one or more participant devices with or without the participant device inclusion element 906.

As mentioned above, the live video streaming system 106 can enable a non-participant device to manage some or all of the public combined live video stream. For example, a production manager device can assist the host device 108 in adding a pending participant device to the public combined live video stream. In some implementations, while not shown, the live video streaming system 106 can provide the non-participant device with the same or similar user interface as the public combined live video stream interface 902*a* provided to the host device 108, which enables the non-participant device to perform many or all of the same production functions as the host device 108 during the public combined live video stream. For instance, in various implementations, the live video streaming system 106 can enable the non-participant device (via a public combined live video stream interface) to communicate (e.g., via text, audio, video) with the pending participant device 910 within the digital waiting room prior to the pending participant device 910 joining the public combined live video stream.

FIG. 9B illustrates the pending participant device 910 that includes a digital waiting room interface 902*b* (i.e., a digital waiting room graphical user interface). As shown, the digital waiting room interface 902*b* includes the digital waiting room live video stream 904 as well as the public combined live video stream 704. Indeed, as described above, the digital waiting room interface 902*b* enables a pending participant device to finalize preparations before joining the public combined live video stream 704 as well as correspond with other pending participant devices (and/or non-video-participant devices) waiting in the digital waiting room.

In one or more implementations, if the pending participant device 910 is the only pending participant device in the digital waiting room, the live video streaming system 106 can skip sending the digital waiting room live video stream back to the pending participant device 910 as it duplicates what the pending participant device 910 has sent to the live video streaming system 106. However, the live video streaming system 106 can still receive the live video stream from the pending participant device 910 in order to verify connection attributes as well as generate the live digital waiting room video stream, which can be provided to the host device (and/or other participant devices).

In implementations where multiple pending participant devices are in the digital waiting room, the live video streaming system 106 can generate a digital waiting room live video stream 904 that includes live video streams from each of the pending participant devices. The live video streaming system 106 can then provide the digital waiting room live video stream 904 to the pending participant device 910 within the digital waiting room interface 902*b*, as shown.

Further, the digital waiting room interface 902*b* can display the digital waiting room live video stream 904 and the public combined live video stream 704 in various arrangements. For example, the digital waiting room live video stream 904 can overlay the public combined live video stream 704. In an alternative example, the public combined live video stream 704 can overlay the digital waiting room live video stream 904. Additionally, the digital waiting room live video stream 904 can enable the pending participant device 910 to move, close, or minimize the digital waiting room live video stream 904 and/or the public combined live video stream 704.

FIG. 9C shows a viewer device 112 that includes a public combined live video stream interface 902*c*, which is similar to the public combined live video stream interface 702*c* described above in connection with FIG. 7C. For example, the public combined live video stream interface 902*c* includes the public combined live video stream 704. Notably, the public combined live video stream interface 902*c* does not display the digital waiting room or provide any indication that a pending participant device is in a digital waiting room. Further, when the pending participant device 910 is added to the public combined live video stream 704, the live video streaming system 106 can update the layout of the public combined live video stream 704 as previously described (e.g., at a server device), and seamlessly provide the updated public combined live video stream to the viewer device 112.

Figure 10:
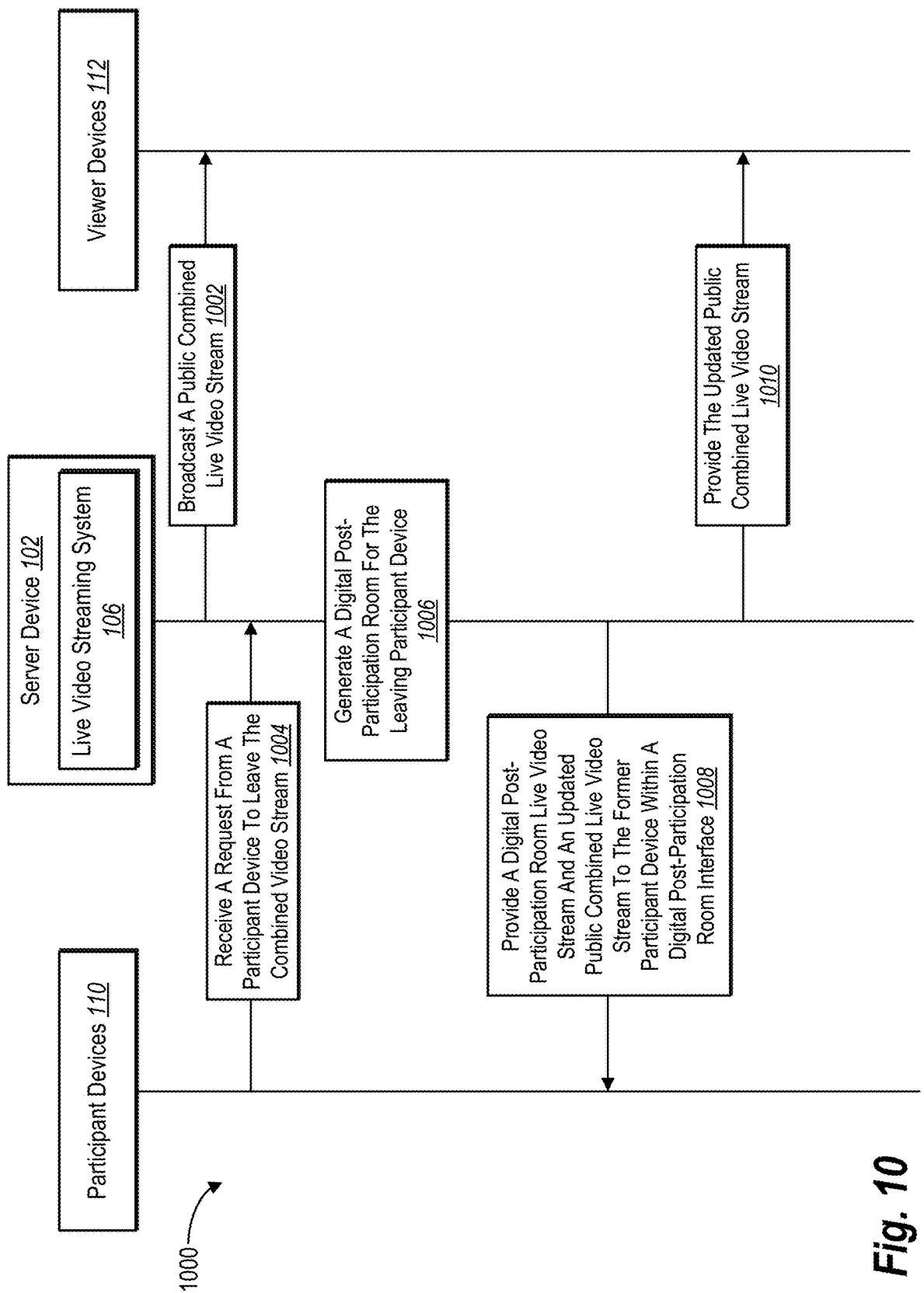
FIG. 10 illustrates a sequence diagram of generating and utilizing a digital post-participation room in connection with a public combined live video stream in accordance with one or more implementations.

As mentioned above, FIGS. 10-11C provide additional detail regarding digital post-participation rooms. For instance, FIG. 10 illustrates a sequence diagram of a series of acts 1000 of the live video streaming system 106 generating and utilizing a digital post-participation room in connection with a public combined live video stream in accordance with one or more implementations. As shown, the series of acts 1000 includes the live video streaming system 106 communicating with the participant devices 110 (which can include a host device as well as a former participant device) and the viewer devices 112.

As illustrated, the series of acts 1000 includes an act 1002 of the live video streaming system 106 broadcasting a public combined live video stream to the viewer devices 112. Broadcasting a public combined live video stream to the viewer devices 112 as described previously. For example, the live video streaming system 106 provides a single live video stream that combines live video streams of the pending participant devices 110.

In addition, the series of acts 1000 includes an act 1004 of the live video streaming system 106 receiving a request from a participant device to leave the public combined live video stream. In one or more implementations, a given participant device from the participant devices 110 requests to leave the public combined live video stream. For example, the live video streaming system 106 detects selection of an exit live video stream element at the given participant device.

In one or more implementations, the live video streaming system 106 detects a host device requesting to remove the given participant device from the public combined live video stream. For example, the live video streaming system 106 detects selection of a participant device removal element with respect to the given participant device. In some implementations, the given participant device is scheduled to leave the public combined live video stream, such as at a set time (e.g., based on a participant line up), or after being on the public combined live video stream for a set duration (e.g., after 15 minutes).

As shown, the series of acts 1000 includes an act 1006 of the live video streaming system 106 generating a digital post-participation room for the leaving participant device. For example, the live video streaming system 106 can move the live video stream of the given participant device from the public combined live video stream to the digital post-participation room. Indeed, the live video streaming system 106 can create a digital post-participation room live video stream utilizing the live video stream of the departing participant device.

In one or more implementations, if the live video streaming system 106 has previously created a digital post-participation room for a participant device that has previously left the public combined live video stream (e.g., a former participant device), the live video streaming system 106 can join their live video stream together to form the digital post-participation room live video stream (e.g., generate a combined live video stream). In alternative implementations, the live video streaming system 106 can create a new digital post-participation room for each participant device (or groups of participant devices) that leave the public combined live video stream.

In various implementations, the act 1006 can include the live video streaming system 106 updating the public combined live video stream in connection with removing the live video stream of the given participant device to the digital post-participation room. Indeed, the live video streaming system 106 can update, at the server device 102, the layout and arrangement of the public combined live video stream upon removing the given participant device.

As shown, the series of acts 1000 includes an act 1008 of the live video streaming system 106 providing the digital post-participation room live video stream and an updated public combined live video stream to the former participant device within a digital post-participation room interface. For example, as with the digital waiting room described above, the live video streaming system 106 can provide a digital post-participation room graphical user interface (or post-participation room interface) that includes both the live video stream of the digital post-participation room as well as the updated public combined live video stream to the former participant device (e.g., the given participant device) within a post-participation room interface. An example of a post-waiting room interface on a former participant device is shown in FIG. 11B, which is described below.

In addition, as shown, the series of acts 1000 includes an act 1010 of the live video streaming system 106 providing the updated public combined live video stream to the viewer devices 112. In additional implementations, the live video streaming system 106 can also provide the digital post-participation room live video stream to the host device and/or the remaining participant devices participating in the public combined live video stream. Further, the live video streaming system 106 can enable the host device to show or hide the digital post-participation room live video stream when it is occupied by one or more former participant devices.

In some implementations, the live video streaming system 106 combines a digital waiting room with a digital post-participation room. For example, the live video streaming system 106 generates a combined digital waiting room (e.g., an "off-camera" digital waiting room) that includes pending participant devices as well as pending participant devices. In these implementations, both pending participant devices and former participant devices can interact with each other off-camera while still monitoring the public combined live video stream. Further, the live video streaming system 106 can provide a live video stream of the combined digital waiting room to the host device and/or another participant device participating in the public combined live video stream Turning now to FIGS. 11A-11C, additional description is provided with respect to the live video streaming system 106 providing a digital post-participation room during a combined live video. In particular, FIGS. 11A-11C illustrate graphical user interfaces that include a digital post-participation room and/or a public combined live video stream on various client devices in accordance with one or more implementations. In particular, FIG. 11A corresponds to a public combined live video stream displayed on the host device 108 when a former participant device is in a digital post-participation room. FIG. 11B corresponds to a former participant device 1110 waiting in a digital post-participation room. FIG. 11C corresponds to the public combined live video stream displayed on a viewer device 112.

As shown in FIG. 11A, the host device 108 includes a public combined live video stream interface 1102a. The public combined live video stream interface can include similar elements as described above in connection with the public combined live video stream interface 702a of FIG. 7A. For example, the public combined live video stream interface 1102a can include the public combined live video stream 704, notification elements, participant device removal elements, the end broadcast element, and the digital rooms element 714 (which can appear or change when a digital room becomes occupied).

In addition, the public combined live video stream interface 1102a can also include a digital post-participation room live video stream 1104 showing the former participant device 1110 and any additional pending participant devices in the digital post-participation room. As shown, the public combined live video stream interface 1102a can overlay the digital post-participation room live video stream 1104 on the public combined live video stream 704. As described above, when the digital post-participation room becomes occupied by a former participant device, the live video streaming system 106 can provide a corresponding indication to the host device 108. For example, the live video streaming system 106 emphasizes the digital rooms element 714. Alternatively, the live video streaming system 106 can automatically show the digital post-participation room live video stream 1104 over a portion of the public combined live video stream 704.

While the digital post-participation room live video stream 1104 is shown as an overlay, in some implementations, the live video streaming system 106 reduces the size of the public combined live video stream 704 to show the digital post-participation room live video stream 1104 adjacent to the public combined live video stream 704. In one or more implementations, the live video streaming system 106 enables the host device 108 to move, close, hide, or minimize the digital post-participation room live video stream 1104.

As shown, in connection with the digital post-participation room live video stream 1104, the public combined live video stream interface 1102*a* includes a participant device re-invitation element 1106 (e.g., the "Invite Back" graphical button). For example, upon detecting selection of the participant device re-invitation element 1106, the live video streaming system 106 adds the former participant device in the digital post-participation room to the public combined live video stream. Additionally, if the digital post-participation room live video stream 1104 shows multiple former participant devices in the digital post-participation room, the live video streaming system 106 can further prompt the host device 108 whether to add all or a subset (e.g., less than all) of the former participant devices in the digital post-participation room to the public combined live video stream 704. Further, as with the digital waiting room, the live video streaming system 106 can provide the digital post-participation room live video stream 1104 to other participant devices currently participating in the public combined live video stream 704.

FIG. 11B illustrates the former participant device 1110 that includes a digital post-participation room interface 1102*b* (i.e., a digital post-participation room graphical user interface). As shown, the digital post-participation room interface 1102*b* includes the digital post-participation room live video stream 1104 as well as the public combined live video stream 704 (e.g., an updated public combined live video stream). The digital post-participation room interface 1102*b* enables a former participant device to wait off-camera until an appropriate time to rejoin the public combined live video stream 704 or until the public combined live video stream finishes.

As shown, the digital post-participation room interface 1102*b* includes a rejoin request element 1108. When present, the rejoin request element 1108 allows the former participant device 1110 to rejoin the public combined live video stream 704. For example, in one or more implementations, upon detecting selection of the rejoin request element 1108, the live video streaming system 106 adds the former participant device 1110 back into the public combined live video stream 704. In alternative implementations, upon detecting selection of the rejoin request element 1108, the live video streaming system 106 sends a request to a participant device (e.g., the host device) for the former participant device 1110 to rejoin the public combined live video stream 704.

In implementations where multiple former participant devices are in the digital post-participation room, the live video streaming system 106 can generate a digital post-participation room live video stream 1104 that includes live video streams from each of the former participant devices. The live video streaming system 106 can then provide the digital post-participation room live video stream 1104 to the former participant device 1110 within the digital post-participation room interface 1102*b*.

Further, as with the digital waiting room, the digital post-participation room interface 1102*b* can display the digital post-participation room live video stream 1104 and the public combined live video stream 704 in various arrangements. For example, in some instances, the live video streaming system 106 enables the former participant device 1110 to move, overlay, hide, or minimize the digital post-participation room live video stream 1104.

FIG. 11C shows a viewer device 112 that includes a public combined live video stream interface 1102*c*, which is similar to the public combined live video stream interface 702*a* described above in connection with FIG. 7C. For example, the public combined live video stream interface 1102*c* includes the public combined live video stream 704. Notably, the public combined live video stream interface 1102*c* does not display the digital post-participation room or provide any indication that a former participant device is in a digital post-participation room. Further, when the former participant device 1110 is removed from the public combined live video stream 704, the live video streaming system 106 can update the layout of the public combined live video stream 704 as previously described (e.g., at a server device), and seamlessly provide the updated public combined live video stream to the viewer device 112.

Figure 12:
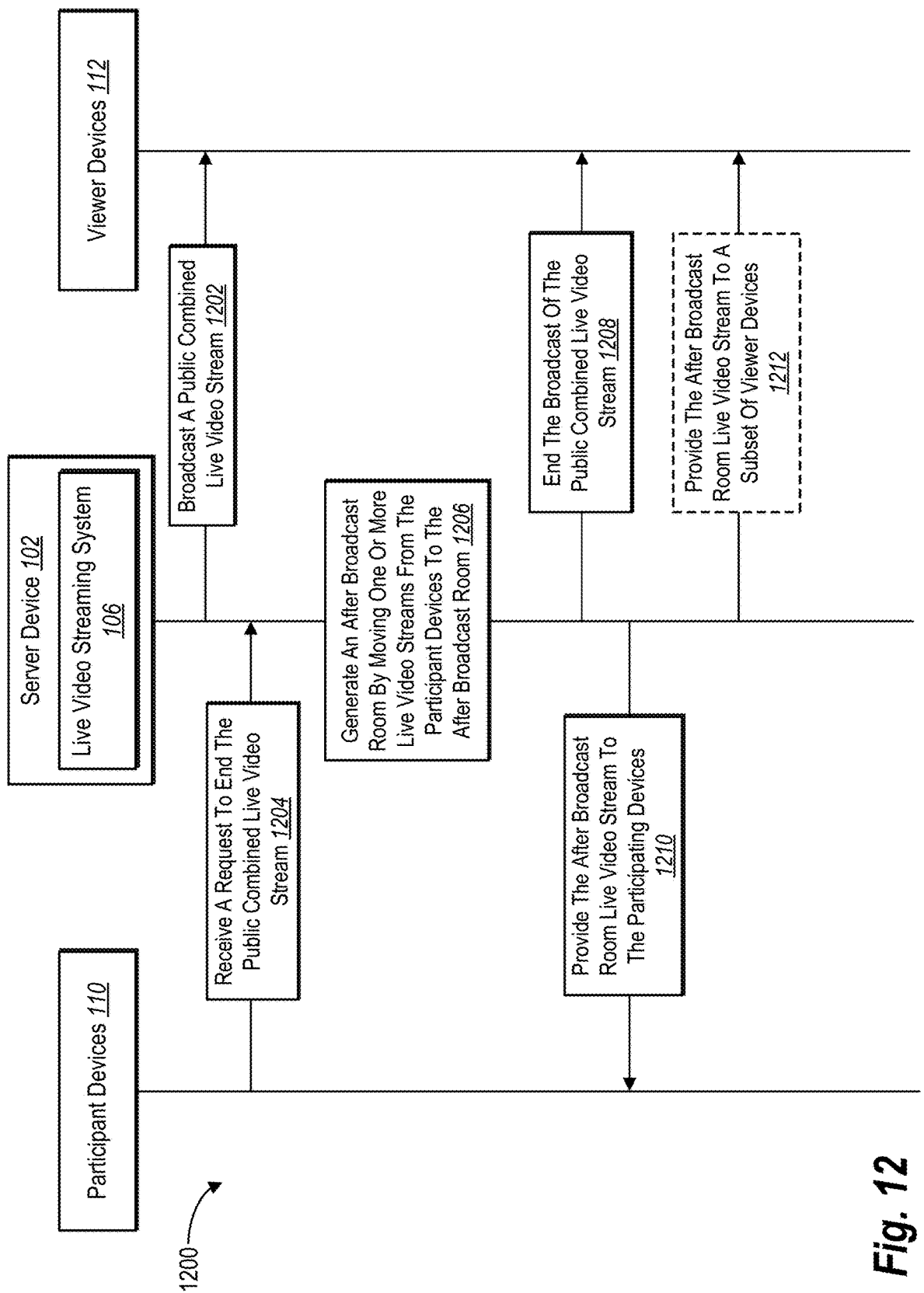
FIG. 12 illustrates a sequence diagram of generating and utilizing an after broadcast room following a public combined live video stream in accordance with one or more implementations.

As mentioned above, FIGS. 12-13C provide additional detail regarding digital after broadcast rooms (or simply after broadcast rooms). For instance, FIG. 12 illustrates a sequence diagram of a series of acts 1200 of the live video streaming system 106 generating and utilizing an after broadcast room following a public combined live video stream in accordance with one or more implementations. As shown, the series of acts 1200 includes the live video streaming system 106 communicating with the participant devices 110 (which can include a host device) and the viewer devices 112.

As illustrated, the series of acts 1200 includes an act 1202 of the live video streaming system 106 broadcasting a public combined live video stream to the viewer devices 112. For example, the live video streaming system 106 provides a single live video stream that combines live video streams of the pending participant devices 110 as arranged at the server device 102.

In addition, the series of acts 1200 includes an act 1204 of the live video streaming system 106 receiving a request from a participant device to end the public combined live video stream. For example, the live video streaming system 106 detects selection of an end broadcast element at the host device, as described above. In one or more implementations, the live video streaming system 106 can end the public combined live video stream and drop all connections with the participant devices as well as the viewer devices 112.

In some implementations, the live video streaming system 106 can provide an after broadcast room for the participant devices 110, including former participant devices. For example, the host device can request that the live video streaming system 106 provide an after broadcast room while setting up the public combined live video stream, during the public combined live video stream, or in connection with ending the public combined live video stream.

As shown, the series of acts 1200 includes an act 1206 of the live video streaming system 106 generating an after broadcast room by moving one or more live video streams from the participant devices to the after broadcast room. For example, the live video streaming system 106 can generate an after broadcast room live video stream (e.g., a combined live video stream) by combining live video streams of participant devices from the public combined live video stream and/or live video streams of former participant devices (e.g., former participant devices waiting in the digital post-participation room). In some implementations where a viewer device has access to the digital post-participation room, the live video streaming system 106 can also provide the viewer device with access to the after broadcast room, as described below.

As illustrated, the series of acts 1200 includes an act 1208 of the live video streaming system 106 ending the broadcast of the public combined live video stream to the viewer devices 112. For example, in various implementations, the live video streaming system 106 provides a notification to the viewer devices 112 that the public combined live video stream has ended. In some implementations, the live video streaming system 106 allows viewer devices 112 to watch a recording of the public combined live video stream.

In addition, the series of acts 1200 includes an act 1210 of the live video streaming system 106 providing the after broadcast room live video stream to the participant devices 110. For example, after the public combined live video stream stops broadcasting the public combined live video stream to the viewer devices 112, the live video streaming system 106 can continue to provide the after broadcast room live video stream to the participant devices 110 participating in the after broadcast room. Indeed, in many implementations, the after broadcast room live video stream is a private live video stream offered only to participant devices of the public combined live video stream.

In some implementations, the live video streaming system 106 provides the after broadcast room live video stream to the participant devices 110 in an after broadcast room graphical user interface (or after broadcast room interface). In this manner, the participant devices can discuss and/or debrief the public combined live video stream privately. As described below, the after broadcast room interface can appear similar to the public combined live video stream interface and/or the digital preparation room interface.

As shown, the series of acts 1200 includes an optional act 1212 of the live video streaming system 106 providing the after broadcast room live video stream to a subset of viewer devices 112. For example, the live video streaming system 106 identifies a subset of the viewer devices 112 to view the after broadcast room live video stream.

Indeed, the live video streaming system 106 can offer the after broadcast room live video stream as a VIP experience to some of the viewer devices 112. In a number of implementations, the live video streaming system 106 identifies the subset of viewer devices based on digital purchases, digital bids, or other activity metrics associated with the viewer devices 112. In some implementations, the live video streaming system 106 determines which viewer devices 112 to include in the subset based on analyzing activity metrics of the viewer devices 112, as further described below.

In one or more implementations, the live video streaming system 106 can generate the after broadcast room live video stream by stopping the broadcast of the public combined live video stream to the viewer devices 112 (except for the selected subset, if any). Further, if a pending participant device is present in a digital post-participation room, the live video streaming system 106 can also add the live video streams of the former participant device to the after broadcast room live video stream. Further, in some implementations, one or more viewer devices 112 can be selected as target viewer devices, as further described below, where these target viewer devices can participate in the after broadcast room.

Turning now to FIGS. 13A-13C, additional description is provided with respect to the live video streaming system 106 providing an after broadcast room following a combined live video. In particular, FIGS. 13A-13C illustrate graphical user interfaces that include an after broadcast room on various client devices in accordance with one or more implementations. In particular, FIG. 13A corresponds to an after broadcast room displayed on the host device 108. FIG. 13B corresponds to the after broadcast room displayed on a participant device 110. FIG. 13C corresponds to the after broadcast room displayed on a viewer device 112 (e.g., a viewer device within the subset of selected viewer devices).

As shown in FIG. 13A, the host device 108 includes an after broadcast room interface 1302a. The after broadcast room interface 1302a can include one or more similar elements as described above, such as a room title, notification elements including a private notification element 1306 and an active viewers count 1308, an after broadcast room live video stream 1304, participant device removal elements, and an end room element 1310.

In one or more implementations, the private notification element 1306 indicates that the live video streaming system 106 is not broadcasting the after broadcast room live video stream to an open group of viewer devices. In some implementations, the private notification element 1306 may signal whether the after broadcast room is limited to participant devices, a select group of participant devices, or a subset of viewer devices. For example, when displayed in connection with the active viewers count 1308, the private notification element 1306 indicates that a select set of viewer devices have been granted access to the after broadcast room.

As shown, the after broadcast room interface 1302a includes the end room element 1310. In one or more implementations, selecting the end room element 1310 causes the live video streaming system 106 to end the after broadcast room and stop receiving the live video stream of the participant devices. In some implementations, selecting the end room element 1310 causes the live video streaming system 106 to provide various options to the host device 108, such as providing the host device to end the after broadcast room or to disconnect the subset of viewer devices.

In various implementations, the after broadcast room interface 1302a can include one or more room configuration options. For example, the live video streaming system 106 enables the host device 108 to modify the layout, size, or arrangement of the after broadcast room live video stream. As another example, the live video streaming system 106 allows the host device 108 to resume or start a new public combined live video stream with the participant devices in the after broadcast room.

FIG. 13B illustrates a participant device 110 that includes an after broadcast room interface 1302b. Here, the participant device can correspond to the participant shown in the bottom right section. As shown, the after broadcast room interface 1302b includes the after broadcast room live video stream 1304. In addition, the after broadcast room interface 1302b includes other elements previously described such as the notification elements and the exit live video stream element.

FIG. 13C shows a viewer device 112 corresponding to a viewer device in the subset of viewer devices. As described above, in some implementations, the live video streaming system 106 can determine a subset of viewer devices to view the after broadcast room and provide the subset of viewer devices access to the after broadcast room live video stream. As shown in FIG. 13C, the viewer device 112 includes an after broadcast room interface 1302c having the after broadcast room live video stream 1304.

Figure 14:
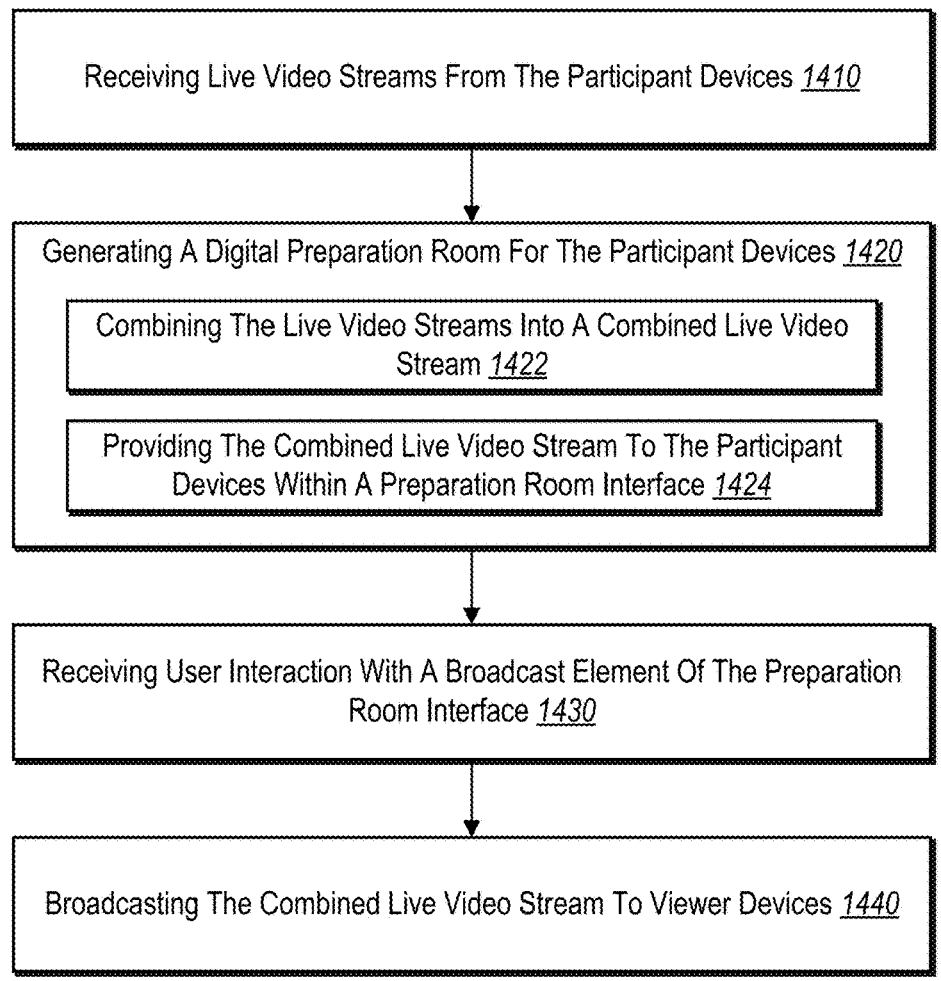
FIG. 14 illustrates a flow diagram of a series of acts for generating, providing, and broadcasting digital preparation rooms in connection with public combined live video streams in accordance with one or more implementations.
Figure 15:
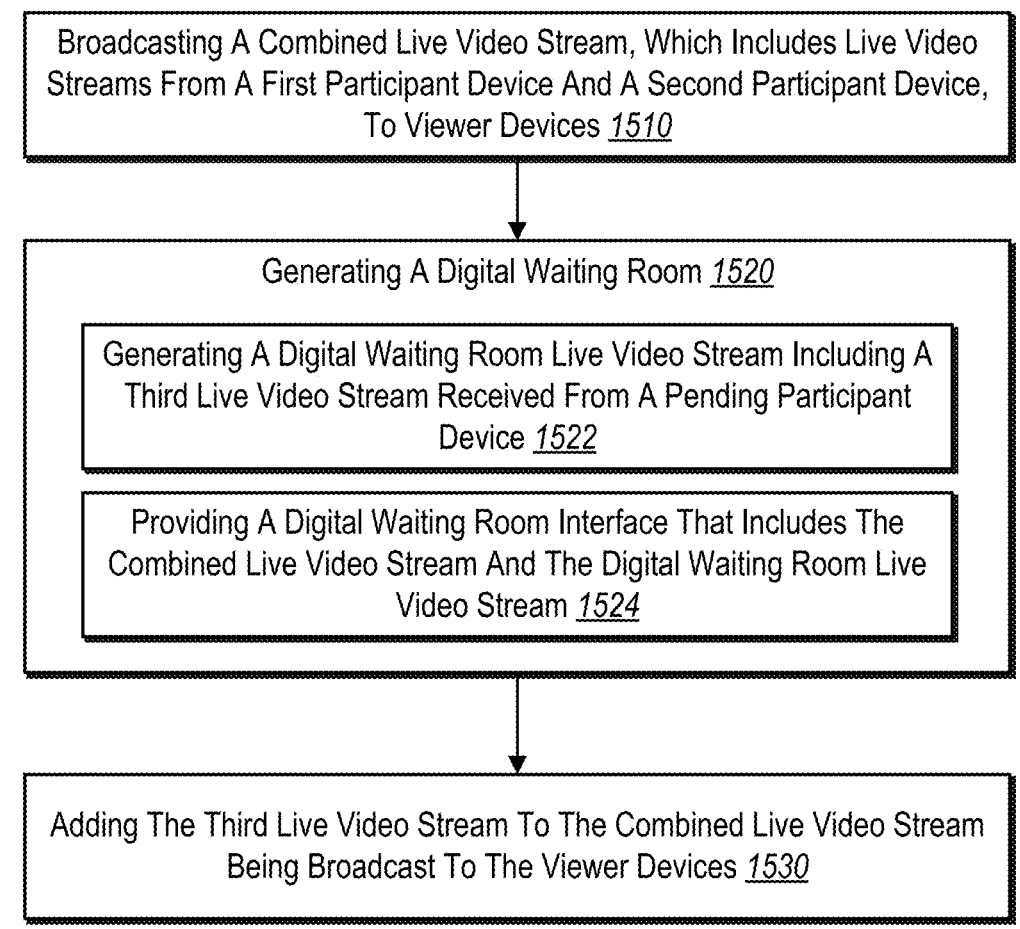
FIG. 15 illustrates a flow diagram of a series of acts for generating, providing, and broadcasting digital waiting rooms in connection with public combined live video streams in accordance with one or more implementations.

FIGS. 1-13C, the corresponding text, and the examples provide several different systems, methods, techniques, components, and/or devices of the live video streaming system 106 in accordance with one or more implementations. In addition to the description herein, one or more implementations can also be described in terms of flowcharts including acts for accomplishing a particular result. For example, FIG. 14 and FIG. 15 illustrate flowcharts of example sequences of acts in accordance with various implementations. In addition, FIG. 14 and FIG. 15 may be performed with more or fewer acts. Further, the acts may be performed in differing orders. Additionally, the acts described herein may be repeated or performed in parallel with one another or parallel with different instances of the same or similar acts.

While FIG. 14 and FIG. 15 each illustrate a series of acts according to particular implementations, alternative implementations may omit, add to, reorder, and/or modify any of the acts shown. The series of acts of FIG. 14 and FIG. 15 can be performed as part of a method. Alternatively, a non-transitory computer-readable medium can comprise instructions, when executed by one or more processors, cause a computing device (e.g., a server device and/or a client device) to perform the series of acts of FIG. 14 and FIG. 15. In still further implementations, a system performs the acts of FIG. 14 and FIG. 15.

To illustrate, FIG. 14 shows a flowchart of a series of acts 1400 of generating, providing, and broadcasting digital preparation rooms associated with combined live video streams (e.g., public combined live video streams) in accordance with one or more implementations. As shown, the series of acts 1400 includes an act 1410 of receiving live video streams from participant devices. For example, the act 1410 can include receiving, at a server device, a plurality of live video streams from a plurality of participant devices. In various implementations, the server device receives the plurality of live video stream via a first communication protocol that prioritizes low latency over video quality.

As shown, the series of acts 1400 includes an act 1420 of generating a digital preparation room for the participant devices. For example, the act 1420 can include generating, at the server device, a digital preparation room for the plurality of participant devices. The act 1420 can include multiple sub-acts, as described below.

As shown, the act 1420 includes a sub-act 1422 of combining the live video streams into a combined live video stream. For example, the sub-act 1422 can include combining the plurality of live video streams from the plurality of participant devices into a combined live video stream (e.g., a non-public combined live video stream). In various implementations, the sub-act 1422 includes arranging the plurality of live video streams into a layout and/or arrangement specified by a participant device (e.g., a host device).

As shown, the act 1420 includes a sub-act 1424 of providing the combined live video stream to the participant devices within a preparation room interface. For example, the sub-act 1424 can include providing the combined live video stream to the plurality of participant devices within a digital preparation room interface. In one or more implementations, the digital preparation room interface includes one or more notification elements that signal to the plurality of participant devices that the combined live video stream (e.g., a live video stream of the digital preparation room) is not yet broadcasting to viewer devices 112.

As shown, the series of acts 1400 includes an act 1430 of receiving user interaction with a broadcast element of the preparation room interface. For example, the act 1430 can include receiving, from a first participant device of the plurality of participant devices, user interaction with a broadcast element of the digital preparation room interface. In one or more implementations, the act 1430 includes detecting selection of the broadcast element within the digital preparation room interface of a participant device (e.g., a host device) requesting to broadcast the digital preparation room to the viewer devices.

As shown, the series of acts 1400 includes an act 1440 of broadcasting the combined live video stream to viewer devices. For example, the act 1440 can include broadcasting the combined live video stream (e.g., a public combined live video stream) to a plurality of viewer devices based on the user interaction with the broadcast element. In one or more implementations, the act 1440 includes providing the combined live video stream to the plurality of viewer devices within a networking system (e.g., a social networking system or a media sharing networking system).

In one or more implementations, the act 1440 includes providing, for display at the first participant device before broadcasting the combined live video stream (e.g., a public combined live video stream) to the plurality of viewer devices, a live broadcast user interface that includes broadcast participation elements indicating one or more participation triggers for participant devices to participate in the combined live video stream. Further, based on receiving a selection of a broadcast participation element from the first participant device, the act 1440 can also include identifying a participation trigger and broadcasting the combined live video stream to the plurality of viewer devices in accordance with the participation trigger. In some implementations, the participation trigger includes at least one of a trigger for adding a participant device to the combined live video stream, a trigger for removing a participant device from the combined live video stream, a trigger for transitioning a participant device from a digital preparation room to the combined live video stream, a trigger for transitioning a participant device from a digital waiting room to the combined live video stream, or a trigger for transitioning a participant device from the combined live video stream to a post-participation room.

The series of acts 1400 can include various additional acts. For example, in one or more implementations, the series of acts 1400 can include the acts of receiving, at the server device, an additional live video stream from a pending participant device; and generating, at the server device, a digital waiting room by generating a digital waiting room live video stream including the additional live video stream from the pending participant device and providing, for display at the pending participant device, a digital waiting room interface that includes the combined live video stream and the digital waiting room live video stream.

In some implementations, the series of acts 1400 can include the acts of ending the combined live video stream broadcast to the plurality of viewer devices; and generating, at the server device, an after broadcast room for one or more participant devices of the plurality of participant devices by combining one or more of the plurality of live video streams from the one or more participant devices into an after broadcast room live video stream and providing the after broadcast room live video stream to the one or more participant devices. In additional implementations, the series of acts 1400 can also include the acts of identifying a subset of viewer devices from the plurality of viewer devices based on one or more activity metrics associated with the plurality of viewer devices and providing access to the after broadcast room live video stream to the subset of the viewer devices.

In various implementations, the series of acts 1400 can include the acts of removing, from the combined live video stream, one or more live video streams of one or more participant devices of the plurality of participant devices during the combined live video stream; and generating, at the server device, a digital post-participation room for the one or more participant devices removed from the combined live video stream by combining the one or more live video streams of the one or more participant devices into a post-participation room live video stream and providing, for display at the one or more participant devices, a post-participation room user interface that includes the combined live video stream and the post-participation room live video stream.

In some implementations, the series of acts 1400 can include the acts of detecting, at the server device, that a live video stream from the first participant device is removed from the combined live video stream; determining that the first participant device is starting a new live video stream within a predetermined amount of time of when the live video stream from the first participant device was removed from the combined live video stream; based on determining that the first participant device is starting the new live video stream within the predetermined amount of time, providing a resume live video stream option for the first participant device to resume the combined live video stream; and based on user interaction with the resume live video stream option, resuming the broadcast of the combined live video stream to the plurality of viewer devices. In various implementations, the series of acts 1400 can include the acts of providing a first version of the combined live video stream to the plurality of participant devices and broadcasting a second buffered version of the combined live video stream to the plurality of viewer devices.

As a further illustration, FIG. 15 shows a flowchart of a series of acts 1500 of generating, providing, and broadcasting digital waiting rooms in connection with combined live video streams (e.g., public combined live video streams) in accordance with one or more implementations. As shown, the series of acts 1500 includes an act 1510 of broadcasting a combined live video stream, which includes live video streams from a first participant device and a second participant device, to viewer devices. For example, the act 1510 can include broadcasting, from a server device, a combined live video stream to a plurality of viewer devices, the combined live video stream including a first live video stream from a first participant device and a second live video stream from a second participant device.

As shown, the series of acts 1500 includes an act 1520 of generating a digital waiting room. For example, the act 1520 can include generating, at the server device, a digital waiting room. In some implementations, the act 1520 is based on receiving input from a participant device (e.g., a host device) requesting the creation of the digital waiting room. The act 1520 can include multiple sub-acts, as described below.

As shown, the act 1520 includes a sub-act 1522 of generating a digital waiting room live video stream including a third live video stream received from a pending participant device. For example, the sub-act 1522 can include generating a digital waiting room live video stream including a third live video stream received from a pending participant device. In some implementations, the sub-act 1522 can include generating the digital waiting room live video stream for additional live video streams received from additional pending participant devices.

In one or more implementations, the sub-act 1522 can include providing an indication to the first participant device that the pending participant device is ready to be added to the combined live stream based on receiving the third live stream from the pending participant device and receiving, from the first participant device, a user interaction to move the third live video stream from the digital waiting room live video stream to the combined live video stream. In additional implementations, the sub-act 1522 can include receiving user interaction from the first participant device before broadcasting the combined live video stream to the plurality of viewer devices, where the user interaction indicates moving the third live video stream to the combined live video stream upon one or more participation triggers being satisfied and adding the third live video stream to the combined live video stream by moving the third live video stream from the digital waiting room to the combined live video stream in accordance with the one or more participation triggers.

As shown, the act 1520 includes a sub-act 1524 of providing a digital waiting room interface that includes the combined live video stream and the digital waiting room live video stream. For example, the sub-act 1524 can include providing, for display at the pending participant device, a digital waiting room interface that includes the combined live video stream (e.g., a public combined live video stream) and the digital waiting room live video stream. In some implementations, the sub-act 1524 includes providing the digital waiting room live video stream as the indication to the first participant device. In various implementations, the digital waiting room live video stream is not viewable by the plurality of viewing devices until the digital waiting room live video stream is added to the combined live video stream.

As shown, the series of acts 1500 includes an act 1530 of adding the third live video stream to the combined live video stream being broadcast to the viewer devices. For example, the act 1530 can include adding the third live video stream with the first live video stream and the second live video stream within the combined live video stream being broadcast to the plurality of viewer devices. In implementations where multiple pending participant devices are in the digital waiting room, the act 1530 can include adding all, or a subset (e.g., less than all) of the live video streams of the pending participant devices to the combined live video stream.

Figure 16:
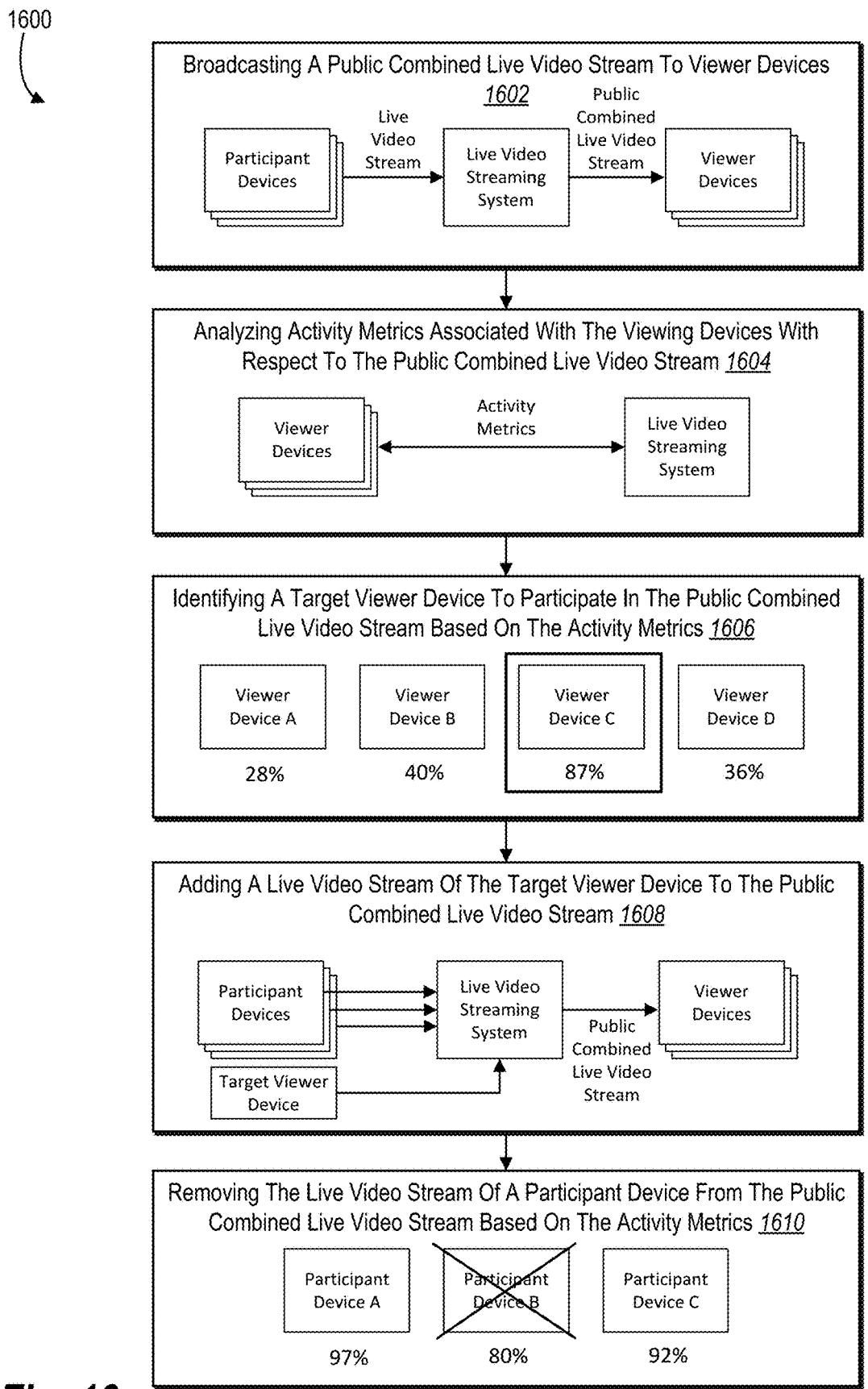
FIG. 16 illustrates an overview diagram of adding and removing viewer devices to and from a public combined live video stream based on activity metrics in accordance with one or more implementations.

The series of acts 1500 can include various additional acts. For example, in one or more implementations, the series of acts 1500 can include the acts of receiving, at the server device, a fourth live video stream from an additional pending participant device; and generating at the server device, the digital waiting room by combining the third live video stream from the pending participant device and the fourth live video stream from the additional pending participant device into the digital waiting room live video stream and providing, for display at the pending participant device and the additional pending participant device, the digital waiting room interface that includes the combined live video stream and the digital waiting room live video stream. In additional implementations, the series of acts 1500 can include the act of adding the third live video stream and the fourth live video stream with the first live video stream and the second live video stream within the combined live video stream being broadcast to the plurality of viewer devices Turning now to FIGS. 16-20, additional detail is provided regarding identifying target viewer devices to participate in public combined live video streams along with adding and removing target viewer devices from the public combined live video streams. For example, FIG. 16 illustrates an overview diagram of a series of acts 1600 for adding and removing viewer devices to and from a public combined live video stream based on activity metrics in accordance with one or more implementations. In various implementations, the live video streaming system 106 and/or the networking system 104 perform the actions shown in the series of acts 1600.

As shown, the series of acts 1600 includes an act 1602 of the live video streaming system 106 broadcasting a public combined live video stream to viewer devices 112. As described above, the live video streaming system 106 can receive and combine live video streams from a host device as well as other participant devices into a public combined live video stream. In some implementations, the live video streaming system 106 synchronizes the live video stream according to their timestamps and/or arranges the live video streams into a given arrangement as part of generating the public combined live video stream. Further, the live video streaming system 106 can broadcast a real-time or a buffered version of the public combined live video stream to the viewer devices 112, as described above.

As also shown, the series of acts 1600 includes an act 1604 of the live video streaming system 106 analyzing activity metrics associated with the viewer devices with respect to the public combined live video stream. As disclosed above, activity metrics can include implicit or explicit activity data provided by, or detected from, viewer devices displaying the public combined live video stream and/or participant devices. For example, in one or more implementations, the live video streaming system 106 actively receives activity metrics from the viewer devices 112 with respect to the public combined live video stream. In alternative implementations, the live video streaming system 106 passively monitors activity metrics of the viewer devices 112.

As further described below, the live video streaming system 106 can analyze one or more activity metrics based on which participation triggers are associated with the public combined live video stream. For example, based on a particular participation trigger selected for the public combined live video stream, the live video streaming system 106 can determine a target activity metric (or set of activity metrics) to analyze from each of the viewer devices 112.

Based on analyzing the activity metrics, the live video streaming system 106 can identify a target viewer device to participate in the public combined live video stream, as shown in an act 1606 of the series of acts 1600. For example, the live video streaming system 106 compares the activity metrics among the viewer devices 112 to determine a target viewer device that satisfies a participation trigger associated with the public combined live video stream. In various implementations, the live video streaming system 106 determines a target viewer device based on a combination of multiple activity metrics. In some implementations, the live video streaming system 106 identifies multiple target viewer devices.

As shown, the series of acts 1600 includes an act 1608 of the live video streaming system 106 adding a live video stream of the target viewer device to the public combined live video stream. In one or more implementations, the live video streaming system 106 requests and receives the live video stream of the target viewer device. Further, as described above, the live video streaming system 106 can add the live video stream of the target viewer device to the live video streaming system of the host device and the other participant devices within the public combined live video stream. Additionally, as illustrated in connection with the act 1608, the live video streaming system 106 can provide the updated public combined live video stream to the viewer devices 112.

In one or more implementations, the live video streaming system 106 can select a target viewer device to view and/or participate in a digital room. For example, in some implementations, the live video streaming system 106 determines a target viewer device to participate in a digital room, such as a digital waiting room or digital post-participant room. In various implementations, the live video streaming system 106 can also select a target viewer device to view a digital room (e.g., a digital waiting room or an after broadcast room).

As shown, the series of acts 1600 includes an act 1610 of the live video streaming system 106 removing the live video stream of a participant device from the public combined live video stream based on the activity metrics. For example, in various implementations, the live video streaming system 106 analyzes the activity metrics from the viewer devices 112 to determine which participant device to remove from the public combined live video stream at a given time. In some implementations, the live video streaming system 106 analyzes activity metrics from the participant devices to determine which participant device to remove. Indeed, the live video streaming system 106 can add and remove participant devices from the public combined live video stream based on activity metrics, as further described below.

FIG. 17 illustrates a sequence diagram of a series of acts 1700 of identifying a target viewer device to add to a public combined live video stream based on analyzing activity metrics in accordance with one or more implementations. As shown, the series of acts 1700 includes the live video streaming system 106 communicating with the participant devices 110 (which can include a host device) and the viewer devices 112.

As illustrated, the series of acts 1700 includes an act 1702 of the live video streaming system 106 receiving participation triggers for adding and removing participant devices. In one or more implementations, the act 1702 includes the live video streaming system 106 providing a user interface that includes a selection of broadcast participation elements. Additionally, each of the broadcast participation elements can be associated with one or more participation triggers. Accordingly, in these implementations, the live video streaming system 106 can detect a selection of a broadcast participation element and determine one or more corresponding participation triggers to associate with a public combined live video stream. Additional detail regarding receiving participation triggers based on selected broadcast participation elements is provided below in connection with FIGS. 18A-18B.

As shown, the series of acts 1700 includes the act 1704 of the live video streaming system 106 broadcasting a public combined live video stream to the viewer devices 112. Indeed, as previously described, the live video streaming system 106 receives and combines live video streams from the participant devices 110. In various implementations, the live video streaming system 106 generates the public combined live video stream according to the participation triggers previously received, as further described below in connection with FIGS. 18A-18B.

The series of acts 1700 also includes an act 1706 of the live video streaming system 106 analyzing activity metrics of the viewer devices 112 during the public combined live video stream. For instance, the live video streaming system 106 actively or passively receives activity metrics from the viewer devices 112. Often, for each activity metric, the live video streaming system 106 can numerically rank, order, prioritize, arrange, and/or score the viewer devices 112. Additional detail regarding analyzing activity metrics of the viewer devices 112 is provided below in connection with FIG. 19.

As shown, the series of acts 1700 includes an act 1708 of the live video streaming system 106 identifying a target viewer device to participate in the public combined live video stream based on the activity metrics and the participation triggers. In various implementations, the live video streaming system 106 can utilize the analyzed activity metrics in connection with the received participation triggers to identify one or more target viewer devices. Indeed, the live video streaming system 106 can utilize the participation triggers to identify one or more target activity metrics and identify a target viewer device based on comparing the target activity metrics among the viewer devices 112. Additional detail regarding identifying a target viewer device is provided below in connection with FIG. 19.

As also shown, the series of acts 1700 includes an act 1710 of the live video streaming system 106 inviting the target viewer device to become a participant device. For example, in one or more implementations, the live video streaming system 106 sends a notification to the target viewer device confirming participation in the public combined live video stream. In alternative implementations, the live video streaming system 106 sends a notification (e.g., a countdown) to the target viewer device that it will shortly join the public combined live video stream. In some implementations, the live video streaming system 106 does not provide an invitation to begin adding the target viewer device to the public combined live video stream without an explicit invitation.

In various implementations, the live video streaming system 106 sends a prompt to the target viewer device seeking permission to publicly and/or privately share their live video stream (e.g., within the public combined live video stream). In some implementations, the live video streaming system 106 receives permission from the target viewer device when the viewer device first accesses the public combined live video stream. In various implementations, the target viewer device has previously granted the live video streaming system 106 permission to utilize and broadcast their live video stream.

As shown, the series of acts 1700 includes an act 1712 of the live video streaming system 106 transitioning the target viewer device from a viewer device to a participant device. As shown, the act 1712 shows the live video streaming system 106 moving the target viewer device from the viewer devices 112 to the participant devices 110. For simplicity, this disclosure will continue to refer to the target viewer device as the target viewer device even after it has become a participant device. In some implementations, the target viewer device receives different broadcasting permissions and options from other participant devices in the public combined live video stream. For example, the target viewer device is limited to participating only in the public combined live video stream while other participant devices, such as the host device, can modify broadcast settings, participation triggers, and/or participants.

As part of transitioning the target viewer device to the public combined live video stream, the live video streaming system 106 may perform several additional acts (e.g., acts 1714-1720). To illustrate, as shown, the series of acts 1700 includes an act 1714 of the live video streaming system 106 receiving a live video stream from the target viewer device. For example, the live video streaming system 106 begins receiving the live video stream from the target viewer device at the server device 102. In some implementations, the live video streaming system 106 adds the live video stream from the target viewer device to a digital room (e.g., a digital waiting room) before joining it to the public combined live video stream.

In addition, the series of acts 1700 includes an act 1716 of the live video streaming system 106 adding the live video stream from the target viewer device to the public combined live video stream. For example, in various implementations, the live video streaming system 106 generates an updated public combined live video stream by aligning the live video stream from the target viewer device with the live video streams of the other participant devices 110 (e.g., based on timestamp) and/or modifying the layout arrangement of video streams to accommodate the live video stream of the target viewer device. In some implementations, the live video streaming system 106 removes a current live video stream (e.g., from a previous target viewer device) in connection with adding the live video stream from the target viewer device.

Upon generating the updated public combined live video stream, the live video streaming system 106 can provide the updated public combined live video stream to the participant devices 110, as shown by an act 1718 of the series of act 1700. For example, as described above, the live video streaming system 106 can provide the updated public combined live video stream to the participant devices 110, including the target viewer device, using a real-time communication protocol. The live video streaming system 106 can also provide the updated public combined live video stream to the viewer devices 112, as shown by an act 1720 of the series of acts 1700. For instance, as described above, the live video streaming system 106 can provide a buffered version of the updated public combined live video stream to the viewer devices 112 utilizing a different communication protocol.

As mentioned above, FIGS. 18A-18B correspond to providing broadcast participation elements to a participant device (e.g., a host device) within a graphical user interface (e.g., a host user interface) in connection with a public combined live video stream. To illustrate, FIGS. 18A-18B show graphical user interfaces for establishing parameters for adding and removing viewer devices from a public combined live video stream in accordance with one or more implementations. In particular, FIGS. 18A-18B show versions of a host graphical user interface 1802 (or simply "host user interface 1802") on the host device 108 that includes elements, features, graphics, and options for initiating a public combined live video stream.

Similar to the host user interface 302 described above in connection with FIG. 3A, the host user interface 1802 corresponds to the host device 108 preparing to start a live video stream. As with FIG. 3A, the host user interface 1802 can include the application settings element 310, live stream settings elements 312, and the active followers indication 314, as described above. In addition, the host user interface 1802 can include live images 306 of the host (e.g., a user) captured by the host device 108, as previously disclosed.

As mentioned above in connection with FIG. 3A, the live stream settings elements 312 includes elements that can correspond to adding a title to the public combined live video stream, changing the setup or scheme of the public combined live video stream, and adding activities to the public combined live video stream. As shown in FIG. 18A, the live video streaming system 106 can detect selection of the "Setup" live stream settings element and, in response, update the host user interface 1802 to show a live stream setup menu 1804.

As shown, the live stream setup menu 1804 includes various live stream setup options 1806 including options to enable, modify, and/or specify a participant lineup, eligibility requirements, digital purchase options, digital auction settings, host authorizations, room access, and comments among other live stream setup options 1806 not show. As mentioned above, these live stream setup options 1806 can correspond to broadcast participation elements for establishing the framework of a public combined live video stream. Further, each of the broadcast participation elements can be associated with participation triggers for participating in a public combined live video stream.

To illustrate, the host user interface 1802 includes a participant lineup in the live stream setup options 1806. In one or more implementations, a participant lineup corresponds to one or more participant devices that are scheduled to join the public combined live video stream. For example, the participant lineup can include a framework or agenda of times and/or duration of participant devices to participate in the public combined live video stream. For instance, the participant lineup indicates that Participant Devices A and B will join at 1:00 pm for 30 mins, Participant Device C will join at 1:30 pm for 15 mins, and Participant Devices C and D will join the public combined live video stream at 2:00 pm. In alternative implementations, the participant lineup lists participant devices that are anticipated to participate sometime during the public combined live video stream.

In additional implementations, as part of setting the participant lineup, the live video streaming system 106 can provide options to the host device 108 to utilize digital rooms in adding and removing participant devices from the public combined live video stream. For example, the live video streaming system 106 can create one or more digital waiting rooms for participant devices that are to join during the public combined live video stream, as described above. Indeed, the live video streaming system 106 can enable the host device 108 to provide input assigning participant devices in the participant lineup to a digital preparation room, one or more digital waiting rooms, one or more digital post-participation room, and/or an after broadcast room.

In additional implementations, the live video streaming system 106 can generate participation triggers in connection with the digital rooms. For instance, the live video streaming system 106 generates a participation trigger for transitioning a participant device from a digital room to the public combined live video stream (and vice versa). For example, one or more participation triggers to transfer a pending participant device to the public combined live video stream can include receiving input from a host device and/or a pending participant device to add the pending participant device, expiration of a timer within a digital room, and/or the pending participant device in a digital room meeting minimum video quality broadcast requirements.

In some implementations, the live video streaming system 106 displays the participant lineup to the viewer devices 112 during the public combined live video stream. For example, the live video streaming system 106 adds digital stickers announcing a time when a participant device will join the public combined live video stream or indicate a new participant device joining (or leaving) the public combined live video stream. In various implementations, the live video streaming system 106 makes the participant lineup, or portions thereof, available to viewer devices 112 before, during or after a public combined live video stream.

As mentioned above, the live stream setup options 1806 include eligibility requirements. For example, in one or more implementations, the host device 108 can provide a list of criteria for participation in the public combined live video stream. For instance, the host device 108 indicates that the live video streaming system 106 can automatically add participant devices that are associated with verified accounts, have a threshold number of followers, are socially connected to the host device 108, are pre-approved by the host device 108, etc. Other examples of eligibility requirements can include requiring that participant devices provide a live video stream that satisfies minimum quality metrics such as a video quality level and minimum lag time. Further, eligibility requirements can include that a potential participant device agrees to participate and share (e.g., grant permission) their live video stream before joining the public combined live video stream.

In some implementations, as part of the eligibility requirements, the live video streaming system 106 applies participation triggers based on a selected eligibility requirement. For example, the live video streaming system 106 implements a participation trigger for adding a participant device to the public combined live video stream and/or a participation trigger for removing a participant device from the public combined live video stream. In this manner, the live video streaming system 106 can broadcast the public combined live video stream in accordance with the participation triggers being satisfied.

The live stream setup options 1806 also include digital purchase options. In one or more implementations, the live video streaming system 106 enables the host device 108 to setup digital purchase options in connection with the public combined live video stream. For example, the host device 108 can designate the public combined live video stream as a fundraiser (e.g., accept tips and/or donations) or a promotional video stream (e.g., receive ad revenue). Additionally, or in the alternative, the host device 108 selects digital purchase options corresponding to viewer devices purchasing virtual or physical merchandise, and/or sponsorships.

In additional implementations, the digital purchase options correspond to the viewer devices 112 purchasing digital tickets. For example, the live video streaming system 106 enables the host device 108 to set up a framework for purchasing access to digital rooms before, during or after the public combined live video stream (e.g., VIP dig access). As another example, the live video streaming system 106 enables the host device 108 to establish digital purchases for a viewer device to watch or participate in the public combined live video stream. In some implementations, a digital ticket provides access to a limited portion of the public combined live video stream (e.g., purchase for a set duration of time or while a particular participant device is participating in the public combined live video stream).

In some implementations, the digital purchase can correspond to digital support badges. For instance, the live video streaming system 106 enables the host device 108 to select one or more levels of digital support. In some instances, a digital support badge appears next to an identity of a viewer device and/or comments of the viewer device within the public combined live video stream. The live video streaming system 106 can enable the host device 108 to offer a variety of digital support badges to the viewer devices 112 during the public combined live video stream, which can trigger different responses from the live video streaming system 106 (e.g., display a special or distinct graphic or emoji in connection with a viewer device during the public combined live video stream a thank you message from the host, or inclusion in a supporter's list).

As shown, the live stream setup options 1806 include an option for digital auction settings. In one or more implementations, the live video streaming system 106 provides digital auction settings to the host device 108 to establish parameters for conducting a digital auction during the public combined live video stream. For example, the live video streaming system 106 enables the host device 108 to conduct one or more auctions during the public combined live video stream where the viewer devices digitally bid to participate in the public combined live video stream. In some implementations, a digital auction corresponds to access to a digital room. For instance, the live video streaming system 106 provides access to the after broadcast room (e.g., VIP access) to the top five highest bidders during a public combined live video stream.

In one or more implementations, the live video streaming system 106 can receive digital bids from viewer devices corresponding to money. In some implementations, digital bids correspond to other factors. For example, viewer devices accumulate fan or follower points based on performing various actions. For instance, a viewer device obtains points by watching the public combined live video stream for a predetermined length of time, commenting on the public combined live video stream, sharing the public combined live video stream with others, watching other live video streams of the host device, etc. The viewer devices then place bids using their digital fan points. In various implementations, the live video streaming system 106 determines one or more winners of a digital auction based on a combination of factors, such as monetary digital bids and fan point bids.

Additionally, the live stream setup options 1806 include options for host authorizations. In one or more implementations, the host device 108 can provide the live video streaming system 106 with input authorizing another participant device to serve as a co-host or to pass control to another participant device should the host device 108 prematurely exit the public combined live video stream. In some implementations, the host device 108 grants a subset of permissions to one or more participant devices. For example, the host device 108 enables a participant device to add and remove other participant devices, have access to live video streams of digital rooms, and/or modify other live stream setup options 1806.

In one or more implementations, the live video streaming system 106 can enable the host device 108 to authorize a non-participant device. For example, the host device 108 grants full or partial permissions and authorizations to a device that is not participating in the public combined live video stream (e.g., a manager device). In this manner, the non-participant device can perform some or all of the same functions as the host device 108 before, during, or after the public combined live video stream but without being a video participant of the public combined live video stream (e.g., without providing a live video stream to the live video streaming system 106).

Further, as shown, the live stream setup options 1806 include an option for digital room access. In one or more implementations, the host device 108 can specify which digital rooms to create for the public combined live video stream, which participant devices to add to which digital rooms, conditions for adding participant devices to a digital room, participant triggers for a digital room, whether groups of participant devices share a digital room or are placed in separate digital rooms, and/or access rights to the digital rooms. Indeed, the live video streaming system 106 enables the host device 108 (or another authorized device) to specify the conditions and parameters for digital rooms, as disclosed above.

As mentioned above, the option for digital room access can include establishing participant triggers for a digital room. In one or more implementations, the live video streaming system 106 applies a participant trigger for transiting a participant device from a digital room to the public combined live video stream, such as from a digital preparation room or digital waiting room. In some implementations, the live video streaming system 106 applies a participant trigger for transitioning a participant device from the public combined live video stream to a post-participation waiting room.

Additionally, the live stream setup options 1806 includes an option for comments. In some implementations, the live video streaming system 106 enables the host device 108 to enable or disable comments, locate where comments are shown in the public combined live video stream, restrict who can comment or comment content, prioritize comments from some devices, and/or enable comments to trigger animations or graphics during the public combined live video stream. The options for comments can include addition or different options.

Moreover, the live stream setup options 1806 can enable the host device 108 to provide a framework and/or agenda for the public combined live video stream including which participant devices will join the public combined live video stream and how participant devices will transition in and out of the public combined live video stream (e.g., based on participation triggers being satisfied) among other options. Further, the live stream setup options 1806 can include additional live stream setup options now shown, such as options corresponding to the length of the public combined live video stream, a maximum number of participant devices, a maximum number of viewer devices, or audience restrictions.

As mentioned above, the live stream settings elements 312 can include an activities element. The host device 108 can select one or more activities associated with a public combined live video stream. To illustrate, FIG. 18B shows the activity element 1810 selected within the host user interface 1802. As shown, the host user interface 1802 shows the activity element 1810 along with an activities list 1812 of example activities the live video streaming system 106 can facilitate during a public combined live video stream.

In various implementations, activities correspond to inviting viewer devices 112 to participate in the public combined live video stream along with the host device 108 and/or other participant devices. Indeed, as mentioned above, the live video streaming system 106 can add a target viewer device to participate in a public combined live video stream based on analyzing activity metrics of the viewer devices 112. Similarly, the live video streaming system 106 can determine a participant device to remove or replace based on analyzing activity metrics of participant devices of a public combined live video stream.

As shown, the activities list 1812 includes games. In many implementations, games correspond to a set of rules for facilitating interactions between participant devices and/or viewer devices. In some instances, a game is turn-based where participant devices take turns playing the game. In other instances, a game can enable multiple participant devices to participate at the same time, such as team-based games. In various instances, a game allows viewer devices to participate (e.g., by providing answers through comments or other digital input elements) in the game. Games can include turn-based games, role-playing games, individual or team challenges, etc.

Based on the type of game selected, the live video streaming system 106 can determine one or more activity metrics for determining viewer devices to participate in the public combined live video stream. For example, based on a game involvement metric or an answer metric, the live video streaming system 106 determines a target viewer device to become a participant device in the public combined live video stream. Additionally, the live video streaming system 106 can follow the structure or rules of a game to determine which participant devices to remove from the public combined live video stream and/or temporarily place in a digital room (e.g., until it is their turn again or the game is over).

As shown, the activities list 1812 includes musical chairs. In various implementations, the activity of musical chairs includes swapping viewer devices in and out regular, random, or semi-random intervals. In these implementations, the live video streaming system 106 can analyze a presence activity metric to determine which viewer devices are currently present during the public combined live video stream (e.g., the associated participation trigger includes actively watching the public combined live video stream). For example, the presence activity metric is based on data received from the viewer devices indicating that the viewer device is actively watching and/or contributing to the public combined live video stream. In this manner, when selecting a target viewer device to participate in the public combined live video stream, the target viewer device will be available and ready to join upon being selected as the target viewer device.

In some implementations, the activity of musical chairs includes removing target viewer devices based on their performance. For example, the live video streaming system 106 adds various viewer devices as participants to the public combined live video stream, then allows them to compete to remain on the public combined live video stream. In some implementations, the live video streaming system 106 can allow other viewer devices to compete to replace existing participant devices. In alternative implementations, the live video streaming system 106 can randomly pick a target viewer device from among the viewer devices 112 and/or utilize another type of activity metric to select a target viewer device.

As shown, the activities list 1812 includes popcorn. The activity of popcorn can include randomly swapping viewer devices in and out of the public combined live video stream. For example, the live video streaming system 106 selects a target viewer device based on activity metrics of the viewer devices 112 at a random time, then adds the target viewer device to the public combined live video stream. In some instances, the live video streaming system 106 prompts the target viewer device to accept or pass in participating in the public combined live video stream. Similarly, under the popcorn activity, the live video streaming system 106 can randomly remove or replace a target viewer device as a participant from the public combined live video stream.

As shown, the activities list 1812 includes scramble. In one or more implementations, the scramble activity can include swapping out multiple participant devices at the same time. For example, the live video streaming system 106 determines multiple target viewer devices from the viewer devices to participate in the public combined live video stream based on activity metrics and adds those target viewer devices to the public combined live video stream. In adding the target viewer devices, the live video streaming system 106 can remove other participant devices from the public combined live video stream (e.g., one or more previously identified target viewer devices). The live video streaming system 106 can continue to replace target viewer devices participating in the public combined live video stream with new sets of target viewer devices.

As shown, the activities list 1812 includes voting. In various implementations, the activity of voting can include the host device 108 and/or participant devices voting to include a viewer device. In these implementations, the live video streaming system 106 analyzes digital votes or voting metrics to identify a target viewer device. In various implementations, the viewer devices provide digital votes, which enable the live video streaming system 106 to select a target viewer device to add to the public combined live video stream. In some implementations, the viewer devices can perform various actions to try to solicit votes. Similar to the voting activity, in some implementations, the activities list 1812 can utilize polling to select a target viewer device.

As shown, the activities list 1812 includes question and answer (shown as "Q and A"). In one or more implementations, the question and answer activity can include viewer devices providing questions and/or requesting to provide questions to the host device 108 and/or other participant devices in the public combined live video stream. Based on detecting question requests, the live video streaming system 106 can determine a target viewer device to join the public combined live video stream (e.g., enabling the target viewer device to ask their question).

In some implementations, the question and answer activity can include host device 108 and/or other participant devices asking questions to the viewer devices, and the live video streaming system 106 selecting various viewer devices to participate to provide answers. For example, the live video streaming system 106 analyzes response or answer metrics from the viewer devices to determine a target viewer device.

As shown, the activities list 1812 includes trivia. In some implementations, the activity of trivia can include the live video streaming system 106 providing questions to the viewer devices, and the live video streaming system 106 analyzing participation metrics to determine a target viewer device. For example, the winning viewer device is selected as a target viewer device. As another example, the live video streaming system 106 selects a target viewer device based on the viewer device promptly requesting to respond to a trivia question such that the viewer device can provide their answer as a participant of the public combined live video stream.

As shown, the activities list 1812 includes other activity templates. Indeed, the live video streaming system 106 can provide additional or different activities for a public combined live video stream. For each of these activities, the live video streaming system 106 can monitor and analyze particular activity metrics to determine target viewer devices to add to the public combined live video stream. Further, based on a selected activity, the live video streaming system 106 can determine which devices to remove from the public combined live video stream and when to remove these devices (e.g., either make the device a viewer device or transition the device to a digital room).

Figure 19:
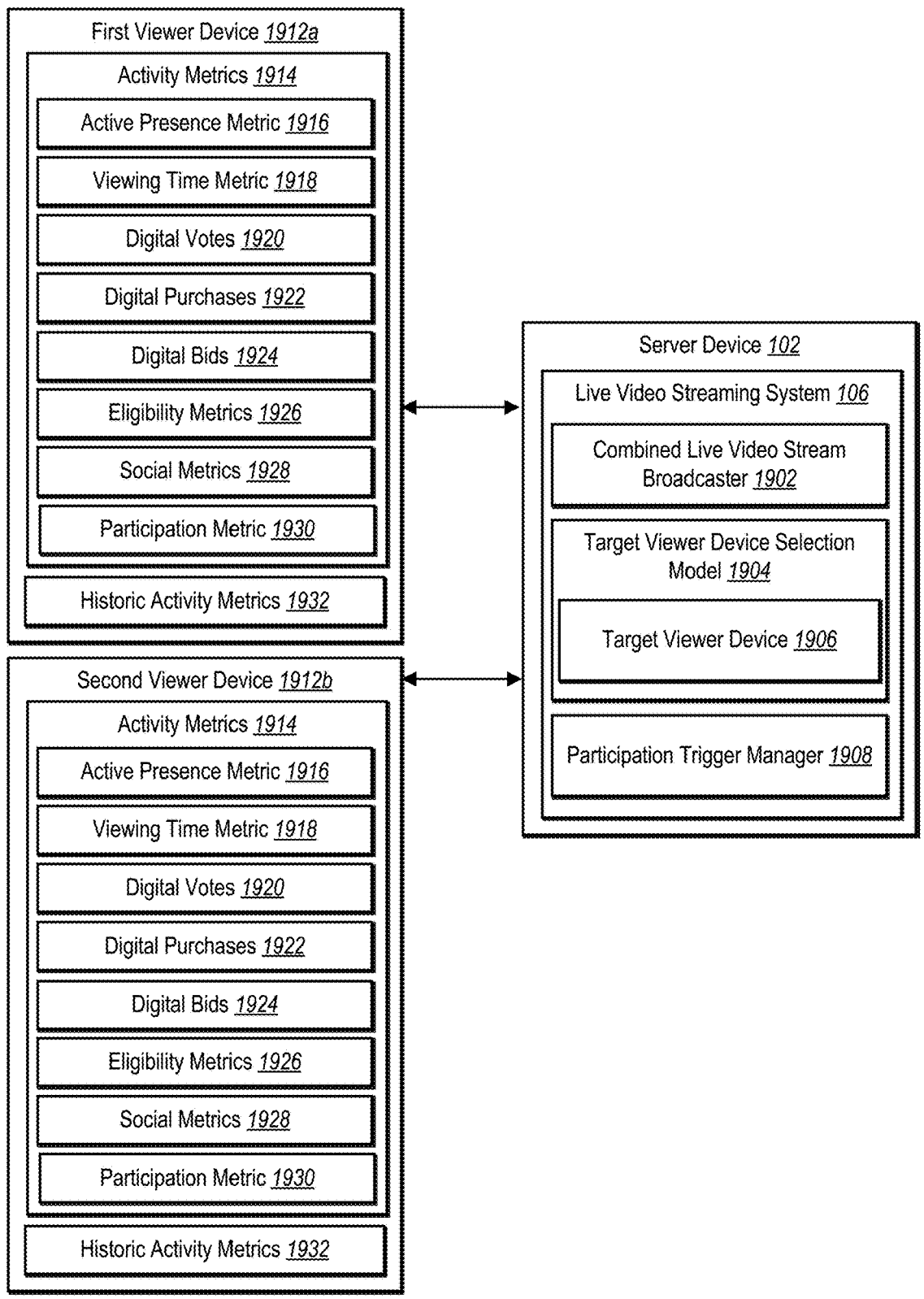
FIG. 19 illustrates a block diagram of analyzing activity metrics of viewer devices to identify a target viewer device to participate in a public combined live video stream in accordance with one or more implementations.

As mentioned above, the live video streaming system 106 can analyze activity metrics of viewer devices to determine a target viewer device to participate in a public combined live video stream. To further illustrate, FIG. 19 shows a block diagram of analyzing activity metrics of viewer devices to identify a target viewer device to participate in a public combined live video stream in accordance with one or more implementations. As shown, FIG. 19 includes the live video streaming system 106 on the server device 102, a first viewer device 1912*a*, and a second viewer device 1912*b*. As described above in connection with FIG. 1, these computing devices can communicate via a network. Further, while FIG. 19 described analyzing activity metrics of viewer devices, the live video streaming system 106 can apply similar approaches to analyze activity metrics of participant devices.

As illustrated, the first viewer device 1912*a* and the second viewer device 1912*b* include activity metrics 1914. As shown, the activity metrics 1914 include an active presence metric 1916, a viewing time metric 1918, digital votes 1920, digital purchases 1922, digital bids 1924, eligibility metrics 1926, social metrics 1928, participation metrics 1930. In addition, the first viewer device 1912*a* and the second viewer device 1912*b* include historic activity metrics 1932. Each of the activity metrics is further discussed below.

As also illustrated, the live video streaming system 106 includes a public combined live video stream broadcaster 1902, a target viewer device selection model 1904, and a participation trigger manager 1908. In one or more implementations, the public combined live video stream broadcaster 1902 can generate and provide a public combined live video stream to the viewer devices, as previously described. For example, in some implementations, the public combined live video stream broadcaster 1902 combines live video streams from participant devices and provides the public combined live video stream to the first viewer device 1912*a* and the second viewer device 1912*b* as well as other viewer devices not shown. In addition, the public combined live video stream broadcaster 1902 can provide the public combined live video stream to the participant devices, as described above.

In one or more implementations, the target viewer device selection model 1904 determines a target viewer device 1906 from among the viewer devices watching the public combined live video stream. As mentioned above, the target viewer device selection model 1904 can analyze the activity metrics 1914 of the viewer devices to determine the target viewer device 1906.

In various implementations, the target viewer device selection model 1904 communicates with the participation trigger manager 1908 to determine which of the activity metrics 1914 to analyze or prioritize when determining the target viewer device 1906. For example, based on the live video streaming system 106 detecting a selection of a particular activity for a public combined live video stream (as described above in connection with FIG. 18B), the participation trigger manager 1908 can determine which of the activity metrics 1914 are needed to satisfy the associated participation triggers.

To illustrate, in one or more implementations, the target viewer device selection model 1904 can identify the target viewer device 1906 based on analyzing the active presence metric 1916. In many implementations, the active presence metric 1916 corresponds to current activity at a viewer device. For example, the active presence metric 1916 at the first viewer device 1912*a* can indicate if the first viewer device 1912*a* has recently detected movement or user input. For instance, if the first viewer device 1916 has detected navigational input within a graphical user interface displaying the public combined live video stream or a change in volume, the first viewer device 1912*a* can provide this information to the live video streaming system 106 as part of an active presence metric 1916 indicating whether a user is active at the first viewer device 1912*a*. Similarly, the active presence metric 1916 can indicate other types of information indicating the presence of an active user, such as providing reactions or comments in the public combined live video stream.

In one or more implementations, the active presence metric 1916 can indicate that a user is present and ready to join a public combined live video stream based on implicit or explicit feedback from the first viewer device 1912*a*. For example, the live video streaming system 106 prompts the first viewer device 1912*a* for permission or acceptance to join the public combined live video stream and, in response, the first viewer device 1912*a* provides a positive or negative response encoded as an active presence metric 1916. In some implementations, the live video streaming system 106 (e.g., at the server device or the first viewer device 1912*a*) utilizes facial detection software to determine that a user is currently watching the public combined live video stream.

Upon receiving the active presence metrics from multiple viewer devices, the target viewer device selection model 1904 can analyze and compare the active presence metrics. For example, the target viewer device selection model 1904 generates a score or probability that a user is watching the public combined live video stream for each viewer device. Using the scores or probabilities, the target viewer device selection model 1904 identifies and/or selects one or more target viewer devices. For example, the target viewer device selection model 1904 selects a target viewer device from among a group of viewer devices that has a score above a threshold level. As another example, the target viewer device selection model 1904 selects the viewer device with the highest score as the target viewer device 1906.

In one or more implementations, the target viewer device selection model 1904 can identify the target viewer device 1906 based on analyzing the viewing time metric 1918 (e.g., when the viewing time metric 1918 satisfies a viewing length participation trigger or an interest level trigger). In general, the viewing time metric 1918 can correspond to the length of time a viewer device has watched live video streams that include the host device as a participant. For example, in some instances, the viewing time metric 1918 corresponds to the length of time a viewer device has been watching the current public combined live video stream. In other instances, the viewing time metric 1918 corresponds to a cumulative length of time a viewer device has watched live video streams that include the host device (e.g., within the last week, month, year).

The target viewer device selection model 1904 can analyze the viewing time metrics across the viewer devices to identify the target viewer device 1906. For example, the target viewer device selection model 1904 selects the second viewer device 1912*b* as the target viewer device 1906 when the viewing time metric 1918 of the second viewer device 1912*b* is larger than the viewing time metric 1918 of the first viewer device 1912*a*. As another example, the target viewer device selection model 1904 filters out viewer devices that do not satisfy a minimum viewing time threshold before selecting a target viewer device (e.g., viewer devices that have watched less than 20% or 5 minutes of the public combined live video stream are not eligible to be selected as the target viewer device 1906).

In various implementations, the target viewer device selection model 1904 can identify the target viewer device 1906 based on analyzing the digital votes 1920. For example, if the target viewer device selection model 1904 detects an activity that includes voting (e.g., games, musical chairs, polls, voting, questions and answers), the target viewer device selection model 1904 can receive digital votes from the viewer devices 112 and/or participant devices. In some implementations, the target viewer device selection model 1904 can compare the digital votes to determine whether to remove one or more viewer devices as candidates for a target viewer device. In various implementations, the target viewer device selection model 1904 can compare the digital votes to identify the viewer device with the highest number of votes as the target viewer device 1906.

In one or more implementations, the target viewer device selection model 1904 can identify the target viewer device 1906 based on analyzing digital purchases 1922. Digital purchases 1922 can include, but are not limited to, virtual tickets, support badges, donations, tips, and gifts. For example, in some implementations, a virtual ticket can include purchasing access to participate in a public combined live video stream. Indeed, for a public combined live video stream that features a celebrity or another notable person, the live video streaming system 106 can offer virtual tickets to participate in the public combined live video stream along with the celebrity. In various implementations, a virtual ticket provides viewing access to a digital room, such as the after broadcast room after a public combined live video stream has concluded. The live video streaming system 106 can offer different tiers of virtual tickets that grant different levels of access to the host device and/or the participant devices.

As mentioned above, a digital purchase can include support badges. In one or more implementations, a support badge corresponds to displaying a graphic, animation, or text in connection with a viewer device that is viewable by the participant devices and the other viewer devices. For example, a digital badge can correspond to a one-time or reoccurring indicator attached to the identifier of a viewer device. As another example, a digital badge can allow a viewer device to leave comments that appear distinct to ordinary comments or provide reactions not available to non-supporters.

As also mentioned above, a digital purchase can include donations or tips. For example, viewer devices can provide donations to a host device during the public combined live video stream and/or leave tips in the font) of virtual currency. Additionally, a viewer device can purchase a digital purchase for another user as a gift. For example, the first viewer device 1912*a* purchases a virtual ticket as a gift for the second viewer device 1912*b* that enables the second viewer device 1912*b* to participate in the public combined live video stream.

In various implementations, the target viewer device selection model 1904 can identify a target viewer device based on the digital purchases 1922. For example, the target viewer device selection model 1904 selects a viewer device as the target viewer device 1906 based on detecting a donation, a tip, a purchased digital ticket, and/or a support badge associated with the viewer device. In some implementations, the target viewer device selection model 1904 provides additional weight to viewer devices 112 that are associated with digital purchases 1922.

In some implementations, the target viewer device selection model 1904 can identify the target viewer device 1906 based on analyzing the digital bids 1924. As mentioned above, a host device (or another participant device including a non-participant device) can include a digital auction within a public combined live video stream. For example, the public combined live video stream includes a digital auction where viewer devices 112 bid against each other to become a participant in the public combined live video stream. In some implementations, the viewer devices provide digital bids. In response, the target viewer device selection model 1904 analyzes and compares the digital bids to identify the target viewer device 1906. In some implementations, when multiple slots to participate in the public combined live video stream are available, the target viewer device selection model 1904 can accept the highest n number of bids, where n corresponds to the number of available slots.

In some implementations, the target viewer device selection model 1904 can identify the target viewer device 1906 based on analyzing the eligibility metrics 1926. As mentioned above, the live video streaming system 106 can enable a host device to establish eligibility requirements for participating in the public combined live video stream (e.g., a verified account, minimum device streaming quality, granted authorization to utilizing their live video stream, etc.). Accordingly, the target viewer device selection model 1904 can select the target viewer device 1906 from among viewer devices that satisfy the eligibility requirements.

Additionally, in some implementations, the target viewer device selection model 1904 can identify the target viewer device 1906 based on analyzing the social metrics 1928. For example, the target viewer device selection model 1904 determines a social affinity between the host device and each of the viewer devices. For instance, the target viewer device selection model 1904 selects the target viewer device 1906 from among a subset (e.g., less than all) of the viewer devices that are within a number of social hops to the host device.

As another example, the target viewer device selection model 1904 can analyze the social connectedness of each viewer device. The activity metric of social connectedness can include the number of connections, the number of posts, the number of shares, the number of mentions, and/or the influence level of a viewer device. In some implementations, the target viewer device selection model 1904 may identify a viewer device as the target viewer device 1906 based on the viewer device satisfying a threshold social influential level.

In one or more implementations, the target viewer device selection model 1904 can identify the target viewer device 1906 based on analyzing the participation metrics 1930. A participation metric can include a range of participation activities detected at a viewer device. Indeed, the participation metrics 1930 can be categorized into more granular levels of participation, such as participation metrics corresponding to watching the public combined live video stream, posting reaction, commenting, participating in a game or poll, asking or answering questions, voting, etc.

In various implementations, the target viewer device selection model 1904 utilizes the participation metrics 1930 to identify a target viewer device. For example, based on the host device selecting a particular activity, the target viewer device selection model 1904 identifies one or more corresponding participation metrics 1930 to monitor and analyze. For instance, the target viewer device selection model 1904 compares a particular set of participation metrics 1930 across the viewer devices to select a target viewer device that best satisfies the participation triggers associated with the selected activity.

In some implementations, the target viewer device selection model 1904 can identify the target viewer device 1906 based on analyzing the historic activity metrics 1932. Examples of historic activity metrics 1932 include, but are not limited to previous viewing time metrics, previous participation metrics, and previous digital purchases. Indeed, the target viewer device selection model 1904 can determine the target viewer device 1906 based, in part, on previous activity metrics observed from a viewer device. In this manner, a viewer device that continues to view the public combined live video stream and/or interact with the host device can increase their likelihood of being identified as the target viewer device 1906.

Moreover, in various implementations, the target viewer device selection model 1904 can identify the target viewer device 1906 based on a combination of activity metrics 1914 and/or participation triggers. For example, the participation trigger manager 1908 indicates a number of participation triggers to be satisfied by a viewer device before it can be selected as the target viewer device 1906. In response, the target viewer device selection model 1904 identifies that the viewing time metric 1918 of the first viewer device 1912*a* satisfies a length participation trigger, that the active presence metric 1916 of the first viewer device 1912*a* satisfies an actively watching participation trigger, and that the participation metric (e.g., a response metric) of the first viewer device 1912*a* satisfies a response participation trigger. Accordingly, based on determining that the activity metrics of the first viewer device 1912*a* satisfy each of the participation triggers, the target viewer device selection model 1904 selects the first viewer device 1912*a* as the target viewer device 1906.

In some implementations, the target viewer device selection model 1904 selects the target viewer device 1906 based on user input. For example, the host device or another participant device identifies a viewer device as the target viewer device 1906 (e.g., they select the target viewer device 1906 based on a subjective standard such as most crazy outfit). In some implementations, the target viewer device selection model 1904 provides the host device with a presence list (e.g., a list of activity viewing or contributing viewer devices) and allows the host device to select the target viewer device from the presence list. In many implementations, the presence list can match or be similar to the order or ranked viewer devices described above.

In addition to FIGS. 1-13C and FIGS. 16-19, the corresponding text, and the examples provide several different systems, methods, techniques, components, and/or devices of the live video streaming system 106 in accordance with one or more implementations. In addition to the description herein, one or more implementations can also be described in terms of flowcharts including acts for accomplishing a particular result. For example, FIG. 20 illustrates a flowchart of example sequences of acts 2000 in accordance with various implementations. In addition, FIG. 20 may be performed with more or fewer acts. Further, the acts may be performed in differing orders. Additionally, the acts described herein may be repeated or performed in parallel with one another or parallel with different instances of the same or similar acts.

While FIG. 20 illustrates a series of acts 2000 according to particular implementations, alternative implementations may omit, add to, reorder, and/or modify any of the acts shown. The series of acts 2000 can be performed as part of a method. Alternatively, a non-transitory computer-readable medium can comprise instructions, when executed by one or more processors, cause a computing device (e.g., a server device and/or a client device) to perform the series of acts 2000. In still further implementations, a system performs the series of acts 2000.

To illustrate, FIG. 20 shows a flowchart of a series of acts 2000 of identifying target viewer devices to participate in combined live video streams (e.g., public combined live video streams) in accordance with one or more implementations. As shown, the series of acts 2000 includes an act 2010 of combining live video streams received from participant devices into a combined live video stream. For example, the act 2010 can include combining a plurality of live video streams received from a plurality of participant devices into a combined live video stream (e.g., a public combined live video stream). In various implementations, the act 2010 is performed at a server device that receives the live video streams from the participant devices.

As shown, the series of acts 2000 includes an act 2020 of broadcasting the combined live video stream to viewer devices. For example, the act 2020 can include broadcasting, by the server device, the combined live video stream (e.g., a public combined live video stream) to a plurality of viewer devices. In one or more implementations, the act 2020 includes providing a user interface including broadcast participation elements indicating participation triggers to a first device of the plurality of participating devices prior to broadcasting the combined live video stream and receiving, from the first device, selection of one or more participation triggers for adding participant devices to the combined live video stream.

As shown, the series of acts 2000 includes an act 2030 of identifying activity metrics associated with the viewer devices. For example, the act 2030 can include identifying one or more activity metrics associated with the plurality of viewer devices. In one or more implementations, the act 2030 includes receiving the one or more activity metrics at the server device. In some implementations, the activity metrics are based on one or more participation triggers associated with the combined live video stream.

As shown, the series of acts 2000 includes an act 2040 of identifying a target viewer device to participate in the combined live video stream. For example, the act 2040 can include identifying a target viewer device of the plurality of viewer devices to participate in the combined live video stream based on analyzing the one or more activity metrics. In example implementations, the act 2040 includes identifying the target viewer device to participate in the combined live video stream in accordance with the participation trigger based on identifying an activity metric from the target viewer device that satisfies a participation trigger of the one or more participation triggers.

In one or more implementations, the act 2040 includes receiving digital votes from the plurality of viewer devices selecting one or more viewer devices to participate in the combined live video stream and comparing the digital votes to identify the target viewer device to participate in the combined live video stream. In some implementations, the act 2040 includes receiving a plurality of digital bids from the plurality of viewer devices and comparing the plurality of digital bids from the plurality of viewer devices to identify the target viewer device to participate in the combined live video stream. In various implementations, the act 2040 includes analyzing an active presence metric from the target viewer device to determine that the target viewer device is actively viewing the combined live video stream and identifying the target viewer device utilizing the active presence metric.

In some implementations, the act 2040 includes identifying a digital purchase corresponding to the target viewer device and selecting the target viewer device to participate in the combined live video stream based on the digital purchase. In one or more implementations, the act 2040 includes determining viewing time metrics of the plurality of viewer devices and comparing the viewing time metrics of the plurality of viewer devices to identify the target viewer device to participate in the combined live video stream.

As shown, the series of acts 2000 includes an act 2050 of adding the target viewer device to the combined live video stream (e.g., a public combined live video stream). For example, the act 2050 can include adding a live video stream received from the target viewer device to the combined live video stream being broadcasted to the plurality of viewer devices at the server device.

In one or more implementations, the act 2050 includes acts of comparing timestamps of the live video streams; generating a synchronized combination of the live video streams of the target viewer device and the plurality of live video streams from the plurality of participant devices based on comparing the timestamps; determining a visual arrangement of the live video stream of the target viewer device and one or more live video streams of the plurality of live video streams from the plurality of participant devices; generating the combined live video stream by aligning the synchronized combination of the live video streams of the target viewer device and the plurality of live video streams from the plurality of participant devices according to the visual arrangement; and broadcasting the combined live video stream to the plurality of viewer devices displayed according to the visual arrangement.

In various implementations, the act 2050 also includes switching participant devices within the combined live video stream at the server device. For example, the act 2050 includes switching participant devices by removing the live video stream of the target viewer device from the combined live video stream and adding a live video stream of an additional target viewer device to the combined live video stream in accordance with at least one participation trigger of the one or more participation triggers.

The series of acts 2000 can include various additional acts. For example, in one or more implementations, the series of acts 2000 also includes acts of identifying an additional target viewer device based on user input received from a first device associated with the plurality of participant devices and adding a live video stream of the additional target viewer device to the combined live video stream based on the received user input provided from the first device. In some implementations, the series of acts 2000 also includes an act of removing, at the server device, the live video stream from the target viewer device from the combined live video stream being broadcasted to the plurality of viewer devices.

Figure 21:
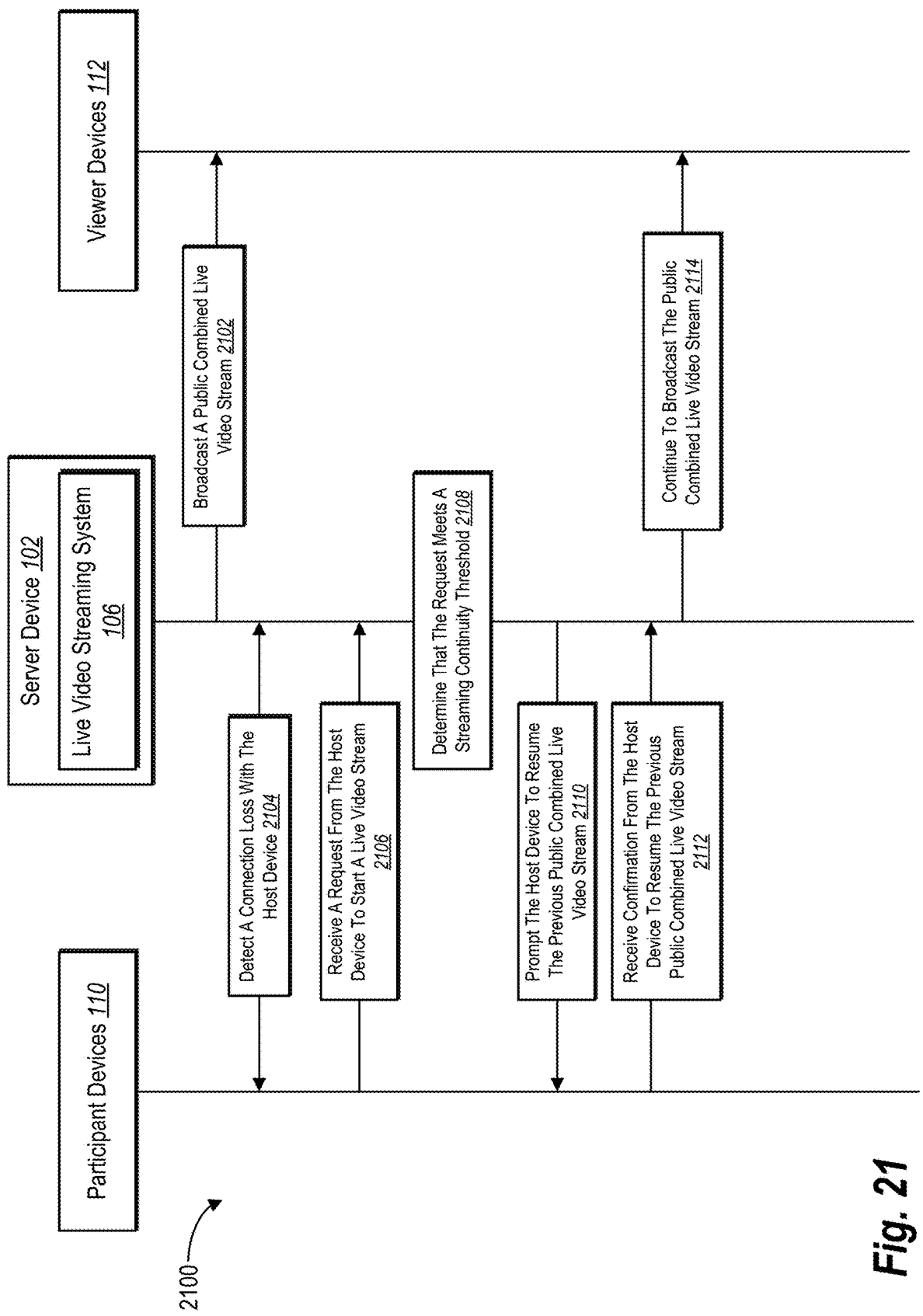
FIG. 21 illustrates a sequence diagram of resuming a disconnected public combined live video stream in accordance with one or more implementations.

As mentioned previously, it is possible for a public combined live video stream to be disrupted or disconnected. FIG. 21 illustrates a sequence diagram of a series of acts 2100 of resuming a disconnected public combined live video stream in accordance with one or more implementations. The series of acts 2100 includes the live video streaming system 106 communicating with the participant devices 110 (which can include a host device) and the viewer devices 112. Further, while the series of acts 2100 is described with reference to a host device, another participant device and/or a non-participant device may perform similar functions.

As additional context, if a host device 108 loses their connection to the public combined live video stream, the public combined live video stream is prematurely ended. Indeed, the viewer devices 112 are cut off from the public combined live video stream as if the host device has ended the stream. However, as described in connection with the series of acts 2100 in FIG. 21, the live video streaming system 106 provides various solutions that prevent abruptly ending a public combined live video stream if the host device is disconnected.

To illustrate, the series of acts 2100 includes an act 2102 of the live video streaming system 106 broadcasting a public combined live video stream to the viewer devices 112. Broadcasting a public combined live video stream to the viewer devices 112 as described previously. For example, the live video streaming system 106 provides a single live video stream that combines live video streams of the pending participant device 110, as arranged at the server device 102.

In addition, the series of acts 2100 includes an act 2104 of the live video streaming system 106 detecting a connection loss with the host device. For example, in one or more implementations, the live video streaming system 106 determines that the host device has stopped providing a live video stream to the live video streaming system 106 without receiving a request from the host device to end the public combined live video stream (e.g., the live video streaming system 106 did not detect a selection of an end broadcast element at the host device, as described above). As another example, the live video streaming system 106 determines that the proper communication protocols were not followed for ending the public combined live video stream.

In some implementations, before the live video streaming system 106 determines that the host device 108 has disconnected from the public combined live video stream, the live video streaming system 106 waits for a predetermined amount of time to account for connection latency or dropped data packets. In additional implementations, the live video streaming system 106 can send a data packet to the host device 108. Based on the response, the live video streaming system 106 can determine whether the host device 108 is still connected to the live video streaming system 106.

As shown, the series of acts 2100 includes an act 2106 of the live video streaming system 106 receiving a request from the host device to start a live video stream. For example, the host device, via a networking system application associated with the live video streaming system 106, again requests to start a live video stream or a public combined live video stream with other participant devices. Indeed, if the host device crashed, the host device would repeat the process of starting a new live video stream. Accordingly, the live video streaming system 106 would detect these actions at the host device, as shown by the act 2106.

In addition, the series of acts 2100 includes an act 2108 of the live video streaming system 106 determining that the request meets a streaming continuity threshold. For example, in one or more implementations, the live video streaming system 106 determines that the streaming continuity threshold is satisfied based on the request to start a new live video stream being within a time threshold of being disconnected (e.g., 10 seconds, 15 seconds, 30 seconds, 1 minute, etc.).

In some implementations, the live video streaming system 106 utilizes session information and/or client device information from the host device to determine that the request meets a streaming continuity threshold. For example, the live video streaming system 106 matches the request from the host device to the last request made by the same host device to determine that the new request corresponds to the disconnected public combined live video stream.

As shown, the series of acts 2100 includes an act 2110 of the live video streaming system 106 prompting the host device to resume the previous public combined live video stream. For example, upon determining that the new request meets the streaming continuity thresholds, the live video streaming system 106 causes the host device to show a prompt whether to resume the previous public combined live video stream or start a new public combined live video stream. For instance, the host device displays a message within a host user interface that reads, "It appears that your live stream was disconnected" and "Would you like to resume your live steam?"

As further shown, the series of acts 2100 includes an act 2112 of the live video streaming system 106 receiving confirmation from the host device to resume the previous public combined live video stream. For example, the live video streaming system 106 detects the host device selecting the option to resume the previous public combined live video stream. In alternative implementations, the live video streaming system 106 determines that the host devices declines the option to resume the public combined live video stream.

As shown, the series of acts 2100 includes the act 2114 of the live video streaming system 106 continuing to broadcast the public combined live video stream to the viewer devices 112. For example, based on detecting the request from the host device to resume the disconnected public combined live video stream, the live video streaming system 106 can resume the broadcast by generating the public combined live video stream from the host device and the participant devices and provide it to the viewer devices 112.

In some implementations, the live video streaming system 106 can perform the act 2114 without the viewer devices 112 recognizing any interruption. For example, if the live video streaming system 106 provides a buffered version to the viewer devices 112, the live video streaming system 106 may be able to resume the public combined live video stream before the buffered content runs out or disappears.

To illustrate, in some instances, the live video stream provides a buffered version of the public combined live video stream that is delayed by 15-20 seconds. Here if the host device is able to request a new live video stream within 10 seconds and the live video streaming system 106 is able to quickly determine that the request satisfies the streaming continuity threshold as described above, the live video streaming system 106 may be able to provide the resumed public combined live video stream to the video buffer before the buffered content runs out. In further implementations, the live video streaming system 106 then begins to slowly build up the video buffer back to 15-20 seconds by slightly slowing down the public combined live video stream or adding unnoticeable pauses over the next few seconds or minutes.

In various implementations, the live video streaming system 106 can hold on to the viewer devices 112 for a short duration of time after detecting the host device abruptly disconnecting from the public combined live video stream. For example, the live video streaming system 106 plays an animation or otherwise indicates that the host appears to be temporarily disconnected. In some implementations, the live video streaming system 106 temporarily removes the live video stream from the host device and shows the live video stream of another participant device (and/or passes control to the other participant device until the host device returns). In various implementations, the live video streaming system 106 is able to reconnect the host before the viewer devices 112 are able to notice the host device missing, as described above.

As mentioned above, the live video streaming system 106 determines whether a request for a new live video stream meets one or more streaming continuity thresholds. In some implementations, the live video streaming system 106 can utilize different streaming continuity thresholds based on an amount of time that passes between detecting the disconnection and the request to start a new public combined live video stream. For example, if the new request is within the time threshold mentioned above (e.g., roughly equal to the amount of stored up content in a video buffer), the live video streaming system 106 can continue the public combined live video stream broadcast (e.g., the act 2114) without interruption.

On the other hand, if the new request is beyond the time threshold mentioned, the live video streaming system 106 can utilize another streaming continuity threshold to confirm the connection between the interrupted public combined live video stream and the newly requested live video stream, as described above. Further, the live video streaming system 106 can generate a new public combined live video stream that resumes (e.g., utilizes the same settings and continues from the last known timestamp) where the disconnected public combined live video stream ended.

In implementations where the live video streaming system 106 does not temporarily hold the viewer devices 112, the live video streaming system 106 can first dismiss the viewer devices 112, but track their identities (e.g., in a log or table recording data associated with the public combined live video stream). Then, the live video streaming system 106 can provide notifications to the viewer devices 112 when the host device resumes the public combined live video stream. For example, the live video streaming system 106 sends electronic messages (e.g., texts, emails, push notifications, etc.) to the viewer devices 112 indicating that the public combined live video stream has resumed. The live video streaming system 106 can carry over the settings and preferences of the host device, participant devices 110, and the viewer devices 112 across the two linked public combined live video streams.

In some implementations, the live video streaming system 106 automatically resumes the public combined live video stream without requiring that the host device confirm the prompting to resume. Indeed, just as the live video streaming system 106 can automatically detect when a host device is disconnected, the live video streaming system 106 can detect the host device trying to reconnect (e.g., based on the host device reestablishing a connection with the live video streaming system 106) and automatically resume the public combined live video stream.

In various implementations, the live video streaming system 106 saved the public combined live video stream to be played back at a later time. In these implementations, when a public combined live video stream is disrupted and resumes, the live video streaming system 106 can stitch the two public combined live video streams together as a single public combined live video stream when later played back.

Figure 22:
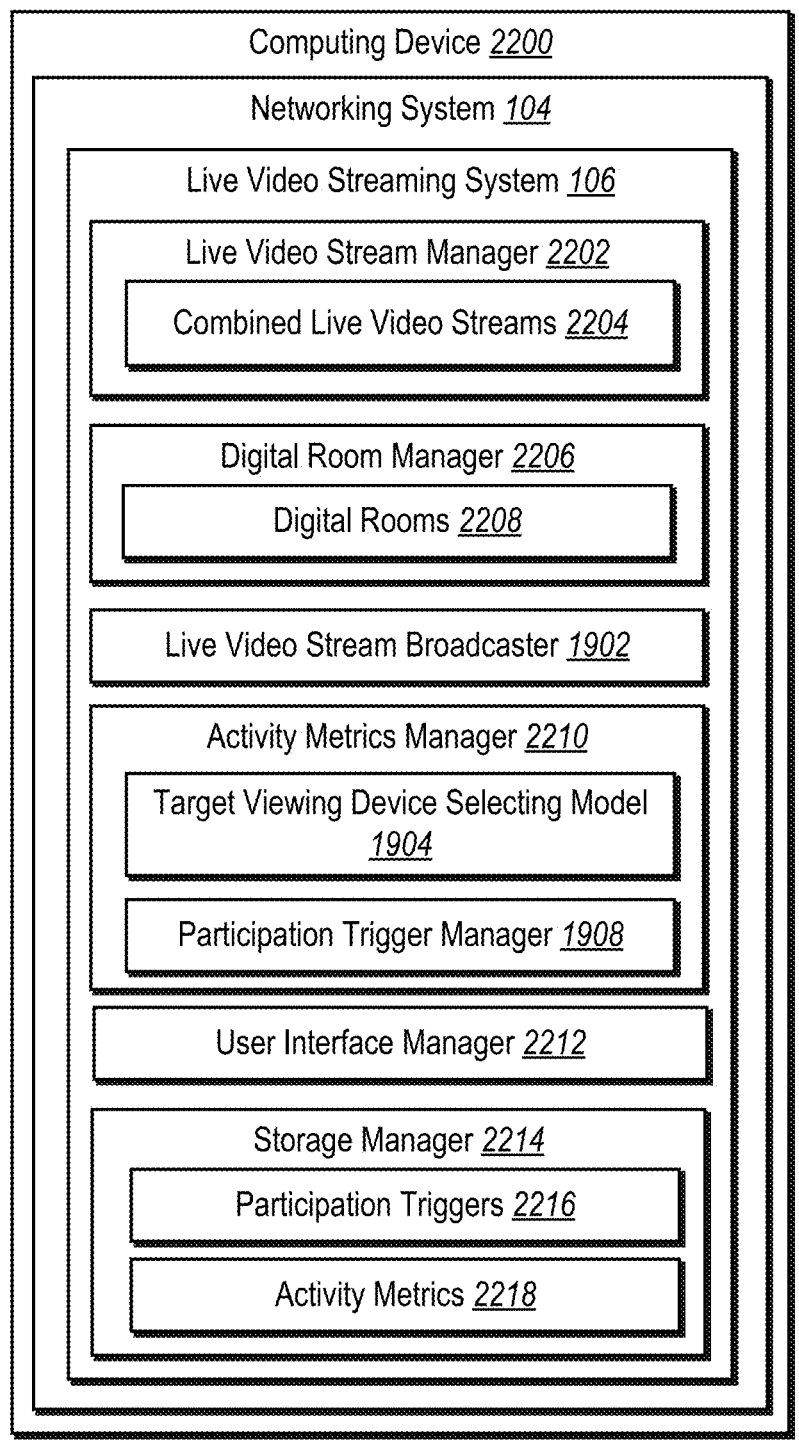
FIG. 22 illustrates a block diagram of the live video streaming system within the networking system in accordance with one or more implementations.

Turning now to FIG. 22, additional detail is provided regarding the components and capabilities of the live video streaming system 106 in accordance with one or more implementations. As shown, the live video streaming system 106 is implemented by a computing device 2200. In some implementations, the computing device 2200 is an example of the server device 102. In other implementations, the computing device 2200 represents multiple computing devices that can implement the live video streaming system 106, such as the server device 102, a host device, a participant device, and/or a viewer device.

As shown in relation to FIG. 22, the computing device 2200 includes the networking system 104 having the live video streaming system 106, both of which are introduced above in connection with FIG. 1. As also shown, the live video streaming system 106 includes a live video stream manager 2202 having combined live video streams 2204, a digital room manager 2206 having digital rooms 2208, the live video stream broadcaster 1902, an activity metrics manager 2210 having the target viewer device selection model 1904 and the participation trigger manager 1908, a user interface manager 2212, and a storage manager 2214. The storage manager 2214 can include participation triggers 2216 and activity metrics 2218. Additional detail regarding each of these components is provided in turn.

As shown, the live video streaming system 106 includes the live video stream manager 2202. The live video stream manager 2202 can identify, generate, monitor, modify, and/or manage combined live video streams 2204 (including non-public combined live video stream as well as public combined live video streams). For example, the live video stream manager 2202 can receive live video streams from multiple participant devices and generate a combined live video stream 2204, as described above. Indeed, the live video stream manager 2202 can synchronize live video streams and arrange then into one or more dynamic arrangements, as disclosed previously.

As shown, the live video streaming system 106 includes the digital room manager 2206. The digital room manager 2206 can identify, generate, monitor, modify, and/or manage digital rooms 2208. As described above, digital rooms 2208 can include a digital preparation room, a digital waiting room, a digital post-participation room, and an after broadcast room. In various implementations, the digital room manager 2206 sets up the digital rooms 2208 and facilitates transitioning participant devices in and out of the digital rooms. Further, in some implementations, the digital room manager 2206 communicates with the user interface manager 2212 to provide room-specific interfaces to participant devices within a room and/or participant devices (e.g., the host device) in the combined live video stream, as described above.

As shown, the live video streaming system 106 includes the live video stream broadcaster 1902. The live video stream broadcaster 1902 can facilitate, share, and/or distribute combined live video stream to participant devices and/or viewer devices 112. For example, in some implementations, the live video stream broadcaster 1902 communicates with the live video stream manager 2202 to provide the combined live video streams 2204 (e.g., public combined live video streams) to viewer devices organized in a first arrangement via a first protocol as well as provide the combined live video streams 2204 to participant devices organized in a second arrangement via a second faster protocol, as described above.

As shown, the live video streaming system 106 includes the activity metrics manager 2210. In general, the activity metrics manager 2210 can receive, monitor, analyze, detect, track, examine, identify, generate, modify, and/or otherwise manage activity metrics 2218. For example, the activity metrics manager 2210 receives activity metrics 2218 from viewer devices watching a combined live video stream (e.g., public combined live video streams). As described above, the activity metrics manager 2210 can analyze one or more activity metrics 2218 received from viewer devices to determine a target viewer device to participate in the combined live video stream.

More particularly, the activity metrics manager 2210 includes the target viewer device selection model 1904 and the participation trigger manager 1908, which are described above in connection with FIG. 19. For example, the target viewer device selection model 1904 determines a target viewer device by analyzing activity metrics 2218 that satisfy participation triggers 2216 associated with a combined live video stream. Further, as described above, the participation trigger manager 1908 can provide the target viewer device selection model 1904 with one or more participation triggers 2216 associated with a combined live video stream that corresponds to the framework of the combined live video stream, as disclosed earlier.

As shown, the live video stream includes the user interface manager 2212. In various implementations, the user interface manager 2212 can generate, create, update, change, replace, delete, remove, refresh, render, reveal, display, present, and/or provide user interfaces associated with the live video streaming system 106 and/or networking system 104 to client devices (e.g., a host device, a participant device, or a viewer device). In general, a networking system application on a client device implements user interfaces provided by the user interface manager 2212 by generating and providing user interfaces. Examples of user interfaces include a digital preparation room interface, an updated live broadcast interface, a digital waiting room user interface, digital post-participation room interface, an after broadcast room user interface, a host user interface, a participant device user interface, a viewer device user interface, and other interfaces associated with the live video streaming system 106/networking system 104.

As shown, the live video stream includes the storage manager 2214. The storage manager 2214 maintains data for the live video streaming system 106 at the computing device 2200 and/or client devices. The storage manager 2214 can maintain data of any type, size, or kind, as necessary to perform the functions of the live video streaming system 106. For example, as shown, the storage manager 2214 maintains data including participation triggers 2216 and activity metrics 2218. In some implementations, the storage manager 2214 also includes recordings of live video streams.

The components of the live video stream shown in FIG. 19 can include software, hardware, or both. For example, the components include one or more instructions stored on a computer-readable storage medium and executable by processors of one or more computing devices, such as a client device or server device. When executed by one or more processors, the computer-executable instructions of the server device 102, the host device 108, participant devices 110, or viewer devices 112 can cause the computing device (s) to perform the feature learning methods described herein. Alternatively, the components can include hardware, such as a special-purpose processing device to perform a certain function or group of functions. Alternatively, the components can include a combination of computer-executable instructions and hardware.

Furthermore, the components of the live video stream shown in FIG. 19 are, for example, implemented as one or more operating systems, as one or more stand-alone applications, as one or more modules of an application, as one or more plug-ins, as one or more library functions or functions called by other applications, and/or as a cloud computing model. Thus, the components can be implemented as a stand-alone application, such as a desktop or mobile application. Furthermore, the components can be implemented as one or more web-based applications hosted on a remote server. The components can also be implemented in a suite of mobile device applications or "apps."

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 23:
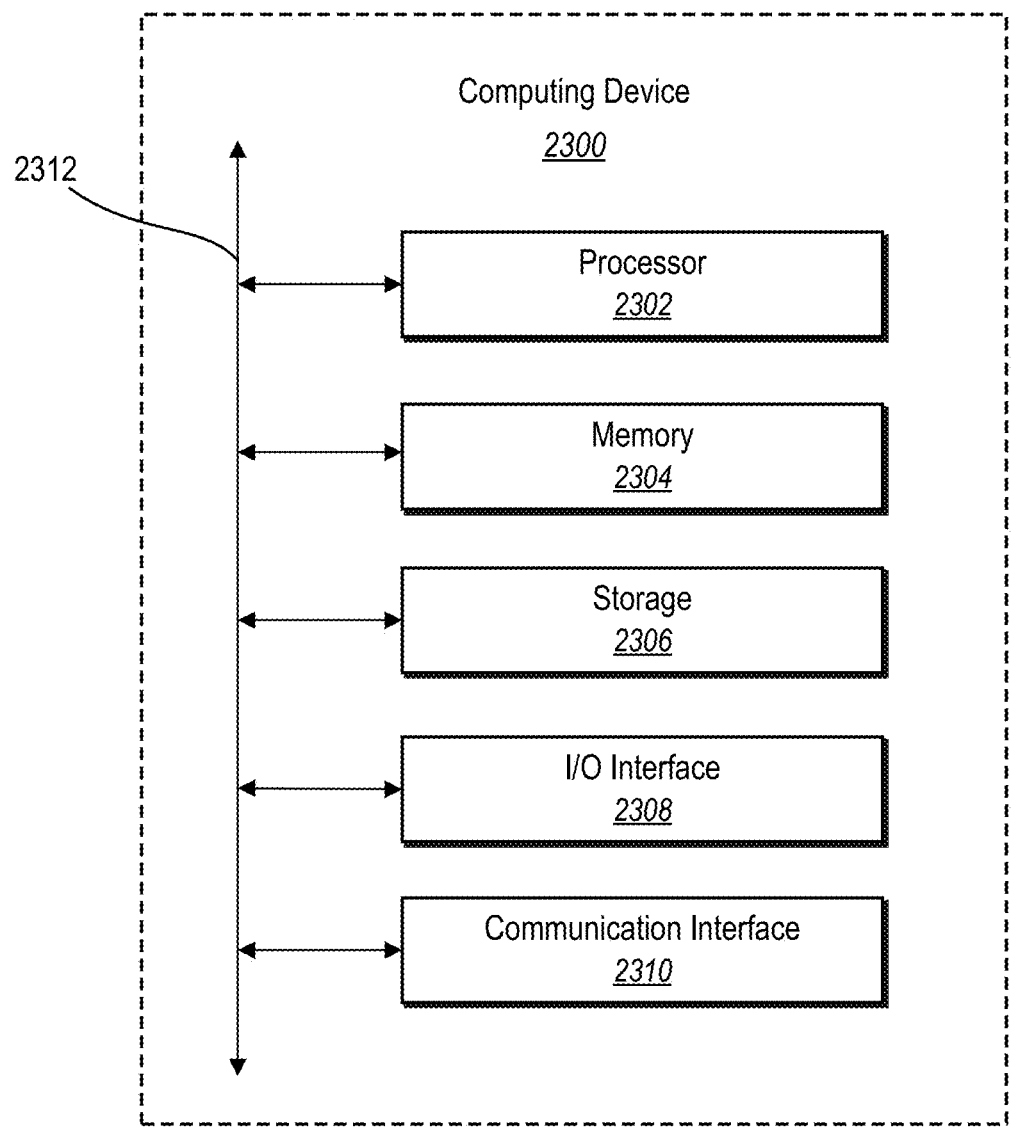
FIG. 23 illustrates a block diagram of an example computing device for implementing one or more implementations of the present disclosure.

FIG. 23 illustrates a block diagram of an example computing device 2300 that may be configured to perform one or more of the processes described above. One will appreciate that one or more computing devices such as the computing device 2300 may implement the live video streaming system 106. As shown by FIG. 23, the computing device 2300 can comprise a processor 2302, a memory 2304, a storage device 2306, an I/O interface 2308, and a communication interface 2310, which may be communicatively coupled by way of a communication infrastructure 2312. While an example computing device 2300 is shown in FIG. 23, the components illustrated in FIG. 23 are not intended to be limiting. Additional or alternative components may be used in other implementations. Furthermore, in certain implementations, the computing device 2300 can include fewer components than those shown in FIG. 23. Components of the computing device 2300 shown in FIG. 23 will now be described in additional detail.

In one or more implementations, the processor 2302 includes hardware for executing instructions, such as those making up a computer program. For example, to execute instructions, the processor 2302 may retrieve (or fetch) the instructions from an internal register, an internal cache, the memory 2304, or the storage device 2306 and decode and execute them. In one or more implementations, the processor 2302 may include one or more internal caches for data, instructions, or addresses. For example, the processor 2302 may include one or more instruction caches, one or more data caches, and one or more translation lookaside buffers (TLBs). Instructions in the instruction caches may be copies of instructions in the memory 2304 or the storage device 2306.

The memory 2304 may be used for storing data, metadata, and programs for execution by the processor(s). The memory 2304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 2304 may be internal or distributed memory.

The storage device 2306 includes storage for storing data or instructions. For example, storage device 2306 can comprise a non-transitory storage medium described above. The storage device 2306 may include a hard disk drive (HDD), a floppy disk drive, flash memory, an optical disc, a magneto-optical disc, magnetic tape, or a Universal Serial Bus (USB) drive or a combination of two or more of these. The storage device 2306 may include removable or non-removable (or fixed) media, where appropriate. The storage device 2306 may be internal or external to the computing device 2300. In one or more implementations, the storage device 2306 is non-volatile, solid-state memory. In other implementations, the storage device 2306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 2308 allows a user to provide input to, receive output from, and otherwise transfer data to and receive data from computing device 2300. The I/O interface 2308 may include a mouse, a keypad or a keyboard, a touch screen, a camera, an optical scanner, network interface, modem, another known I/O devices or a combination of such I/O interfaces. The I/O interface 2308 may include one or more devices for presenting output to a user, including, but not limited to, a graphics engine, a display (e.g., a display screen), one or more output drivers (e.g., display drivers), one or more audio speakers, and one or more audio drivers. In certain implementations, the I/O interface 2308 is configured to provide graphical data to a display for presentation to a user. The graphical data may be representative of one or more graphical user interfaces and/or any other graphical content as may serve a particular implementation.

The communication interface 2310 can include hardware, software, or both. In any event, the communication interface 2310 can provide one or more interfaces for communication (e.g., packet-based communication) between the computing device 2300 and one or more other computing devices or networks. For example, the communication interface 2310 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 2310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 2310 may facilitate communications with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination thereof.

Additionally, the communication interface 2310 may facilitate communications across various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 2312 may include hardware, software, or both that connects components of the computing device 2300 to each other. For example, the communication infrastructure 2312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the live video streaming system 106 can operate within a networking system 104, which may be a social networking system in various implementations. In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users.

Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 24:
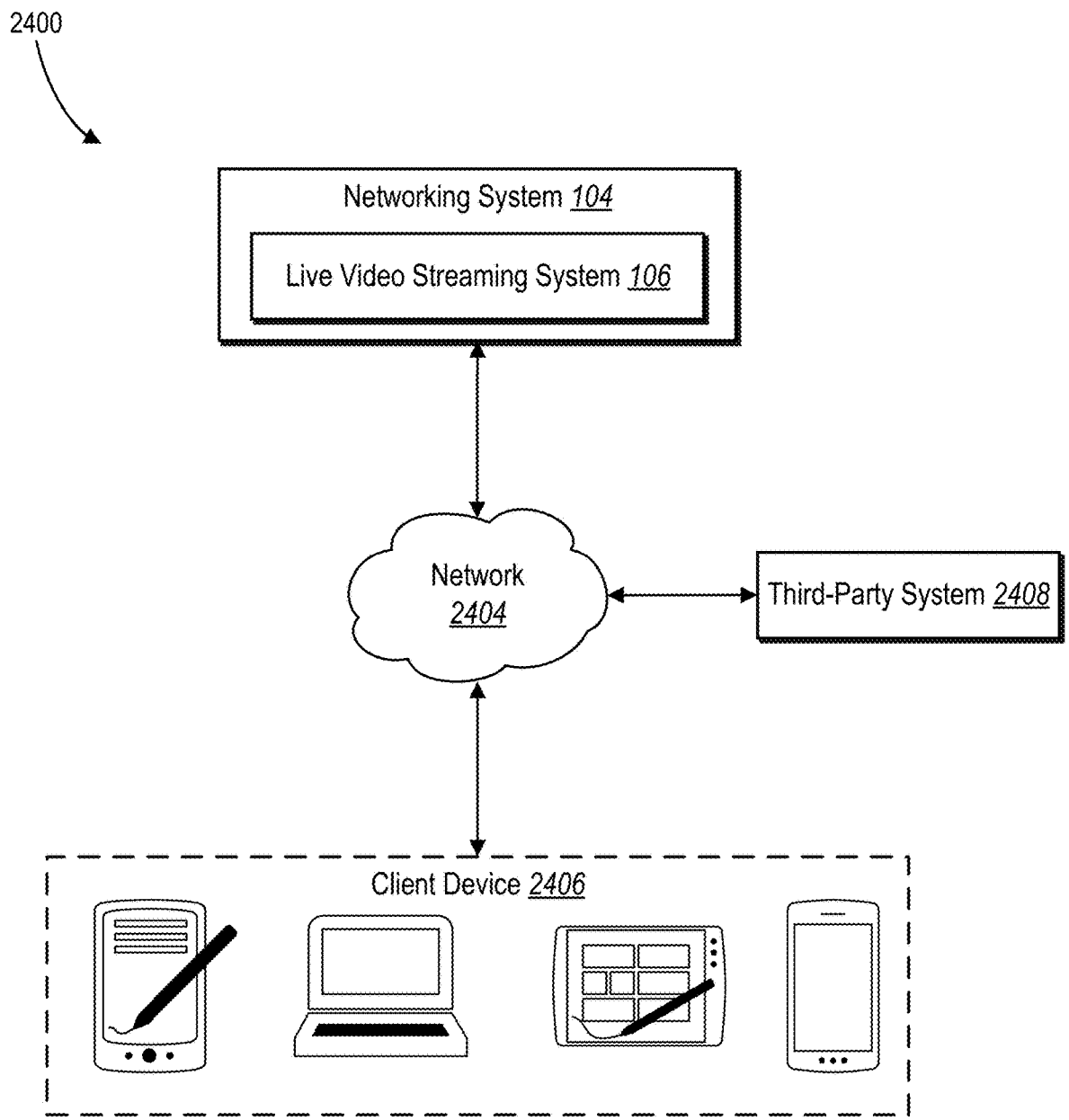
FIG. 24 illustrates an example network environment of a networking system in accordance with one or more implementations.

FIG. 24 illustrates an example network environment 2400 of a networking system. The network environment 2400 includes the networking system 104, a client device 2406, and a third-party system 2408 connected to each other by a network 2404. Although FIG. 24 illustrates a particular arrangement of the networking system 104, the client device 2406, the third-party system 2408, and the network 2404, this disclosure contemplates any suitable arrangement of the devices, systems, and networks. For example, the client device 2406 and the networking system 104 may be physically or logically co-located with each other in whole, or in part. Moreover, although FIG. 24 illustrates a single client device 2406, the networking system 104, the third-party system 2408, and the network 2404, this disclosure contemplates any suitable number of devices, systems, and networks. In some implementations, the networking system 104 in FIG. 24 represents the networking system 104 introduced above in connection with FIG. 1.

This disclosure contemplates any suitable network. For example, one or more portions of the network 2404 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 2404 may include one or more networks.

Links may connect the networking system 104, the client device 2406, and the third-party system 2408 to the network 2404 or to each other. In particular implementations, one or more links include one or more wireline (e.g., Digital Subscriber Line (DSL) or Data Over Cable Service Interface Specification (DOCSIS)), wireless (e.g., Wi-Fi or Worldwide Interoperability for Microwave Access (WiMAX)), or optical (e.g., Synchronous Optical Network (SONET) or Synchronous Digital Hierarchy (SDH)) links. In particular implementations, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 2400. One or more first links may differ in one or more respects from one or more second links.

In particular implementations, the client device 2406 may be an electronic device including hardware, software, or embedded logic components or a combination of two or more such components and capable of carrying out the appropriate functionalities implemented or supported by the client device 2406. For example, the client device 2406 may include any of the computing devices discussed above in relation to FIG. 23. The client device 2406 may enable a network user to access the network 2404. The client device 2406 may enable its user to communicate with other users associated with other client devices.

In particular implementations, the client device 2406 may include a web browser, such as MICROSOFT INTERNET EXPLORER, GOOGLE CHROME, MOZILLA FIREFOX, APPLE SAFARI, and may have one or more add-ons, plug-ins, or other extensions (e.g., toolbars). A user at the client device 2406 may enter a Uniform Resource Locator (URL) or other address directing the web browser to a particular server (such as server, or a server associated with the third-party system 2408), and the web browser may generate a Hypertext Transfer Protocol (HTTP) request and communicate the HTTP request to server. The server may accept the HTTP request and communicate to the client device 2406 one or more Hypertext Markup Language (HTML) files responsive to the HTTP request.

The client device 2406 may render a webpage based on the HTML files from the server for presentation to the user. For example, webpages may render from HTML files, Extensible Hypertext Markup Language (XHTML) files, or Extensible Markup Language (XML) files, according to particular needs. Such pages may also execute scripts such as those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular implementations, the networking system 104 may be a network-addressable computing system that can host an online network of users (e.g., a social networking system or an electronic messaging system). In some implementations, such as the illustrated implementation, the networking system 104 implements the live video streaming system 106.

The networking system 104 may generate, store, receive, and send networking data, such as user-profile data, concept-profile data, graph information (e.g., social-graph information), or other suitable data related to the online network of users. The networking system 104 may be accessed by the other components of network environment 2400 either directly or via the network 2404. In particular implementations, the networking system 104 may include one or more servers. Each server may be a unitary server or a distributed server spanning multiple computers or multiple datacenters. Servers may be of various types, such as web server, news server, mail server, message server, advertising server, file server, application server, exchange server, database server, proxy server, another server suitable for performing functions or processes described herein, or any combination thereof.

In one or more implementations, each server may include hardware, software, or embedded logic components or a combination of two or more such components for carrying out the appropriate functionalities implemented or supported by a server. In particular implementations, the networking system 104 may include one or more data stores. Data stores may be used to store various types of information. In particular implementations, the information stored in data stores may be organized according to specific data structures. In particular implementations, each data store may be a relational, columnar, correlation, or another suitable database. Although this disclosure describes or illustrates particular types of databases, this disclosure contemplates any suitable types of databases. Particular implementations may provide interfaces that enable the networking system 104, the client device 2406, or the third-party system 2408 to manage, retrieve, modify, add, or delete, the information stored in a data store.

In particular implementations, the networking system 104 may store one or more social graphs in one or more data stores. In particular implementations, a social graph may include multiple nodes—which may include multiple user nodes (each corresponding to a particular user) or multiple concept nodes (each corresponding to a particular concept)—and multiple edges connecting the nodes. The networking system 104 may provide users of the online network of users the ability to communicate and interact with other users. In particular implementations, users may join the online network of users via the networking system 104 and then add connections (e.g., relationships) to a number of other users of the networking system 104 whom they want to be connected to. Herein, the term "friend" may refer to any other user of the networking system 104 with whom a user has formed a connection, association, or relationship via the networking system 104.

In particular implementations, the networking system 104 may provide users with the ability to take actions on various types of items or objects, supported by the networking system 104. For example, the items and objects may include groups or social networks to which users of the networking system 104 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the networking system 104 or by an external system of the third-party system 2408, which is separate from the networking system 104 and coupled to the networking system 104 via the network 2404.

In particular implementations, the networking system 104 may be capable of linking a variety of entities. For example, the networking system 104 may enable users to interact with each other as well as receive content from the third-party systems 2408 or other entities, or to allow users to interact with these entities through an application programming interfaces (API) or other communication channels.

In particular implementations, the third-party system 2408 may include one or more types of servers, one or more data stores, one or more interfaces, including but not limited to APIs, one or more web services, one or more content sources, one or more networks, or any other suitable components, e.g., that servers may communicate with. The third-party system 2408 may be operated by a different entity from an entity operating the networking system 104. In particular implementations, however, the networking system 104 and the third-party systems 2408 may operate in conjunction with each other to provide social networking services to users of the networking system 104 or the third-party systems 2408. In this sense, the networking system 104 may provide a platform, or backbone, which other systems, such as the third-party systems 2408, may use to provide social networking services and functionality to users across the Internet.

In particular implementations, the third-party system 2408 may include a third-party content object provider. A third-party content object provider may include one or more sources of content objects, which may be communicated to a client device 2406. For example, content objects may include information regarding things or activities of interest to the user, such as movie showtimes, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular implementations, the networking system 104 also includes user-generated content objects, which may enhance a user's interactions with the networking system 104. User-generated content may include anything a user can add, upload, send, or "post" to the networking system 104. For example, a user communicates posts to the networking system 104 from a client device 2406. Posts may include data such as status updates or other textual data, location information, photos, videos, links, music or other similar data or media. Content may also be added to the networking system 104 by a third-party through a "communication channel," such as a newsfeed or stream.

In particular implementations, the networking system 104 may include a variety of servers, sub-systems, programs, modules, logs, and data stores. In particular implementations, the networking system 104 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The networking system 104 may also include suitable components such as network interfaces, security mechanisms, load balancers, failover servers, management-and-network-operations consoles, other suitable components, or any suitable combination thereof. In particular implementations, the networking system 104 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. For example, if a user "likes" an article about a brand of shoes the category may be the brand, or the general category of "shoes" or "clothing" A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the networking system 104 to one or more client device 2406 or one or more the third-party system 2408 via the network 2404. The web server may include a mail server or other messaging functionality for receiving and routing messages between the networking system 104 and one or more client device 2406. An API-request server may allow the third-party system 2408 to access information from the networking system 104 by calling one or more APIs. An action logger may be used to receive communications from a web server about a user's actions on or off networking system 104. In conjunction with the action log, a third-party-content-object log may be maintained of user exposures to third-party-content objects. A notification controller may provide information regarding content objects to a client device 2406. Information may be pushed to a client device 2406 as notifications, or information may be pulled from client device 2406 responsive to a request received from client device 2406. Authorization servers may be used to enforce one or more privacy settings of the users of the networking system 104. A privacy setting of a user determines how particular information associated with a user can be shared. The authorization server may allow users to opt in to or opt out of having their actions logged by the networking system 104 or shared with other systems (e.g., the third-party system 2408), such as by setting appropriate privacy settings. Third-party-content-object stores may be used to store content objects received from third parties, such as the third-party system 2408. Location stores may be used for storing location information received from client device 2406 associated with users. Advertisement-pricing modules may combine social information, the current time, location information, or other suitable information to provide relevant advertisements, in the form of notifications, to a user.

Figure 25:
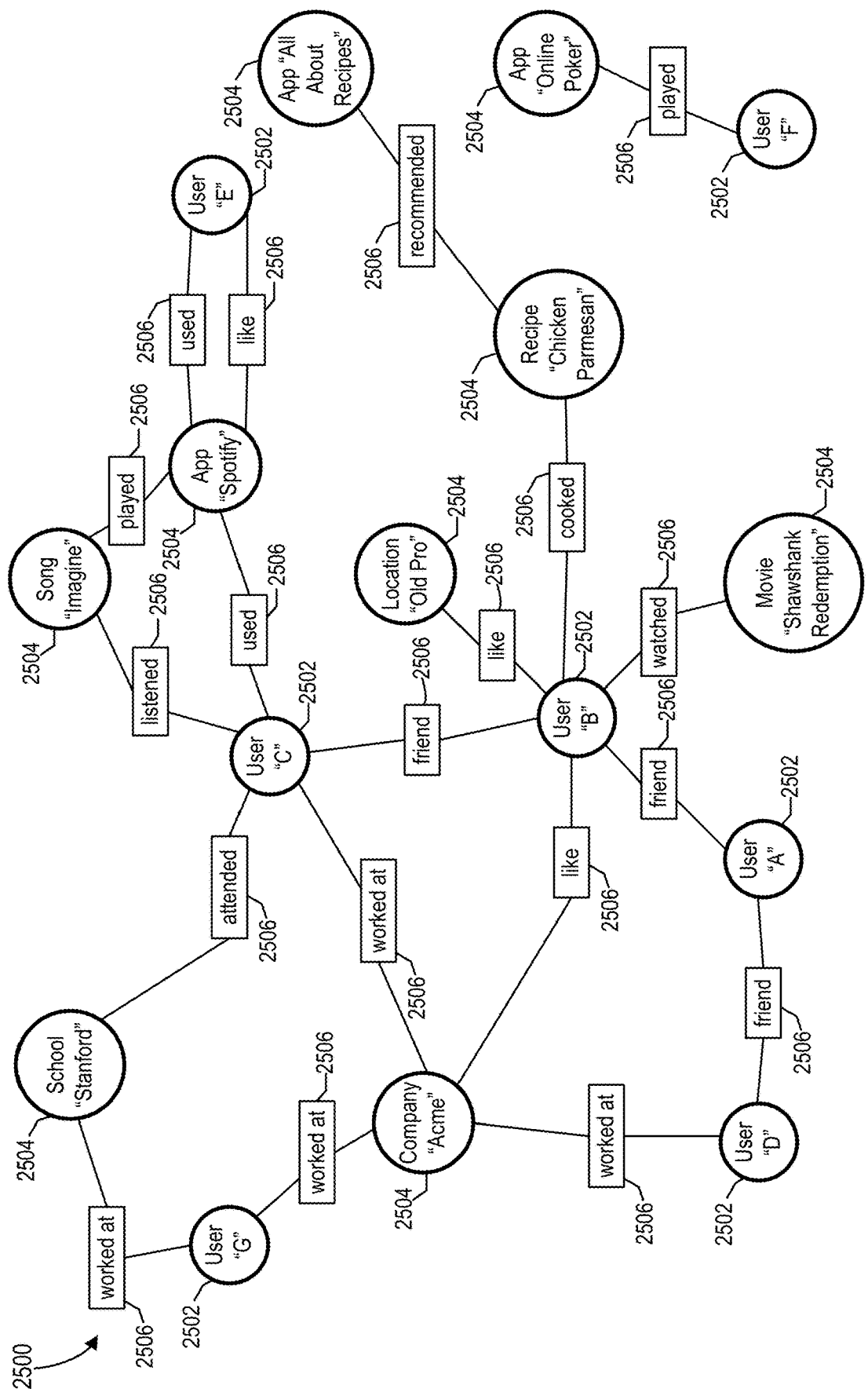
FIG. 25 illustrates a social graph in accordance with one or more implementations.

FIG. 25 illustrates example social graph 2500. In particular implementations, the networking system 104 may store one or more social graphs 2500 in one or more data stores. In particular implementations, social graph 2500 may include multiple nodes—which may include multiple user nodes 2502 or multiple concept nodes 2504—and multiple edges 2506 connecting the nodes. Example social graph 2500 illustrated in FIG. 25 is shown, for didactic purposes, in a two-dimensional visual map representation. In particular implementations, the networking system 104, the client device 2406, or the third-party system 2408 may access social graph 2500 and related social-graph information for suitable applications. The nodes and edges of social graph 2500 may be stored as data objects, for example, in a data store (such as a social-graph database). Such a data store may include one or more searchable or quarriable indexes of nodes or edges of social graph 2500.

In particular implementations, a user node 2502 may correspond to a user of the networking system 104. For example, a user may be an individual (human user), an entity (e.g., an enterprise, business, or third-party application), or a group (e.g., of individuals or entities) that interacts or communicates with or over networking system 104. In particular implementations, when a user registers for an account with the networking system 104, the networking system 104 may create a user node 2502 corresponding to the user and store the user node 2502 in one or more data stores. Users and user nodes 2502 described herein may, where appropriate, refer to registered users and user nodes 2502 associated with registered users. In addition, or as an alternative, users and user nodes 2502 described herein may, where appropriate, refer to users that have not registered with the networking system 104. In particular implementations, a user node 2502 may be associated with information provided by a user or information gathered by various systems, including the networking system 104. For example, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular implementations, a concept node 2504 may correspond to a concept. For example, a concept may correspond to a place (e.g., a movie theater, restaurant, landmark, or city); a website (e.g., a website associated with networking system 104 or a third-party website associated with a web-application server); an entity (e.g., a person, business, group, sports team, or celebrity); a resource (e.g., an audio file, video file, digital photo, text file, structured document, or application) which may be located within the networking system 104 or on an external server, such as a web-application server; real or intellectual property (e.g., a sculpture, painting, movie, game, song, idea, photograph, or written work); a game; an activity; an idea or theory; another suitable concept; or two or more such concepts. A concept node 2504 may be associated with information of a concept provided by a user or information gathered by various systems, including the networking system 104. For example, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular implementations, a concept node 2504 may be associated with one or more data objects corresponding to information associated with concept node 2504. In particular implementations, a concept node 2504 may correspond to one or more webpages.

In particular implementations, a node in the social graph 2500 may represent or be represented by a webpage (which may be referred to as a "profile page"). Profile pages may be hosted by or accessible to the networking system 104. Profile pages may also be hosted on third-party websites associated with a third-party system 2408. For example, a profile page corresponding to a particular external webpage may be the particular external webpage, and the profile page may correspond to a particular concept node 2504. Profile pages may be viewable by all or a selected subset of other users. For example, a user node 2502 may have a corresponding user-profile page in which the corresponding user may add content, make declarations, or otherwise express himself or herself. As another example and not by way of limitation, a concept node 2504 may have a corresponding concept-profile page in which one or more users may add content, make declarations, or express themselves, particularly in relation to the concept corresponding to concept node 2504.

In particular implementations, a concept node 2504 may represent a third-party webpage or resource hosted by the third-party system 2408. The third-party webpage or resource may include, among other elements, content, a selectable or another icon, or another inter-actable object (which may be implemented, for example, in JavaScript, AJAX, or PHP codes) representing an action or activity. For example, a third-party webpage may include a selectable icon such as "like," "check-in," "eat," "recommend," or another suitable action or activity. A user viewing the third-party webpage may perform an action by selecting one of the icons (e.g., "eat"), causing a client device 2406 to send to the networking system 104 a message indicating the user's action. In response to the message, the networking system 104 may create an edge (e.g., an "eat" edge) between a user node 2502 corresponding to the user and a concept node 2504 corresponding to the third-party webpage or resource and store edge 2506 in one or more data stores.

In particular implementations, a pair of nodes in the social graph 2500 may be connected to each other by one or more edges 2506. An edge 2506 connecting a pair of nodes may represent a relationship between the pair of nodes. In particular implementations, an edge 2506 may include or represent one or more data objects or attributes corresponding to the relationship between a pair of nodes. For example, a first user may indicate that a second user is a "friend" of the first user. In response to this indication, the networking system 104 may send a "friend request" to the second user. If the second user confirms the "friend request," networking system 104 may create an edge 2506 connecting the first user's user node 2502 to the second user's user node 2502 in the social graph 2500 and store edge 2506 as social-graph information in one or more of data stores. In the example of FIG. 25, social graph 2500 includes an edge 2506 indicating a friend relation between user nodes 2502 of user "A" and user "B" and an edge indicating a friend relation between user nodes 2502 of user "C" and user "B." Although this disclosure describes or illustrates particular edges 2506 with particular attributes connecting particular user nodes 2502, this disclosure contemplates any suitable edges 2506 with any suitable attributes connecting user nodes 2502. For example, an edge 2506 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 2500 by one or more edges 2506.

In particular implementations, an edge 2506 between a user node 2502 and a concept node 2504 may represent a particular action or activity performed by a user associated with user node 2502 toward a concept associated with a concept node 2504. For example, as illustrated in FIG. 25, a user may "like," "attended," "played," "listened," "cooked," "worked at," or "watched" a concept, each of which may correspond to an edge type or subtype. A concept-profile page corresponding to a concept node 2504 may include, for example, a selectable "check-in" icon (e.g., a clickable "check-in" icon) or a selectable "add to favorites" icon. Similarly, after a user clicks these icons, the networking system 104 may create a "favorite" edge or a "check-in" edge in response to a user's action corresponding to a respective action.

As another example and not by way of limitation, a user (user "C") may listen to a particular song ("Ramble On") using a particular application (SPOTIFY, which is an online music application). In this case, the networking system 104 may create a "listened" edge 2506 and a "used" edge (as illustrated in FIG. 25) between user nodes 2502 corresponding to the user and concept nodes 2504 corresponding to the song and application to indicate that the user listened to the song and used the application. Moreover, the networking system 104 may create a "played" edge 2506 (as illustrated in FIG. 25) between concept nodes 2504 corresponding to the song and the application to indicate that the particular song was played by the particular application. In this case, "played" edge 2506 corresponds to an action performed by an external application (SPOTIFY) on an external audio file (the song "Imagine"). Although this disclosure describes particular edges 2506 with particular attributes connecting user nodes 2502 and concept nodes 2504, this disclosure contemplates any suitable edges 2506 with any suitable attributes connecting user nodes 2502 and concept nodes 2504.

Furthermore, although this disclosure describes edges between a user node 2502 and a concept node 2504 representing a single relationship, this disclosure contemplates edges between a user node 2502 and a concept node 2504 representing one or more relationships. For example, an edge 2506 may represent both that a user likes and has used at a particular concept. Alternatively, another edge 2506 may represent each type of relationship (or multiples of a single relationship) between a user node 2502 and a concept node 2504 (as illustrated in FIG. 25 between user node 2502 for user "E" and concept node 2504 for "SPOTIFY").

In particular implementations, the networking system 104 may create an edge 2506 between a user node 2502 and a concept node 2504 in the social graph 2500. For example, a user viewing a concept-profile page (e.g., by using a web browser or a special-purpose application hosted by the user's client device 2406) may indicate that he or she likes the concept represented by the concept node 2504 by clicking or selecting a "Like" icon, which may cause the user's client device 2406 to send to the networking system 104 a message indicating the user's liking of the concept associated with the concept-profile page.

In response to the message, the networking system 104 may create an edge 2506 between user node 2502 associated with the user and concept node 2504, as illustrated by "like" edge 2506 between the user and concept node 2504. In particular implementations, the networking system 104 may store an edge 2506 in one or more data stores. In particular implementations, an edge 2506 may be automatically formed by the networking system 104 in response to a particular user action. For example, if a first user uploads a picture, watches a movie, or listens to a song, an edge 2506 may be formed between user node 2502 corresponding to the first user and concept nodes 2504 corresponding to those concepts. Although this disclosure describes forming particular edges 2506 in particular manners, this disclosure contemplates forming any suitable edges 2506 in any suitable manner.

In particular implementations, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on the networking system 104)

A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a predetermined area of a profile page of a user or other page, presented with additional information associated with the advertiser, bumped up or otherwise highlighted within news feeds or tickers of other users, or otherwise promoted. The advertiser may pay to have the social action promoted. For example, advertisements may be included among the search results of a search-results page, where sponsored content is promoted over non-sponsored content.

In particular implementations, an advertisement may be requested for display within social networking system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. For example, the user may view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the networking system 104 may execute or modify a particular action of the user.

An advertisement may also include social networking-system functionality that a user may interact with. For example, an advertisement may enable a user to "like" or otherwise endorse the advertisement by selecting an icon or link associated with the endorsement. As another example and not by way of limitation, an advertisement may enable a user to search (e.g., by executing a query) for content related to the advertiser. Similarly, a user may share the advertisement with another user (e.g., through the networking system 104) or RSVP (e.g., through the networking system 104) to an event associated with the advertisement. In addition, or as an alternative, an advertisement may include a social networking system context directed to the user. For example, an advertisement may display information about a friend of the user within the networking system 104 who has taken an action associated with the subject matter of the advertisement.

In particular implementations, the networking system 104 may determine the social-graph affinity (which may be referred to herein as "Affinity") of various social-graph entities for each other Affinity may represent the strength of a relationship or level of interest between particular objects associated with the online network of users, such as users, concepts, content, actions, advertisements, other objects associated with the online network of users, or any suitable combination thereof. Affinity may also be determined with respect to objects associated with the third-party systems 2408 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular implementations, the networking system 104 may measure or quantify social-graph affinity using an affinity coefficient (which may be referred to herein as "coefficient"). The coefficient may represent or quantify the strength of a relationship between particular objects associated with the online network of users. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online network of users. For example, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular implementations, the networking system 104 may use a variety of factors to calculate a coefficient. These factors may include, for example, user actions, types of relationships between objects, location information, other suitable factors, or any combination thereof. In particular implementations, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user. For example, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular implementations, the networking system 104 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. For example, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular implementations, the networking system 104 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular implementations, the networking system 104 may calculate a coefficient based on a user's actions. The networking system 104 may monitor such actions on the online network of users, on the third-party system 2408, on other suitable systems, or any combination thereof Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular implementations, the networking system 104 may calculate a coefficient based on the user's actions with particular types of content. The content may be associated with the online network of users, the third-party system 2408, or another suitable system. The content may include users, profile pages, posts, news stories, headlines, instant messages, chat room conversations, emails, advertisements, pictures, video, music, other suitable objects, or any combination thereof. The networking system 104 may analyze a user's actions to determine whether one or more of the actions indicate an affinity for the subject matter, content, other users, and so forth. For example, if a user may make frequently posts content related to "coffee" or variants thereof, the networking system 104 may determine the user has a high coefficient with respect to the concept "coffee." Particular actions or types of actions may be assigned a higher weight and/or rating than other actions, which may affect the overall calculated coefficient. For example, if a first user emails a second user, the weight or the rating for the action may be higher than if the first user views the user-profile page for the second user.

In particular implementations, the networking system 104 may calculate a coefficient based on the type of relationship between particular objects. Referencing the social graph 2500, the networking system 104 may analyze the number and/or type of edges 2506 connecting particular user nodes 2502 and concept nodes 2504 when calculating a coefficient. For example, user nodes 2502 that are connected by a spouse-type edge (representing that the two users are married) may be assigned a higher coefficient than a user nodes 2502 that are connected by a friend-type edge. In other words, depending upon the weights assigned to the actions and relationships for the particular user, the overall affinity may be determined to be higher for content about the user's spouse than for content about the user's friend.

In particular implementations, the relationships a user has with another object may affect the weights and/or the ratings of the user's actions with respect to calculating the coefficient for that object. For example, if a user is tagged in a first photo, but merely likes a second photo, the networking system 104 may determine that the user has a higher coefficient with respect to the first photo than the second photo because having a tagged-in-type relationship with content may be assigned a higher weight and/or rating than having a like-type relationship with content.

In some implementations, the networking system 104 may calculate a coefficient for a first user based on the relationship one or more second users have with a particular object. In other words, the connections and coefficients other users have with an object may affect the first user's coefficient for the object. For example, if a first user is connected to or has a high coefficient for one or more second users, and those second users are connected to or have a high coefficient for a particular object, the networking system 104 may determine that the first user should also have a relatively high coefficient for the particular object.

In one or more implementations, the coefficient may be based on the degree of separation between particular objects. The degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends."

Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 2500. For example, social-graph entities that are closer in the social graph 2500 (i.e., fewer degrees of separation) may have a higher coefficient than entities that are further apart in the social graph 2500.

In particular implementations, the networking system 104 may calculate a coefficient based on location information. Objects that are geographically closer to each other may be considered to be more related, or of more interest, to each other than more distant objects. In some implementations, the coefficient of a user towards a particular object may be based on the proximity of the object's location to a current location associated with the user (or the location of a client device 2406 of the user). A first user may be more interested in other users or concepts that are closer to the first user. For example, if a user is one mile from an airport and two miles from a gas station, the networking system 104 may determine that the user has a higher coefficient for the airport than the gas station based on the proximity of the airport to the user.

In particular implementations, the networking system 104 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the networking system 104 may provide information that is relevant to a user's interests and current circumstances, increasing the likelihood that they will find such information of interest.

In some implementations, the networking system 104 may generate content based on coefficient information. Content objects may be provided or selected based on coefficients specific to a user. For example, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object.

In one or more implementations, the networking system 104 may generate search results based on coefficient information. The search results for a particular user may be scored or ranked based on the coefficient associated with the search results with respect to the querying user. For example, search results corresponding to objects with higher coefficients may be ranked higher on a search-results page than results corresponding to objects having lower coefficients.

In particular implementations, the networking system 104 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online network of users, from the third-party system 2408 (e.g., via an API or another communication channel), or from another suitable system. In response to the request, the networking system 104 may calculate the coefficient (or access the coefficient information if it has previously been calculated and stored).

In various implementations, the networking system 104 may measure an affinity with respect to a particular process. Different processes (both internal and external to the online network of users) may request a coefficient for a particular object or set of objects. The networking system 104 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular implementations may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application No. 23/632869, filed Oct. 1, 2012, each of which is incorporated by reference in their entirety.

In particular implementations, one or more of the content objects of the online network of users may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online network of users. Where the privacy settings for an object allow a particular user to access that object, the object may be described as being "visible" with respect to that user. For example, a user of the online network of users may specify privacy settings for a user-profile page identify a set of users that may access the work experience information on the user-profile page, thus excluding other users from accessing the information.

In particular implementations, the privacy settings may specify a "blocked list" of users that should not be allowed to access certain information associated with the object. In other words, the blocked list may specify one or more users or entities for which an object is not visible. For example, a user may specify a set of users that may not access photos albums associated with the user, thus excluding those users from accessing the photo albums (while also possibly allowing certain users not within the set of users to access the photo albums). In particular implementations, privacy settings may be associated with particular social-graph elements. Privacy settings of a social-graph element, such as a node or an edge, may specify how the social-graph element, information associated with the social-graph element, or content objects associated with the social-graph element can be accessed using the online network of users. For example, a particular concept node 2504 corresponding to a particular photo may have a privacy setting specifying that the photo may only be accessed by users tagged in the photo and their friends.

In particular implementations, privacy settings may allow users to opt in or opt out of having their actions logged by the networking system 104 or shared with other systems (e.g., the third-party system 2408). In particular implementations, the privacy settings associated with an object may specify any suitable granularity of permitted access or denial of access. For example, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of the third-party systems 2408, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular implementations, one or more servers may be authorization/privacy servers for enforcing privacy settings. In response to a request from a user (or other entity) for a particular object stored in a data store, the networking system 104 may send a request to the data store for the object. The request may identify the user associated with the request and may only be sent to the user (or a client device 2406 of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user.

In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific example implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving, at a server device, a plurality of live video streams from a plurality of participant devices;
   generating, at the server device, a digital preparation room for display on the plurality of participant devices by:
      combining the plurality of live video streams from the plurality of participant devices into a combined live video stream; and
      providing the combined live video stream to the plurality of participant devices within a digital preparation room interface;
   detecting, from a first participant device of the plurality of participant devices, user interaction comprising a selection of a graphical live broadcast element within the digital preparation room interface displayed on the first participant device; and
   based on detecting the selection of the graphical live broadcast element displayed within the digital preparation room interface:
      converting the digital preparation room interface provided to the plurality of participant devices into a first public combined live video stream interface comprising the combined live video stream; and
      broadcasting a second different public combined live video stream interface comprising the combined live video stream to a plurality of non-participant viewer devices, wherein the plurality of non-participant viewer devices is distinct from the plurality of participant devices.

2. The computer-implemented method of claim 1, further comprising:
   receiving, at the server device, an additional live video stream from a pending participant device; and
   generating, at the server device, a digital waiting room by:
      generating a digital waiting room live video stream comprising the additional live video stream from the pending participant device; and
      providing, for display at the pending participant device, a digital waiting room interface that comprises the combined live video stream and the digital waiting room live video stream while continuing to provide the first public combined live video stream interface to the plurality of participant devices, wherein the digital waiting room interface is different from the first public combined live video stream interface.

3. The computer-implemented method of claim 1, further comprising:
   ending the combined live video stream broadcast to the plurality of non-participant viewer devices; and
   generating, at the server device, an after-broadcast room for one or more participant devices of the plurality of participant devices by:
      combining one or more of the plurality of live video streams from the one or more participant devices into an after-broadcast room live video stream; and
      providing the after-broadcast room live video stream to the one or more participant devices.

4. The computer-implemented method of claim 3, further comprising:
   identifying a subset of non-participant viewer devices from the plurality of non-participant viewer devices based on one or more activity metrics associated with the plurality of non-participant viewer devices; and
   providing access to the after-broadcast room live video stream to the subset of the viewer devices.

5. The computer-implemented method of claim 1, further comprising:
   removing, from the combined live video stream, one or more live video streams of one or more participant devices of the plurality of participant devices during the combined live video stream; and
   generating, at the server device, a digital post-participation room for the one or more participant devices removed from the combined live video stream by:
      combining the one or more live video streams of the one or more participant devices into a post-participation room live video stream; and
      providing, for display at the one or more participant devices, a post-participation room user interface that comprises the combined live video stream and the post-participation room live video stream.

6. The computer-implemented method of claim 1, further comprising:
   before broadcasting the combined live video stream to the plurality of non-participant viewer devices, providing, for display at the first participant device, a live broadcast user interface that comprises broadcast participation elements indicating one or more participation triggers for participant devices to participate in the combined live video stream;
   based on receiving a selection of a broadcast participation element from the first participant device, identifying a participation trigger; and
   broadcasting the combined live video stream to the plurality of non-participant viewer devices in accordance with the participation trigger.

7. The computer-implemented method of claim 6, wherein the participation trigger comprises at least one of: a trigger for adding a participant device to the combined live video stream, a trigger for removing a participant device from the combined live video stream, a trigger for transitioning a participant device from a digital preparation room to the combined live video stream, a trigger for transitioning a participant device from a digital waiting room to the combined live video stream, or a trigger for transitioning a participant device from the combined live video stream to a post-participation room.

8. The computer-implemented method of claim 1, further comprising:

detecting, at the server device, that a live video stream from the first participant device is removed from the combined live video stream;

determining that the first participant device is starting a new live video stream within a predetermined amount of time of when the live video stream from the first participant device was removed from the combined live video stream;

based on determining that the first participant device is starting the new live video stream within the predetermined amount of time, providing a resume live video stream option for the first participant device to resume the combined live video stream; and based on user interaction with the resume live video stream option, resuming the broadcast of the combined live video stream to the plurality of non-participant viewer devices.

9. The computer-implemented method of claim 1, further comprising:

providing a first version of the combined live video stream to the plurality of participant devices; and broadcasting a second buffered version of the combined live video stream to the plurality of non-participant viewer devices.

10. A system comprising:

at least one processor; and at least one non-transitory computer-readable storage medium storing instructions that, when executed by the at least one processor, cause the system to:

broadcast, from a server device, a combined live video stream to a plurality of non-participant viewer devices, the combined live video stream comprising a first live video stream from a first participant device and a second live video stream from a second participant device, wherein the plurality of non-participant viewer devices is distinct from the first participant device and the second participant device;

generate, at the server device, a digital waiting room by:

generating a digital waiting room live video stream comprising a third live video stream received from a pending participant device; and providing, for display at the pending participant device, a digital waiting room interface that comprises the combined live video stream and the digital waiting room live video stream; and add the third live video stream with the first live video stream and the second live video stream within the combined live video stream being broadcast to the plurality of non-participant viewer devices, wherein the third live video stream is not viewable by the plurality of non-participant viewer devices until the third live video stream from the digital waiting room live video stream is added to the combined live video stream.

11. The system of claim 10, further comprising instructions that, when executed by the at least one processor, cause the system to:

based on receiving the third live video stream from the pending participant device, provide an indication to the first participant device that the pending participant device is ready to be added to the combined live stream; and receive, from the first participant device, a user interaction to move the third live video stream from the digital waiting room live video stream to the combined live video stream.

12. The system of claim 11, further comprising instructions that, when executed by the at least one processor, cause the system to provide the digital waiting room live video stream as the indication to the first participant device.

13. The system of claim 10, further comprising instructions that, when executed by the at least one processor, cause the system to:

receive user interaction from the first participant device before broadcasting the combined live video stream to the plurality of non-participant viewer devices, wherein the user interaction indicates moving the third live video stream to the combined live video stream upon one or more participation triggers being satisfied; and add the third live video stream to the combined live video stream by moving the third live video stream from the digital waiting room to the combined live video stream in accordance with the one or more participation triggers.

14. The system of claim 10, further comprising instructions that, when executed by the at least one processor, cause the system to:

receive, at the server device, a fourth live video stream from an additional pending participant device;

generate, at the server device, the digital waiting room by:

combining the third live video stream from the pending participant device and the fourth live video stream from the additional pending participant device into the digital waiting room live video stream; and providing, for display at the pending participant device and the additional pending participant device, the digital waiting room interface that comprises the combined live video stream and the digital waiting room live video stream.

15. The system of claim 14, further comprising instructions that, when executed by the at least one processor, cause the system to add the third live video stream and the fourth live video stream with the first live video stream and the second live video stream within the combined live video stream being broadcast to the plurality of non-participant viewer devices.

16. A non-transitory computer-readable medium storing instructions that, when executed by at least one processor, cause a computer system to:

receive, at a server device, a plurality of live video streams from a plurality of participant devices;

generate, at the server device, a digital preparation room for the plurality of participant devices by:

combining the plurality of live video streams from the plurality of participant devices into a combined live video stream; and providing the combined live video stream to the plurality of participant devices within a digital preparation room interface;

detect, from a first participant device of the plurality of participant devices, user interaction comprising a selection of a graphical live broadcast element within the digital preparation room interface displayed on the first participant device; and based on detecting the selection of the graphical live broadcast element:

convert the digital preparation room interface provided to the plurality of participant devices into a first public combined live video stream interface comprising the combined live video stream; and broadcast a second different public combined live video stream interface comprising the combined live video stream to a plurality of non-participant viewer devices, wherein the plurality of non-participant viewer devices is distinct from the plurality of participant devices.

17. The non-transitory computer-readable medium of claim 16, further comprising instructions that, when executed by the at least one processor, cause the computer system to:
   receive, at the server device, an additional live video stream from a pending participant device; and
   generate, at the server device, a digital waiting room by:
      generating a digital waiting room live video stream comprising the additional live video stream from the pending participant device; and
      providing, for display at the pending participant device, a digital waiting room interface that comprises the combined live video stream and the digital waiting room live video stream.

18. The non-transitory computer-readable medium of claim 16, further comprising instructions that, when executed by the at least one processor, cause the computer system to:
   end the combined live video stream broadcast to the plurality of non-participant viewer devices; and
   generate, at the server device, an after-broadcast room for one or more participant devices of the plurality of participant devices by:
      combining one or more of the plurality of live video streams from the one or more participant devices into an after-broadcast room live video stream; and
      providing the after-broadcast room live video stream to the one or more participant devices.

19. The non-transitory computer-readable medium of claim 18, further comprising instructions that, when executed by the at least one processor, cause the computer system to:
   identify a subset of non-participant viewer devices from the plurality of non-participant viewer devices based on one or more activity metrics associated with the plurality of non-participant viewer devices; and
   provide access to the after-broadcast room live video stream to the subset of the viewer devices.

20. The non-transitory computer-readable medium of claim 16, further comprising instructions that, when executed by the at least one processor, cause the computer system to:
   remove, from the combined live video stream, one or more live video streams of one or more participant devices of the plurality of participant devices during the combined live video stream; and
   generate, at the server device, a digital post-participation room for the one or more participant devices removed from the combined live video stream by:
      combining the one or more live video streams of the one or more participant devices into a post-participation room live video stream; and
      providing, for display at the one or more participant devices, a post-participation room user interface that comprises the combined live video stream and the post-participation room live video stream.

* * * * *